United States Patent
Asano et al.

(10) Patent No.: US 10,852,213 B2
(45) Date of Patent: Dec. 1, 2020

(54) IMAGE PROCESSING DEVICE FOR GAS DETECTION, IMAGE PROCESSING METHOD FOR GAS DETECTION, IMAGE PROCESSING PROGRAM FOR GAS DETECTION, COMPUTER-READABLE RECORDING MEDIUM HAVING IMAGE PROCESSING PROGRAM FOR GAS DETECTION RECORDED THEREON, AND GAS DETECTION SYSTEM

(71) Applicant: KONICA MINOLTA, INC., Tokyo (JP)

(72) Inventors: Motohiro Asano, Osaka (JP); Takashi Morimoto, Suita (JP)

(73) Assignee: KONICA MINOLTA, INC., Tokyo (JP)

( * ) Notice: Subject to any disclaimer, the term of this patent is extended or adjusted under 35 U.S.C. 154(b) by 149 days.

(21) Appl. No.: 16/062,622

(22) PCT Filed: Dec. 12, 2016

(86) PCT No.: PCT/JP2016/086929
§ 371 (c)(1),
(2) Date: Jun. 14, 2018

(87) PCT Pub. No.: WO2017/104617
PCT Pub. Date: Jun. 22, 2017

(65) Prior Publication Data
US 2019/0003919 A1    Jan. 3, 2019

(30) Foreign Application Priority Data

Dec. 15, 2015  (JP) ................................. 2015-244193

(51) Int. Cl.
*G06K 9/00* (2006.01)
*G01M 3/38* (2006.01)
(Continued)

(52) U.S. Cl.
CPC .............. *G01M 3/38* (2013.01); *G01M 3/002* (2013.01); *G01M 3/02* (2013.01); *G06T 7/0004* (2013.01); *G06T 2207/10048* (2013.01)

(58) Field of Classification Search
CPC .......... G01M 3/002; G01M 3/00; G01M 3/02; G01M 3/04; G01M 3/20; G01M 3/226;
(Continued)

(56) References Cited

U.S. PATENT DOCUMENTS 5,306,913 A * 4/1994 Noack ..................... G01M 3/38
                                                              250/330
6,803,577 B2  10/2004 Edner et al.
(Continued)

FOREIGN PATENT DOCUMENTS

CN    103217397 A     7/2013
DE    102015104874 A1  10/2015
(Continued)

OTHER PUBLICATIONS

Extended European Search Report (EESR) dated Apr. 4, 2019 issued in counterpart European Application No. 16875594.0.
(Continued)

*Primary Examiner* — Duy M Dang
(74) *Attorney, Agent, or Firm* — Holtz, Holtz & Volek PC

(57) ABSTRACT

A gas-detection image-processing device includes: a calculation unit that calculates identification values respectively corresponding to a plurality of pixels constituting an infrared image of a monitoring target, the identification values being identification values for identifying a pixel constituting a gas image and a pixel constituting a non-gas image; and an identification unit that, on the basis of the identification values, identifies, in a monitoring image that is generated by using the infrared image, a pixel constituting the gas image and a pixel constituting the non-gas image.

19 Claims, 47 Drawing Sheets

(51) Int. Cl.
    *G01M 3/02*     (2006.01)
    *G01M 3/00*     (2006.01)
    *G06T 7/00*     (2017.01)

(58) Field of Classification Search
    CPC .......... G01M 3/228; G01M 3/38; G01M 3/36; G01M 3/202; G01M 3/22; G01N 21/3504; G01N 21/31; G01N 21/39; G01N 33/0047; G06T 7/00; G06T 7/0004
    See application file for complete search history.

(56) References Cited

U.S. PATENT DOCUMENTS

| | | | |
|---|---|---|---|
| 6,822,742 | B1 | 11/2004 | Kalayeh et al. |
| 9,488,629 | B2 | 11/2016 | Xu et al. |
| 2003/0025081 | A1 | 2/2003 | Ender et al. |
| 2005/0134859 | A1 | 6/2005 | Kalayeh et al. |
| 2014/0002639 | A1 | 1/2014 | Cheben et al. |
| 2015/0292975 | A1 | 10/2015 | Xu et al. |
| 2015/0323449 | A1 | 11/2015 | Jones et al. |

FOREIGN PATENT DOCUMENTS

| | | |
|---|---|---|
| JP | 52015385 A | 2/1977 |
| JP | 06288858 A | 10/1994 |
| JP | 2011237213 A | 11/2011 |
| JP | 2012058093 A | 3/2012 |
| WO | 0148459 A1 | 7/2001 |

OTHER PUBLICATIONS

International Search Report (ISR) dated Feb. 14, 2017 issued in International Application No. PCT/JP2016/086929.
Written Opinion dated Feb. 14, 2017 issued in International Application No. PCT/JP2016/086929.
Partial Supplementary European Search Report dated Nov. 27, 2018 issued in European Application No. 16875594.0.
International Preliminary Report on Patentability (IPRP) (and English langauage translation thereof) dated Jun. 19, 2018 issued in International Application No. PCT/JP2016/086929.

\* cited by examiner

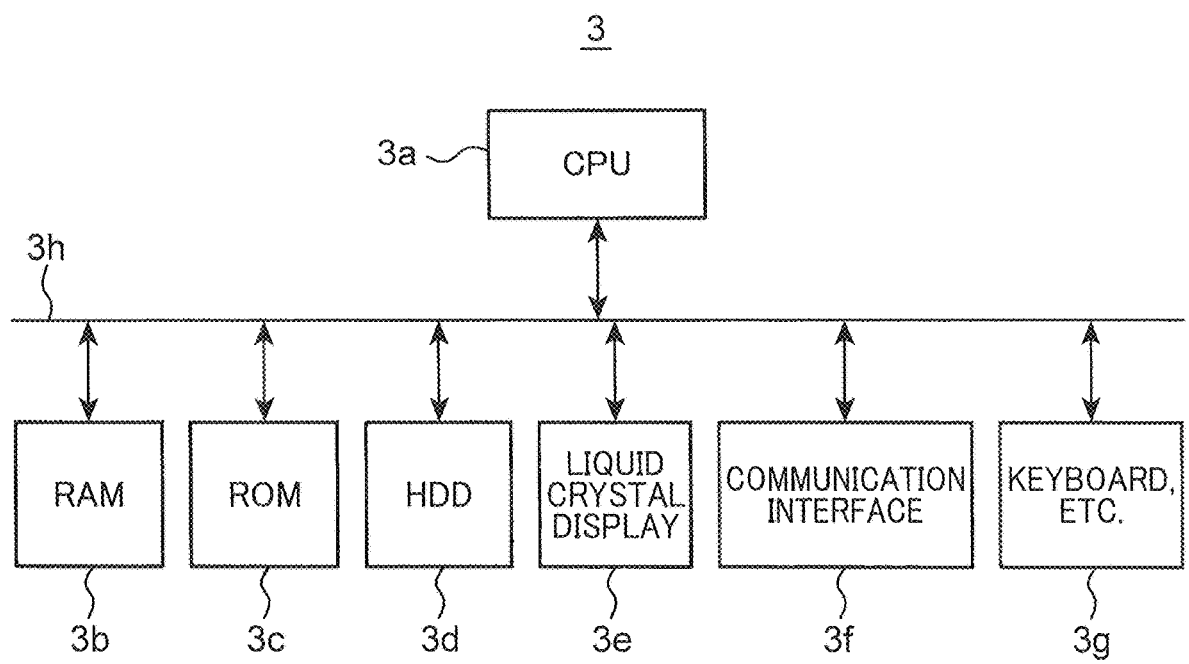

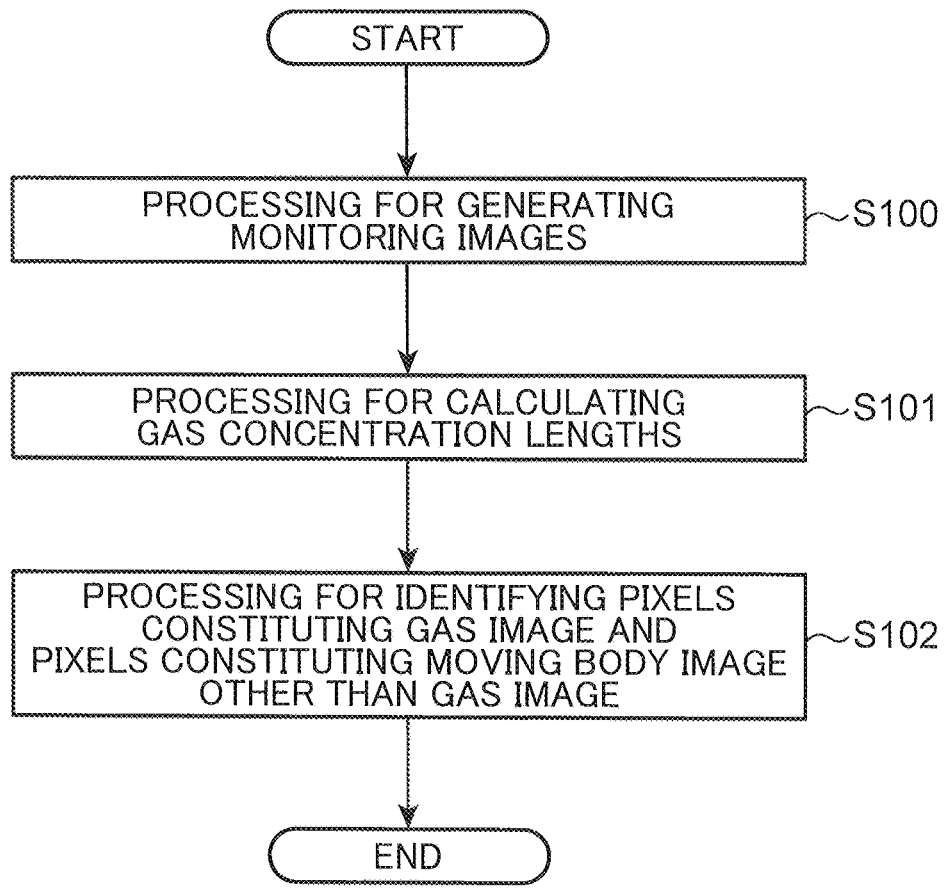

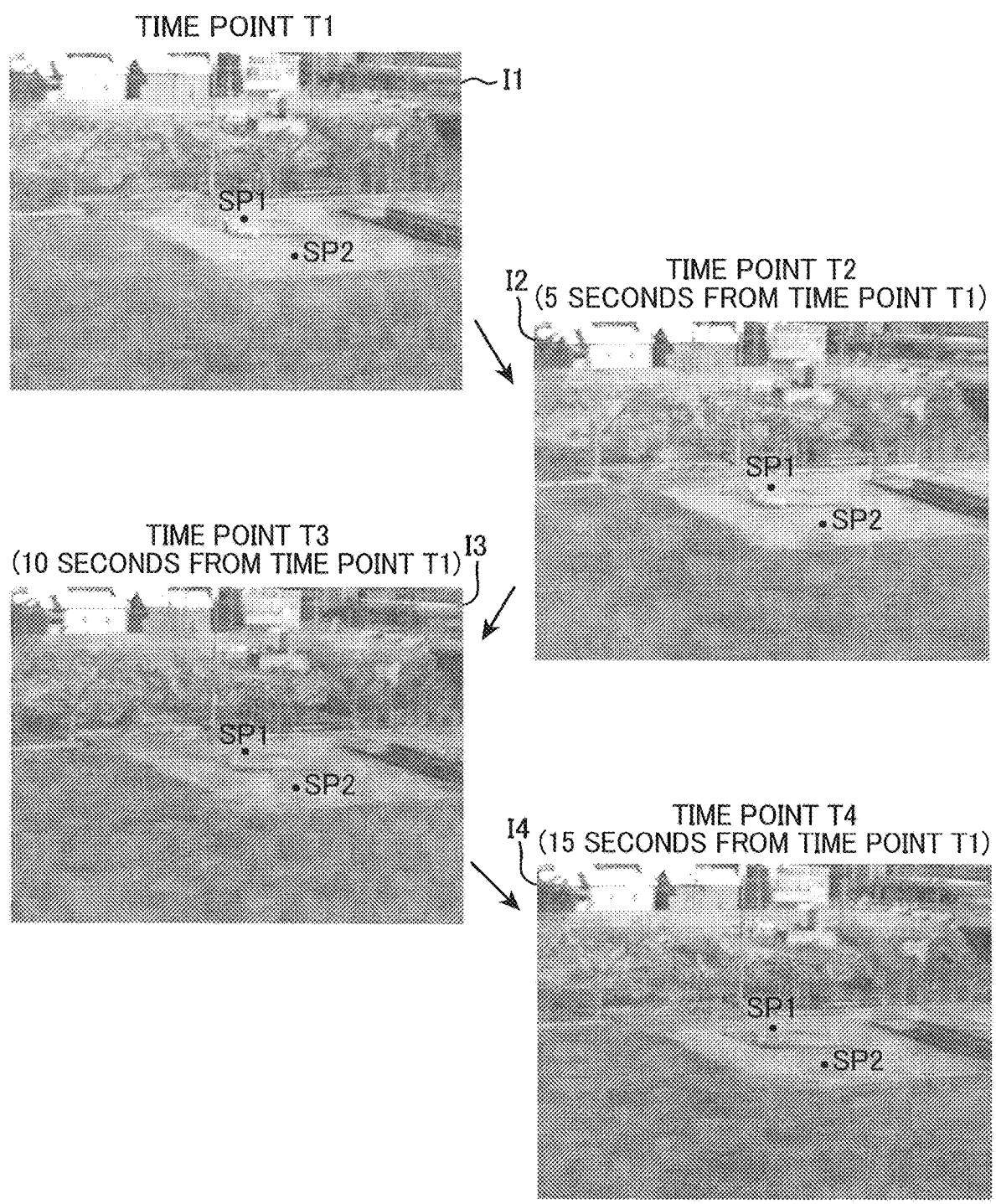

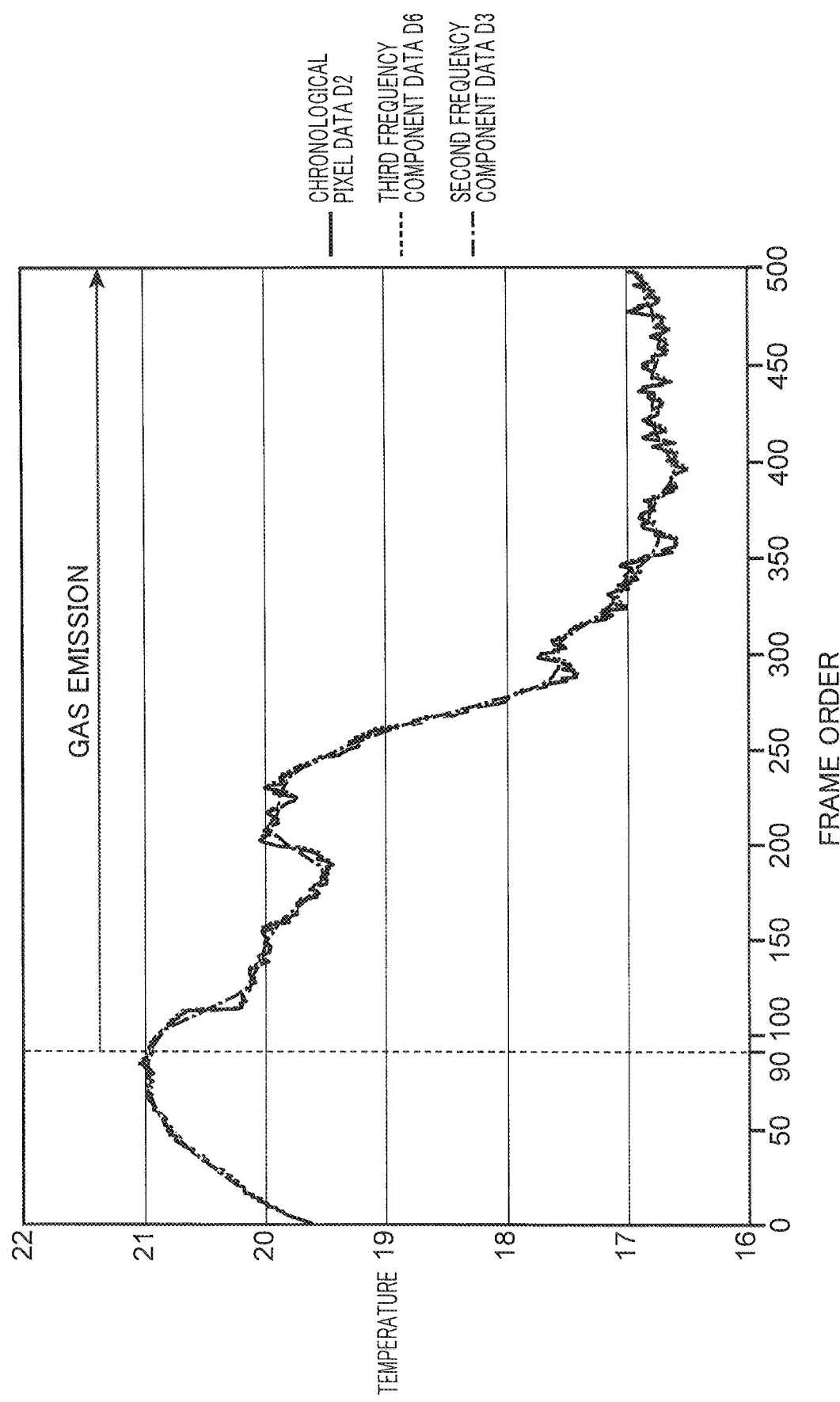

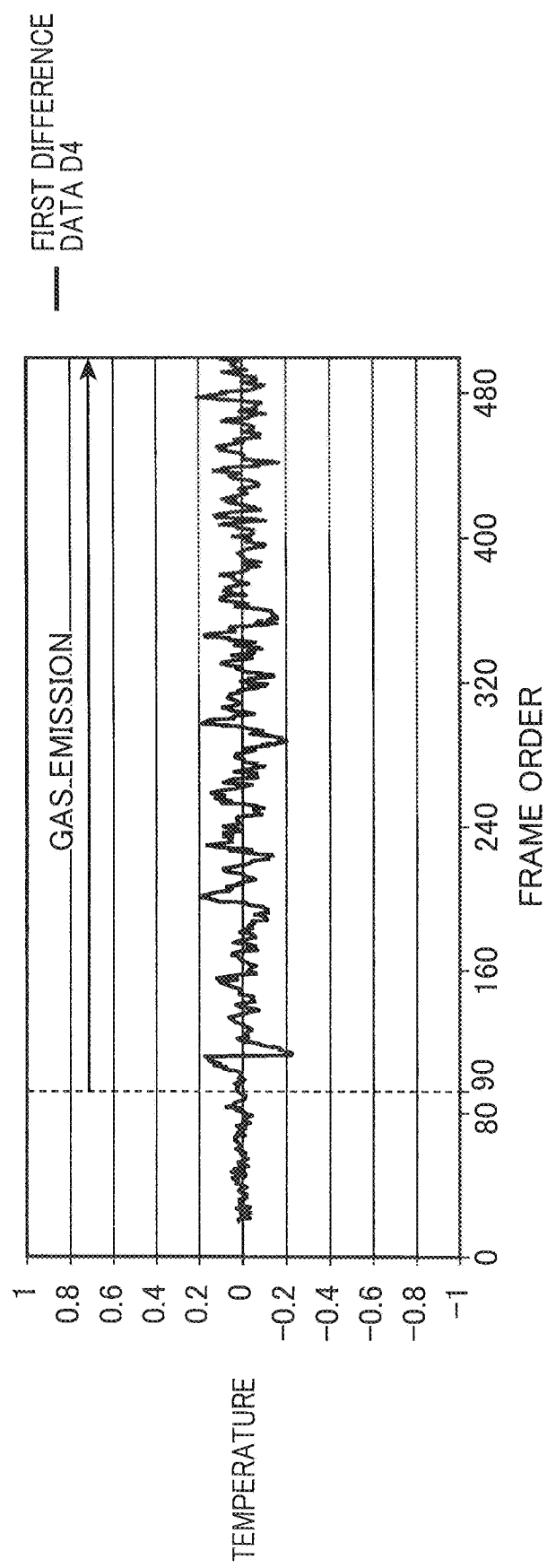

MONITORING IMAGE

FIG. 17

CALCULATION FORMULA FOR CONCENTRATION LENGTH:

$$I_{gas} = \int_{\lambda_1}^{\lambda_2} P_{back}\tau_{air}(\lambda)\tau_{gas}(\lambda) + B(T_{gas},\lambda)\tau_{air}(\lambda)(1-\tau_{gas}(\lambda)) + B(T_{air},\lambda)(1-\tau_{air}(\lambda))d\lambda \quad \text{WITH-GAS BACKGROUND SIGNAL}$$

$$I_{no\_gas} = \int_{\lambda_1}^{\lambda_2} P_{back}\tau_{air}(\lambda) + B(T_{air},\lambda)(1-\tau_{air}(\lambda))d\lambda \quad \text{WITHOUT-GAS BACKGROUND SIGNAL}$$

$B(T,\lambda)$    ABSOLUTE TEMPERATURE T, BLACK BODY LUMINANCE AT WAVELENGTH $\lambda$
$P_{back}$    BACKGROUND OBJECT INFRARED INTENSITY
$\tau_{air}(\lambda)$    ATMOSPHERIC AIR SPECTRAL TRANSMITTANCE
$\tau_{gas}(\lambda) = \exp(-\alpha(\lambda)ct)$    GAS SPECTRAL TRANSMITTANCE
$\alpha(\lambda)$    GAS SPECTRAL ABSORPTION
$ct$    CONCENTRATION LENGTH
$\lambda$    WAVELENGTH

FLOW OF CALCULATION PROCESSING:

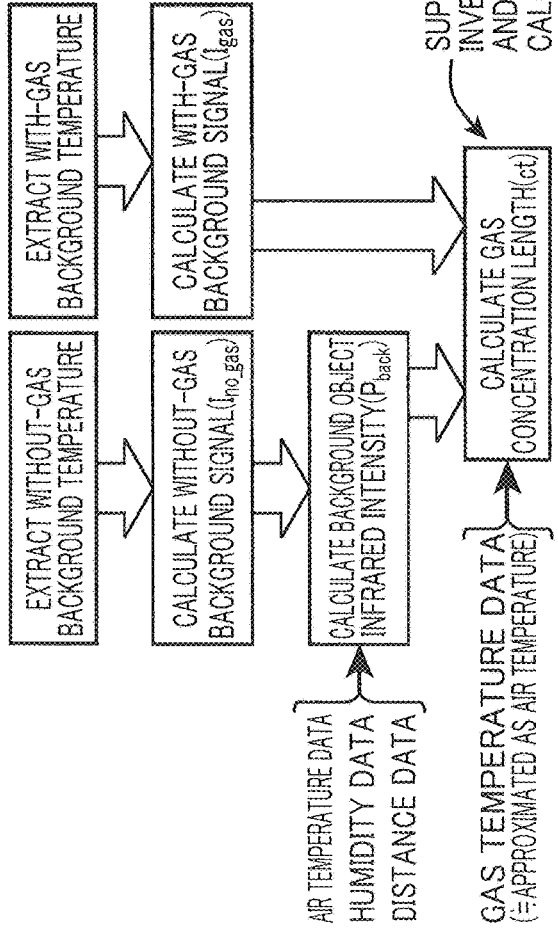

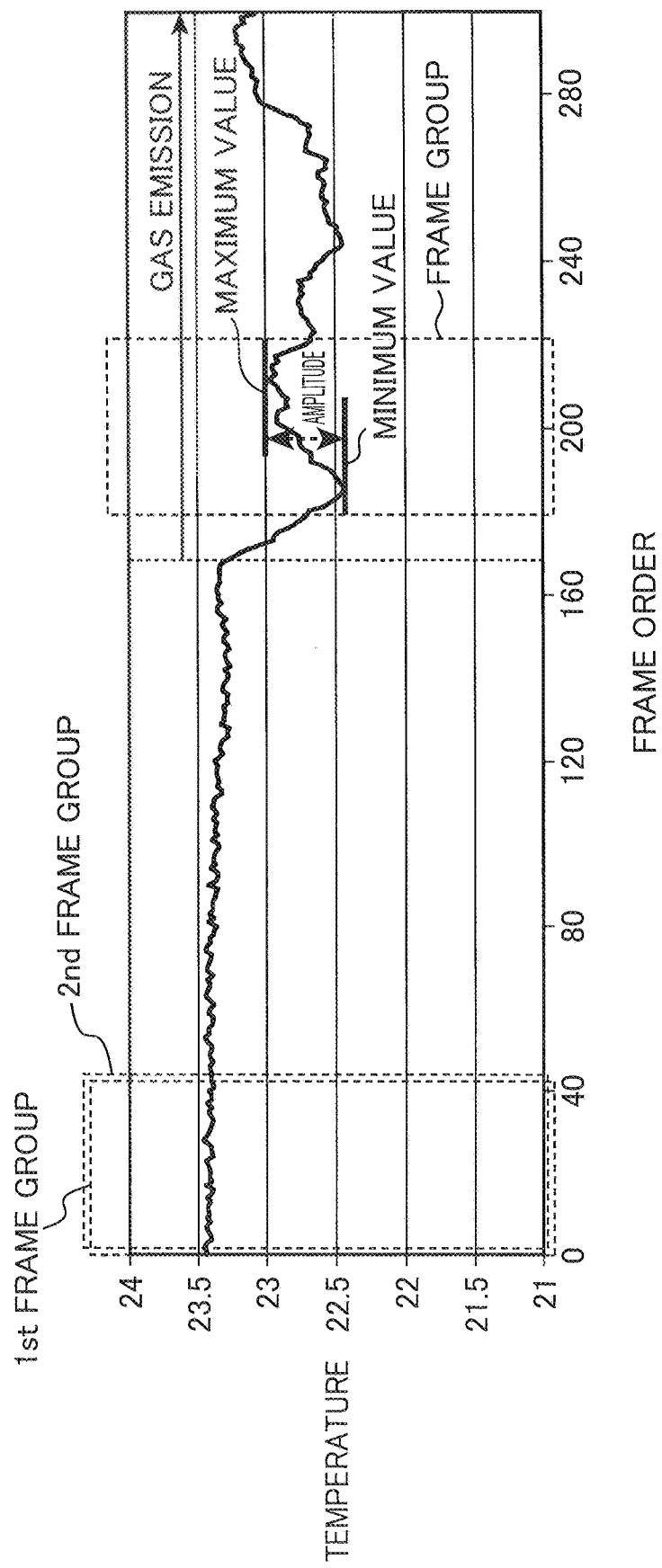

GAS TEMPERATURE < WITH-GAS BACKGROUND TEMPERATURE < WITHOUT-GAS BACKGROUND TEMPERATURE

GAS TEMPERATURE > WITH-GAS BACKGROUND TEMPERATURE > WITHOUT-GAS BACKGROUND TEMPERATURE

FIG.23
PSEUDO IMAGE OF MOVING BODY IMAGE
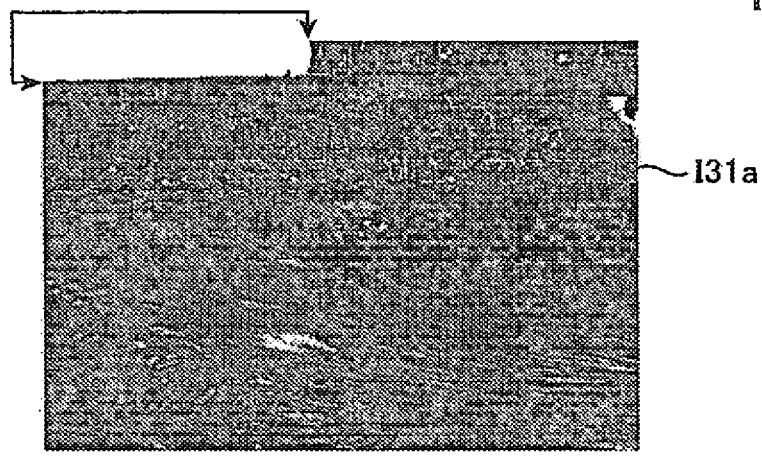
I31a
PSEUDO IMAGE OF MOVING BODY IMAGE
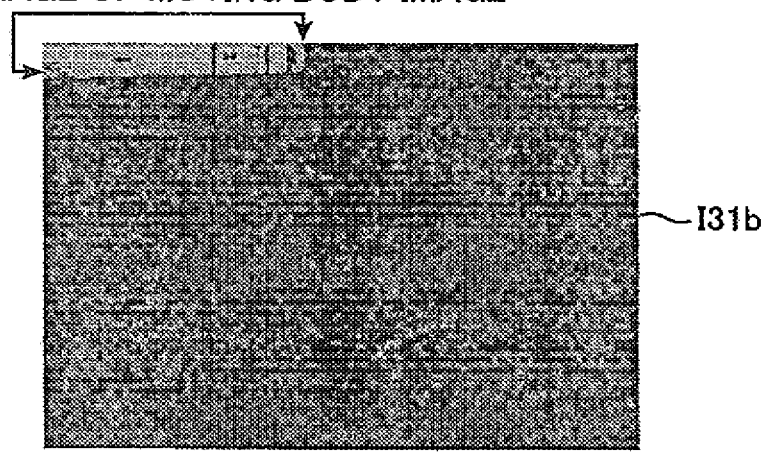
I31b
PSEUDO IMAGE OF MOVING BODY IMAGE
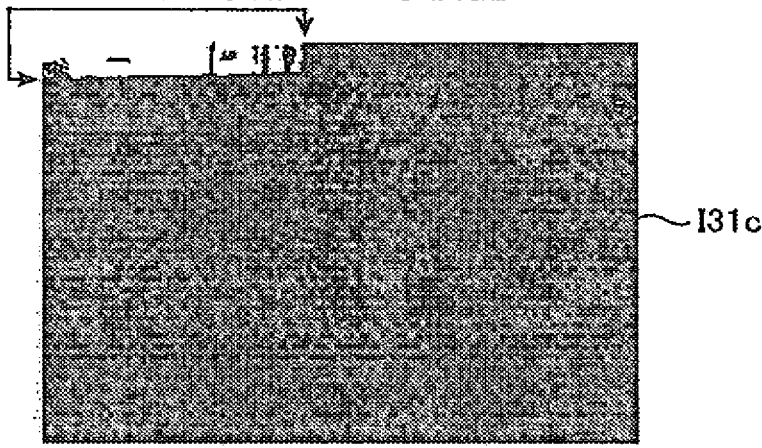
I31c FIG.26
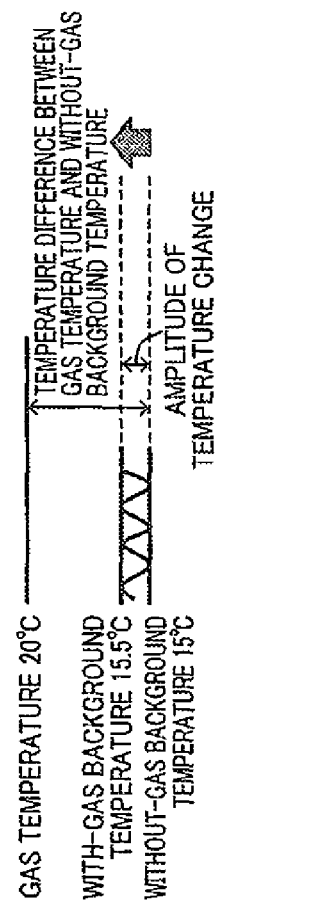
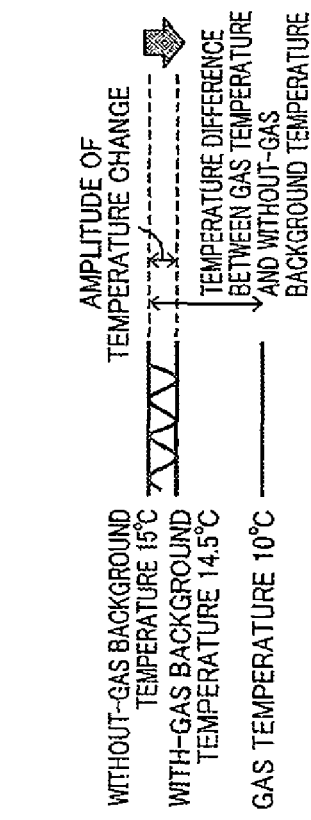

FIG.28
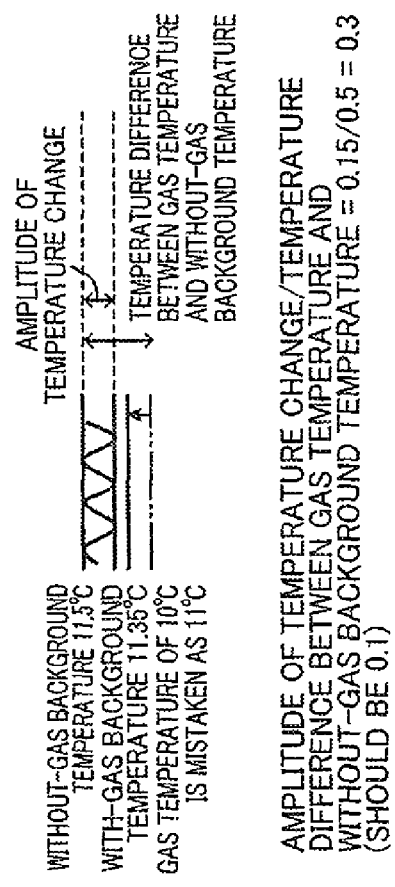
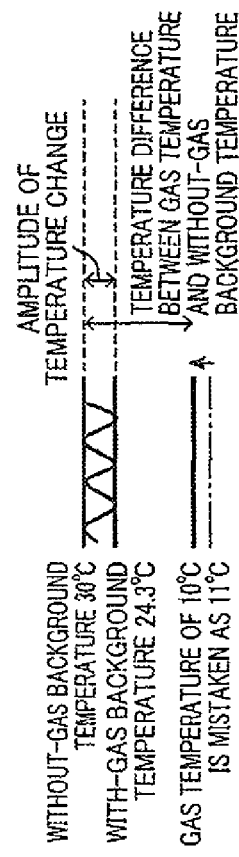

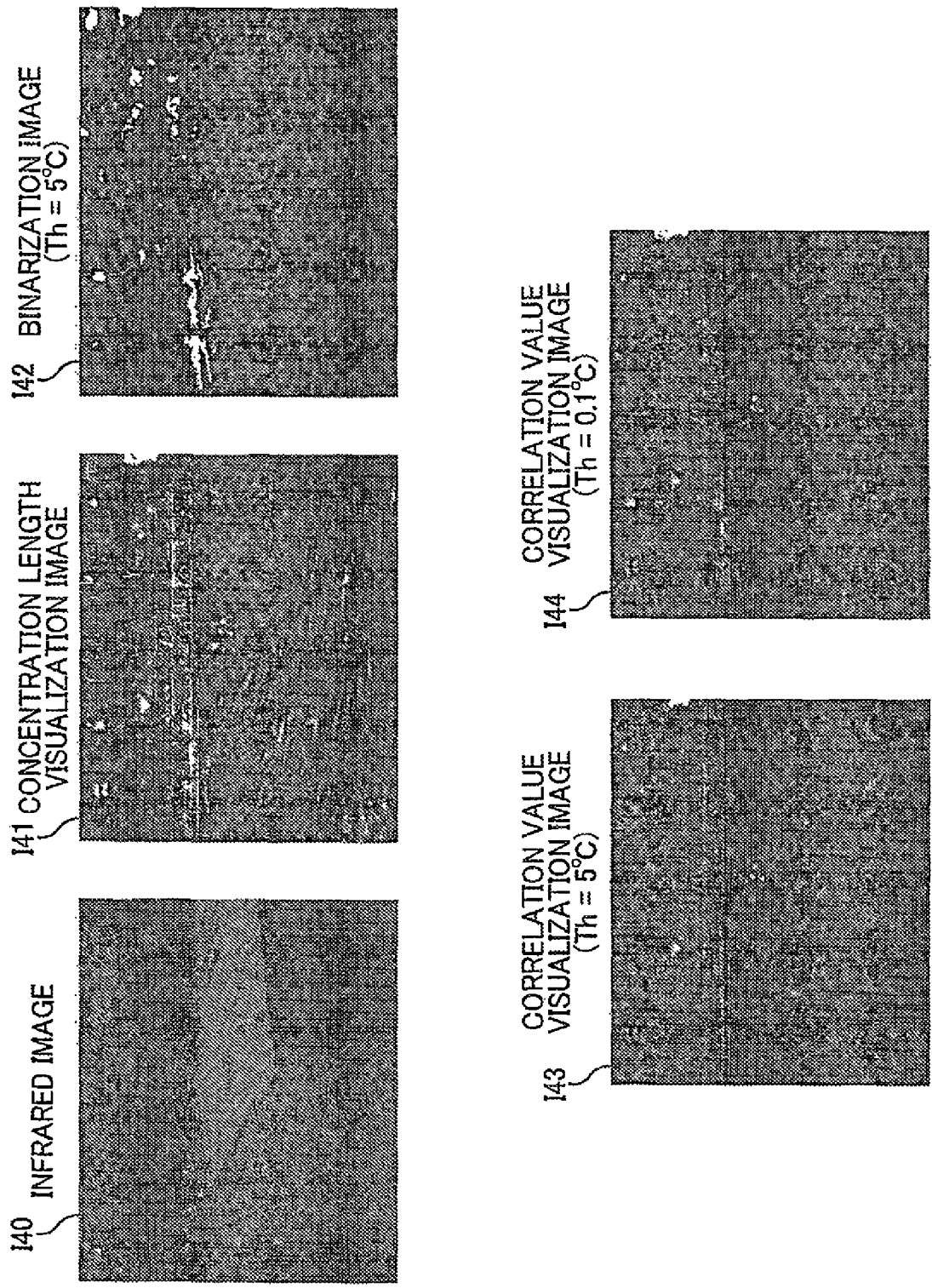

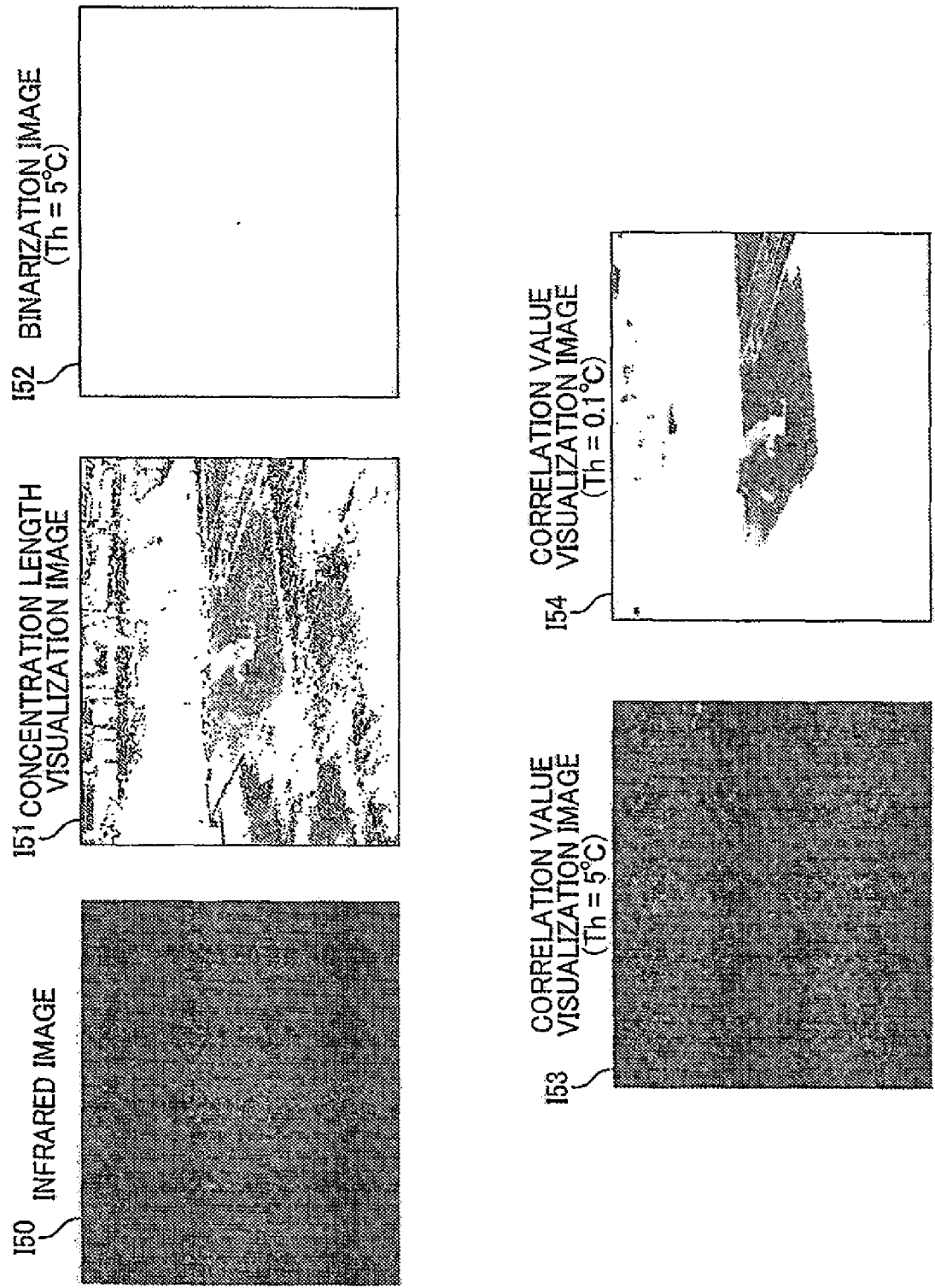

FIG.37
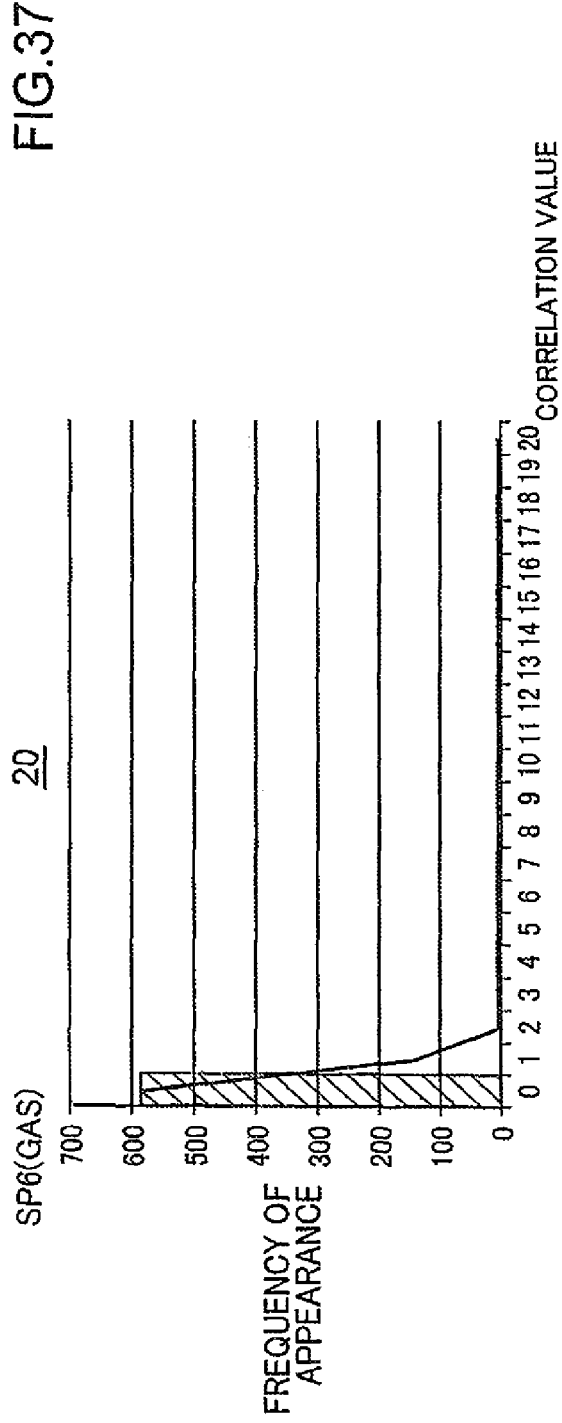
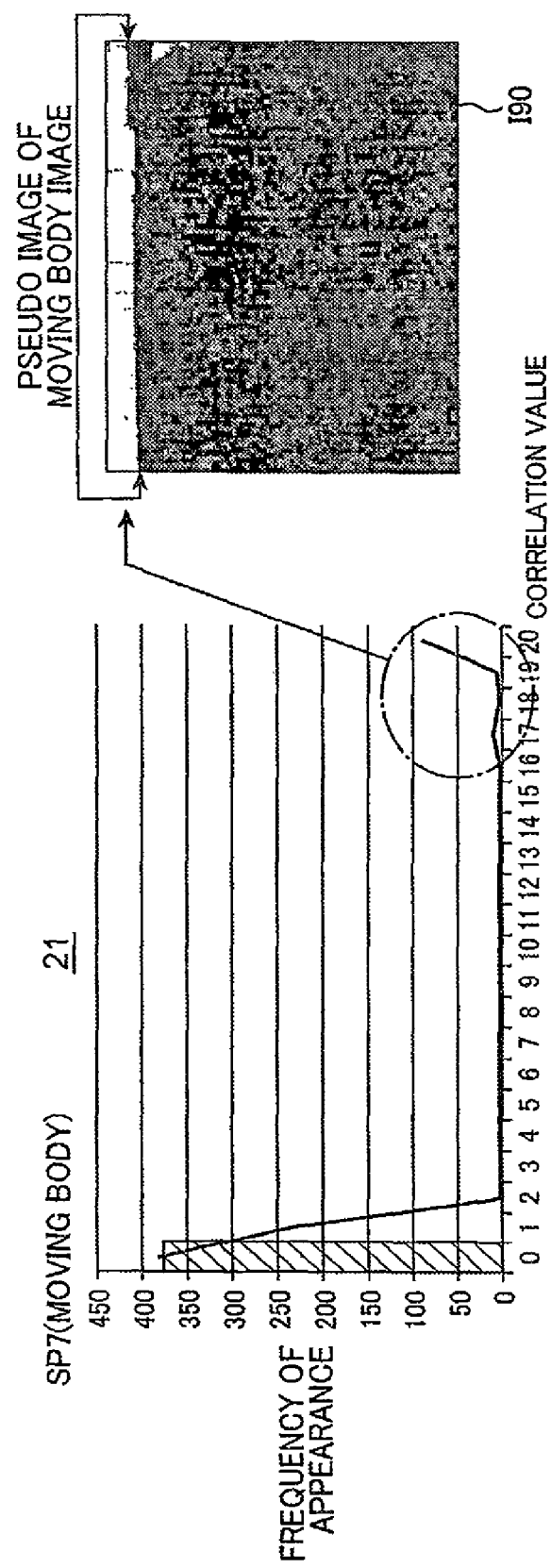

IMAGE PROCESSING DEVICE FOR GAS DETECTION, IMAGE PROCESSING METHOD FOR GAS DETECTION, IMAGE PROCESSING PROGRAM FOR GAS DETECTION, COMPUTER-READABLE RECORDING MEDIUM HAVING IMAGE PROCESSING PROGRAM FOR GAS DETECTION RECORDED THEREON, AND GAS DETECTION SYSTEM

TECHNICAL FIELD

The present invention relates to a technique for detecting gas by using an infrared camera.

BACKGROUND ART

When gas leakage occurs, a slight temperature change occurs at a spot where the gas having leaked is hanging. As a technique for performing gas detection by using this principle, gas detection by using infrared cameras is known.

For example, Patent Literature 1 discloses a gas leakage detection device including: an infrared camera that takes images of an inspection-target area; and an image processing unit that processes infrared images taken by the infrared camera, wherein the image processing unit includes a swaying extraction unit that extracts dynamic swaying due to gas leakage from a plurality of infrared images lined up in chronological order.

Further, Patent Literature 2 discloses a gas detection device including: a first infrared camera that measures an intensity of infrared light of a first wavelength region, the infrared light of the first wavelength region being absorbed by a detection target gas; a second infrared camera that measures an intensity of infrared light of a second wavelength region, the second wavelength region being composed of the first wavelength region and a wavelength region differing from the first wavelength region; and a determination unit that determines whether the detection target gas is present or not on the basis of a result measured by the first infrared camera and a result measured by the second infrared camera.

There exists a gas detection device that uses an infrared image of a gas leakage monitoring target, generates a monitoring image in which gas having leaked is shown as a gas image, and causes a display unit to display the monitoring image. According to this device, a spot where a slight temperature change brought about by gas having leaked is visualized and displayed as a gas image. In a monitoring image, however, an image of a moving body (human movement or a movement of an object such as grass, trees, etc.) can be observed, similarly to a gas image. Accordingly, in order to detect gas leakage in an unmanned and automatic manner, it is necessary to ensure that a gas image and a moving body image are not mistaken with one another.

CITATION LIST

Patent Literature

Patent Literature 1: JP 2012-58093 A
Patent Literature 2: JP 2011-237213 A

SUMMARY OF INVENTION

The present invention aims to provide a gas-detection image-processing device, a gas-detection image-processing method, a gas-detection image-processing program, a computer-readable recording medium having a gas-detection image-processing program recorded thereon, and a gas detection system that are capable of identifying, in a monitoring image generated by using an infrared image of a monitoring target, a gas image and a non-gas image.

Means for Solving Problem

A gas-detection image-processing device relating to a first aspect of the present invention achieving the above-described aim includes: a calculation unit; and an identification unit. The calculation unit calculates identification values respectively corresponding to a plurality of pixels constituting an infrared image of a monitoring target, the identification values being identification values for identifying a pixel constituting a gas image and a pixel constituting a non-gas image. The identification unit, on the basis of the identification values, identifies, in a monitoring image generated by using the infrared image, a pixel constituting the gas image and a pixel constituting the non-gas image.

These and other objects, features, and advantages of the present invention will become more apparent from the following detailed description of the present invention when taken in conjunction with the accompanying drawings.

BRIEF DESCRIPTION OF DRAWINGS

FIG. 1B is a block diagram showing a hardware configuration of the gas-detection image-processing device shown in FIG. 1A.

FIG. 3 is a flowchart describing a first mode of the present embodiment.

FIG. 4 is an image diagram showing, in chronological order, infrared images of an outdoor testing site taken under a condition in which gas leakage and a temperature change of the background are occurring concurrently.

FIG. 7 is a graph showing chronological pixel data D2 for a pixel corresponding to spot SP1 (FIG. 4), second frequency component data D3 extracted from the chronological pixel data D2, and third frequency component data D6 extracted from the chronological pixel data D2.

FIG. 8A is a graph showing first difference data D4.

FIG. 17 is an explanatory diagram describing a method for calculating gas concentration lengths.

FIG. 19 is a graph showing a relation between frame groups and the temperature change at spot SP4 (FIG. 15) of the testing site.

FIG. 23 is an image diagram showing various images generated by using gas concentration lengths.

FIG. 26 is an explanatory diagram describing problem <1> of a concentration length visualization image.

FIG. 28 is an explanatory diagram describing a case in which gas concentration length is actually great, and a case in which gas concentration length is great due to error.

FIG. 30 is an image diagram showing various images of a testing site taken during the daytime.

FIG. 31 is an image diagram showing various images of the testing site taken during the nighttime.

FIG. 37 is an explanatory diagram describing histograms generated by using the chronological correlation value data.

DESCRIPTION OF EMBODIMENT

Figure 1A:
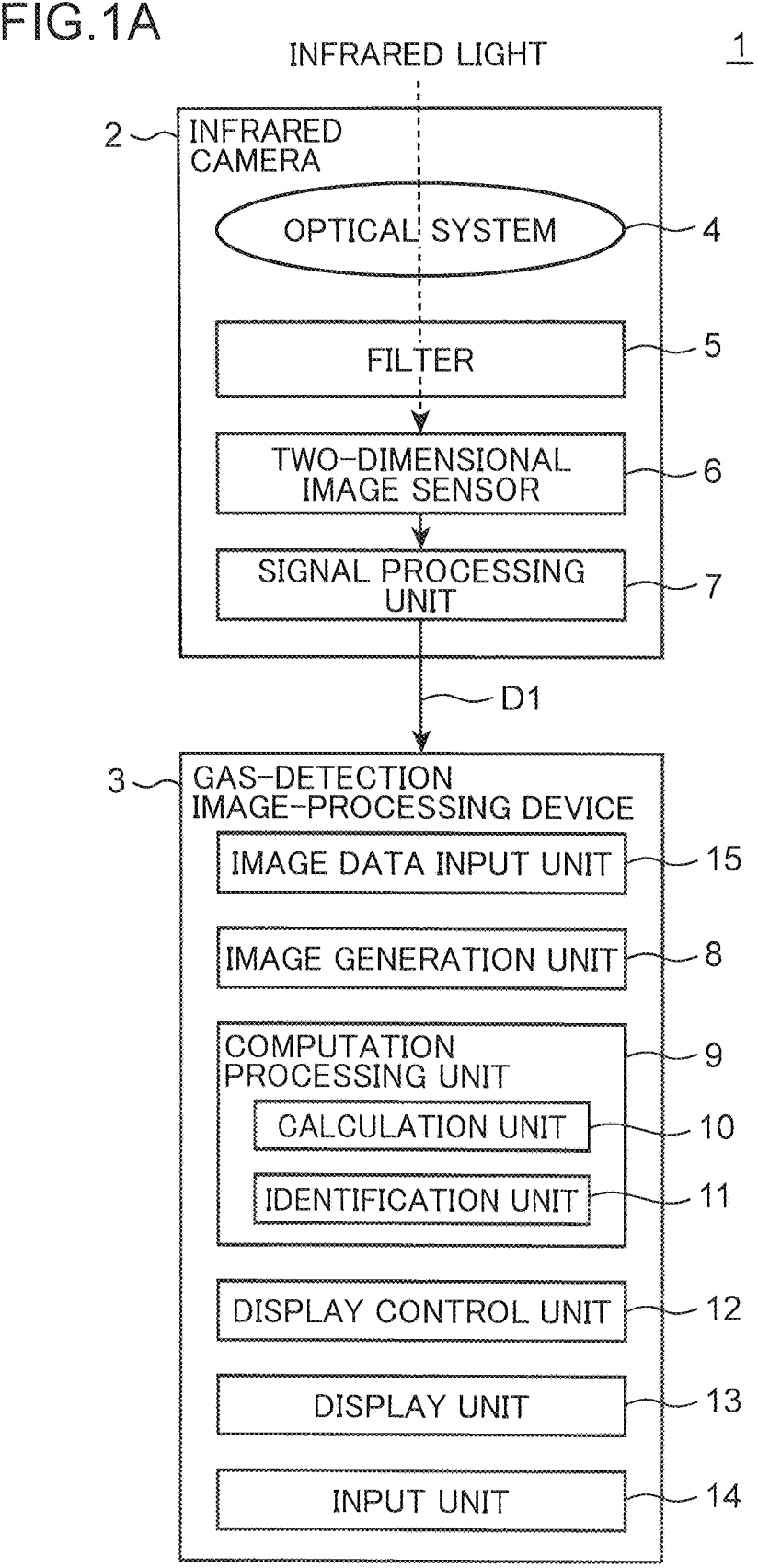
FIG. 1A is a block diagram of a gas detection system including a gas-detection image-processing device relating to the present embodiment.

In the following, an embodiment of the present invention is described in detail on the basis of the drawings. In the drawings, structures provided with the same symbol indicate the same structure, and regarding such a structure, description of matters already described is omitted.

FIG. 1A is a block diagram of a gas detection system 1 including a gas-detection image-processing device 3 relating to the present embodiment. The gas detection system 1 includes: an infrared camera 2; and the gas-detection image-processing device 3.

The infrared camera 2 takes a moving image of infrared images of a gas leakage monitoring target (for example, a connection point of gas transport pipes) and a background, and generates moving image data D1 representing the moving image. A moving image is one example of a plurality of infrared images lined up in chronological order. The image data is not limited to a moving image, and art infrared image of the gas leakage monitoring target and the background may be taken at a plurality of time points by using the infrared camera 2. The infrared camera 2 includes: an optical system 4; a filter 5; a two-dimensional image sensor 6; and a signal processing unit 7.

The optical system 4 forms infrared images of the imaging subject (the monitoring subject and the background) on the two-dimensional image sensor 6. The filter 5 is arranged between the optical system 4 and the two-dimensional image sensor 6, and allows only infrared light of a specific wavelength, in the light having passed through the optical system 4, to pass therethrough. The wavelength range within the infrared wavelength range to be allowed to pass through the filter 5 depends upon the type of gas to be detected. For example, in the case of methane gas, a filter 5 allowing a wavelength range of 3.2 to 3.4 μm to pass therethrough is used. The two-dimensional image sensor 6 is, for example, a cooled-type indium antimonide (InSb) image sensor, and receives infrared light having passed through the filter 5. The signal processing unit 7 converts analog signals output from the two-dimensional image sensor 6 into digital signals, and performs known image processing. These digital signals become the moving image data D1.

Figure 2:
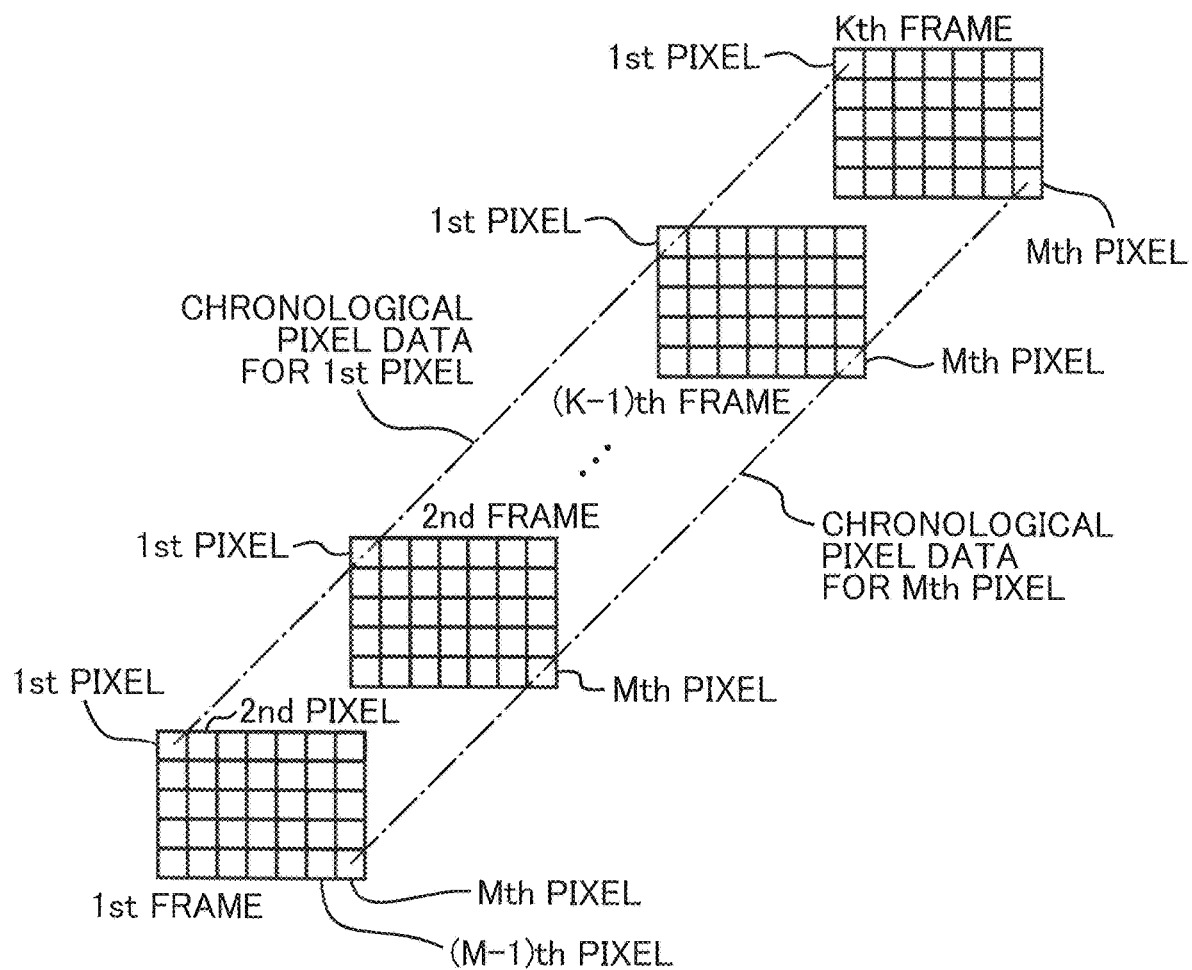
FIG. 2 is an explanatory diagram describing chronological pixel data.

The moving image represented by the moving image data D1 (image data) has a structure in which a plurality of frames are lined up in chronological order. Data in which pieces of pixel data for pixels located at the same spatial position in the plurality of frames are lined up in chronological order is referred to as chronological pixel data. The chronological pixel data is described specifically. FIG. 2 is an explanatory diagram describing the chronological pixel data. Suppose that the number of frames of the moving image of infrared images is K. Suppose each frame is constituted of an M number of pixels, namely a 1st pixel, a 2nd pixel, . . . , an (M−1)th pixel, and an Mth pixel. Pixel data indicates luminance or temperature at the pixel.

Pixels located at the same spatial position in the plurality of (K number of) frames refer to pixels of the same ordinal position. For example, when providing description based on the 1st pixel, the chronological pixel data for the 1st pixel is data in which the pixel data for the 1st pixel included in the 1st frame, the pixel data for the 1st pixel included in the 2nd frame, . . . , the pixel data for the 1st pixel included in the (K−1)th frame, and the pixel data for the 1st pixel included in the Kth frame are lined up in chronological order. The number of pieces of chronological pixel data is equal to the number of pixels constituting a single frame, and the moving image data D1 is constituted of the plurality of (M pieces of) chronological pixel data.

With reference to FIG. 1A, the gas-detection image-processing device 3 is a personal computer, a smartphone, a tablet terminal, or the like, and includes as functional blocks: an image generation unit 8; a computation processing unit 9; a display control unit 12; a display unit 13; an input unit 14; and an image data input unit 15.

The image data input unit 15 is a communication interface that communicates with a communication unit (not shown in the drawings) of the infrared camera 2. The image data input unit 15 receives input of the moving image data D1 transmitted thereto from the communication unit of the infrared camera 2. The moving image data D1 is one example of image data. Image data is data representing a plurality of infrared images yielded by an image of the gas leakage monitoring target being taken at a plurality of time points. The image data input unit 15 transmits the moving image data D1 to the image generation unit 8, the computation processing unit 9, and the display control unit 12.

The image generation unit 8, the computation processing unit 9, and the display control unit 12 are realized by using a central processing unit (CPU), a random access memory (RAM), a read-only memory (ROM), a hard disk drive (HDD), etc.

The image generation unit 8 performs predetermined image processing with respect to the moving image data D1 and generates predetermined images (for example, monitoring images).

The computation processing unit 9 performs various types of computation necessary for image processing for gas detection. The computation processing unit 9 includes: a calculation unit 10; and an identification unit 11. Description regarding these units is provided later.

The display control unit 12 causes the display unit 13 to display the predetermined images generated by the image generation unit 8. The display unit 13 is, for example, realized by using a liquid crystal display.

The input unit 14 is realized by using a keyboard or a touch panel, and receives various types of input related to gas detection.

FIG. 1B is a block diagram showing a hardware configuration of the gas-detection image-processing device 3 shown in FIG. 1A. The gas-detection image-processing device 3 includes: a CPU 3a; a RAM 3b; a ROM 3c; a HDD 3d; a liquid crystal display 3e; a communication interface 3f; a keyboard, etc. 3g; and a bus 3h connecting such components. The liquid crystal display 3e is the hardware realizing the display unit 13. An organic light emitting diode display (an organic EL display), a plasma display, or the like may be used in place of the liquid crystal display 3e. The communication interface 3f is the hardware realizing the image data input unit 15. The keyboard, etc. 3g is the hardware realizing the input unit 14.

The HDD 3d stores therein programs for realizing functional blocks, namely the image generation unit 8, the computation processing unit 9, and the display control unit 12. The program realizing the image generation unit 8 is a processing program that acquires the moving image data D1 (the image data) and performs the above-described predetermined processing (for example, processing for generating monitoring images) on the moving image data D1. The program realizing the computation processing unit 9 is a computation program that performs various types of computation necessary for image processing for gas detection. The program realizing the display control unit 12 is a display control program that causes the display unit 13 to display images (for example, the predetermined images having been generated by the image generation unit 8). These programs may be stored in the ROM 3c instead of the HDD 3d.

The CPU 3a reads, from the HDD 3d, the processing program, the computation program, and the display control program, causes the RAM 3b to decompress the programs, and executes the decompressed programs, whereby the functional blocks are realized. The processing program, the computation program, and the display control program are stored in the HDD 3d in advance. The programs, however, need not be stored in the HDD 3d in advance. For example, a recording medium (for example, an external recording medium such as a magnetic disk or an optical disk) having these programs recorded thereon may be prepared, and the programs stored on the recording medium may be stored to the HDD 3d. Alternatively, these programs may be stored in a server that is connected to the gas-detection image-processing device 3 via a network, and may be transmitted to the HDD 3d via the network and stored to the HDD 3d.

Note that the gas-detection image-processing device 3 has the first to fourth modes as described next. These modes are each constituted of a plurality of elements. Hence, the HDD 3d has stored therein programs for realizing these elements. For example, the first mode of the gas-detection image-processing device 3 includes, as elements: a calculation unit; and an identification unit. The HDD 3d has stored therein programs for realizing the calculation unit and the identification unit. These programs are referred to as a calculation program and an identification program.

These programs are referred to by using the definitions of the elements. Description is provided taking the calculation unit and the calculation program as an example. The calculation unit calculates identification values respectively corresponding to a plurality of pixels constituting an infrared image of a monitoring target, the identification values being identification values for identifying a pixel constituting a gas image and a pixel constituting a non-gas image. The calculation program is a program that calculates identification values respectively corresponding to a plurality of pixels constituting an infrared image of a monitoring target, the identification values being identification values for identifying a pixel constituting a gas image and a pixel constituting a non-gas image.

FIG. 3 described later is a flowchart of these programs executed by the CPU 3a (the calculation program and the identification program).

As described above, the present embodiment has the first to fourth modes. FIG. 3 is a flowchart describing the first mode of the present embodiment. The first mode is constituted of: processing for generating monitoring images (step S100); processing for calculating gas concentration lengths (step S101); and processing for identifying pixels included in a monitoring image that constitute a gas image and pixels included in the monitoring image that constitute an image of a moving body, other than a gas image (step S102). An image of a moving body other than a gas image may be simply referred to as a "moving body image" in the following. A monitoring image is an image generated by using an infrared image of the monitoring target, and when gas is leaking from the monitoring target, includes a gas image visualizing the gas having leaked.

Description is provided of gas concentration lengths (may be simply referred to as "concentration lengths" in the following). When gas leakage is detected, it is necessary that the degree of danger of the gas (for example, the possibility of explosion) be determined. The degree of danger of gas can be determined from gas concentration at the spot where the gas is hanging. However, gas concentration at a spot where gas is hanging cannot be directly measured through remote gas detection using infrared cameras, and measurement of gas concentration lengths is performed. A gas concentration length indicates a value yielded through integration of gas concentration along a depth direction of a spot where the gas is hanging.

The first mode of the present embodiment can be understood by reading only the [Processing for Identifying Pixels constituting Gas image and Pixels constituting Moving Body Image other than Gas Image] section without reading the following [Processing for Generating Monitoring Images] and [Processing for Calculating Gas Concentration Lengths] sections, because it is also possible to use publicly-known methods for the generation of monitoring images and the calculation of concentration lengths.

[Processing for Generating Monitoring Images]

There are various methods for generating monitoring images. Here, description is provided of one example of a monitoring image generation method. A monitoring image is generated by using an infrared image of a monitoring target and a background.

The inventors of the present invention have found that, in gas detection using infrared images, the state of gas leaking cannot be displayed by using images without taking a temperature change of the background in consideration, when gas leakage and the temperature change of the background are occurring concurrently and the temperature change of the background is greater than the temperature change brought about by the gas having leaked. Detailed description is provided regarding this point.

FIG. 4 is an image diagram showing, in chronological order, infrared images of an outdoor testing site taken under a condition in which gas leakage and a temperature change of the background are occurring concurrently. These infrared images have been yielded by taking a moving image by using an infrared camera. At the testing site, there is a spot SP1 capable of causing gas emission. Spot SP2 from which gas is not emitted is shown for comparison with spot SP1.

Image I1 is an infrared image of the testing site taken at time point T1, which is immediately before sunlight is blocked by a cloud. Image I2 is an infrared image of the testing site taken at time point T2, which is five seconds after time point T1. The background temperature is lower at time point T2 compared to at time point T1 because sunlight is being blocked by a cloud.

Image I3 is an infrared image of the testing site taken at time point T3, which is ten seconds after time point T1. The state in which sunlight is blocked by a cloud is continuing from time point T2 to time point T3. Hence, the background temperature is lower at time point T3 compared to at time point T2.

Image I4 is an infrared image of the testing site taken at time point T4, which is fifteen seconds after time point T1. The state in which sunlight is blocked by a cloud is continuing from time point T3 to time point T4. Hence, the background temperature is lower at time point T4 compared to at time point T3.

Background temperature has decreased by approximately 4° C. during the 15 seconds from time point T1 to time point T4. Due to this, image I4 is darker than image I1 on the whole, and it can be observed that the background temperature has decreased.

Gas emission is started at spot SP1 at a time point after time point T1 and before time point T2. The temperature change brought about by the emitted gas is very small (approximately 0.5° C.). Due to this, at time point T2, time point T3, and time point T4, while gas emission is occurring at spot SP1, the temperature change of the background is far greater than the temperature change brought about by the emitted gas, and thus, the state of gas being emitted from spot SP1 cannot be observed in images I2, I3, and I4.

Figure 5A:
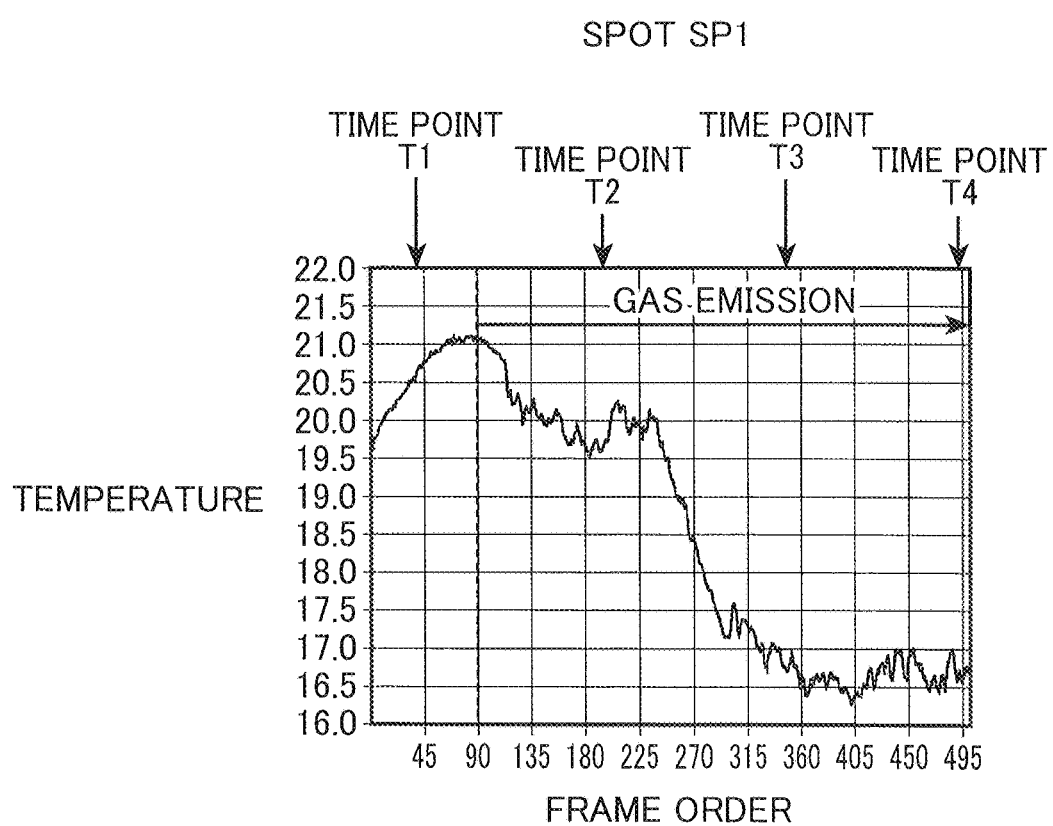
FIG. 5A is a graph showing a temperature change at spot SP1 of the testing site.
Figure 5B:
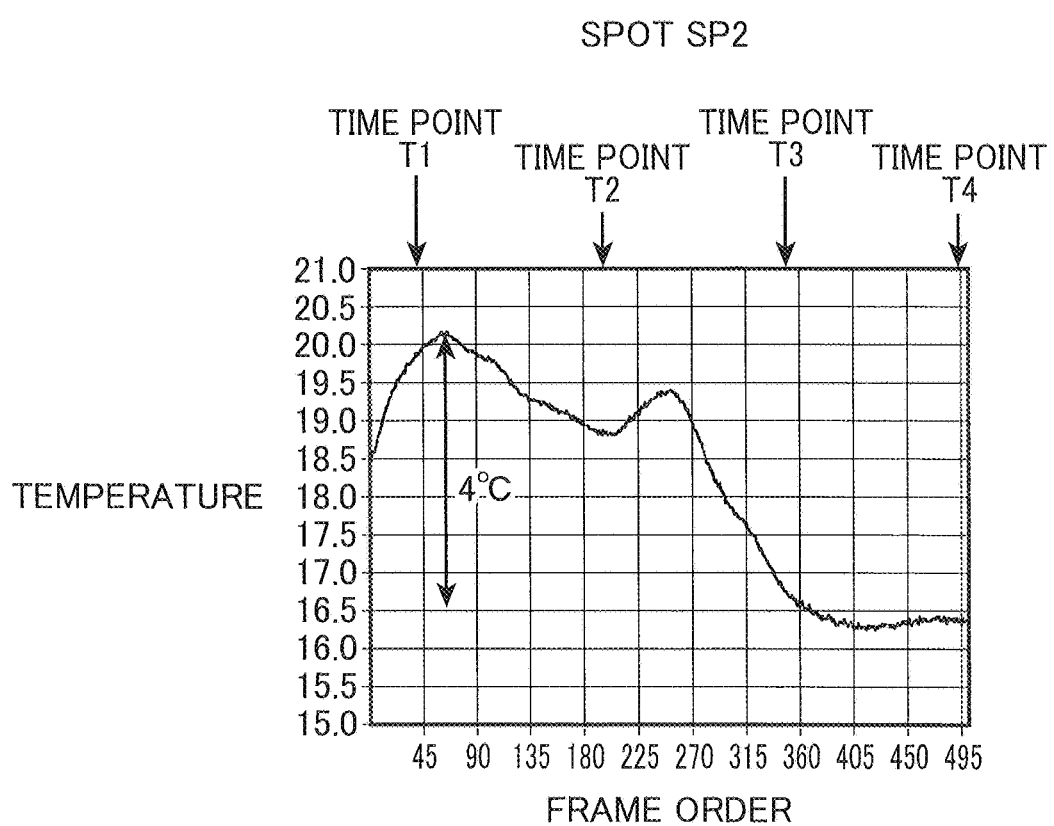
FIG. 5B is a graph showing a temperature change at spot SP2 of the testing site.

FIG. 5A is a graph showing a temperature change at spot SP1 of the testing site, and FIG. 5B is a graph showing a temperature change at spot SP2 of the testing site. The vertical axes of these graphs indicate temperature. The horizontal axes of these graphs indicate frame order. For example, "45" indicates the 45th frame. The frame rate is 30 fps. Hence, the time from the 1st frame to the 450th frame is 15 seconds.

The graph showing the temperature change at spot SP1 and the graph showing the temperature change at spot SP2 differ. The temperature change at spot SP2 indicates the temperature change of the background because gas emission is not occurring at spot SP2. Meanwhile, gas is hanging at spot SP1 because gas emission is occurring at spot SP1. Due to this, the temperature change at spot SP1 indicates a temperature change yielded by adding the temperature change of the background and the temperature change brought about by gas having leaked.

It can be observed that gas is being emitted from spot SP1 (that is, that gas leakage is occurring at spot SP1) from the graph shown in FIG. 5A. However, as described above, it cannot be observed that gas is being emitted from spot SP1 (that is, it cannot be observed that gas leakage is occurring at spot SP1) from images I2, I3, and I4 shown in FIG. 4.

Hence, when the temperature change of the background is far greater than the temperature change brought about by the emitted gas (the gas having leaked), the state of gas being emitted from spot SP1 cannot be observed in images I2, I3, and I4 shown in FIG. 4.

The reason for this is because the moving image data D1 (FIG. 1A) includes, in addition to first frequency component data indicating the temperature change brought about by gas having leaked, second frequency component data that has lower frequency than that of the first frequency component data and indicates the change in the background temperature. The image represented by the first frequency component data becomes impossible to see because of the image (the change in light and shade of the background) represented by the second frequency component data. With reference to FIGS. 5A and 5B, the small changes included in the graph showing the temperature change at spot SP1 correspond to the first frequency component data. The graph showing the temperature change at spot SP2 corresponds to the second frequency component data.

In view of this, the image generation unit 8 (FIG. 1A) generates, from the moving image data D1, a plurality of pieces of chronological pixel data associated with different pixel positions (that is, a plurality of pieces of chronological pixel data constituting the moving image data D1) and performs processing for removing the second frequency component data with respect to each of the plurality of pieces of chronological pixel data. With reference to FIG. 2, the plurality of pieces of chronological pixel data associated with different pixel positions refer to the chronological pixel data for the 1st pixel, the chronological pixel data for the 2nd pixel, . . . , the chronological pixel data for the (M−1)th pixel, and the chronological pixel data for the Mth pixel.

Frequency component data that has higher frequency than that of the first frequency component data and indicates high frequency noise is referred to as third frequency component data. In addition to processing for removing the second frequency component data, the image generation unit 8 performs processing for removing the third frequency component data, with respect to each of the plurality of pieces of chronological pixel data constituting the moving image data D1.

Hence, the unit in which the image generation unit 8 performs processing for removing the second frequency component data and the third frequency component data is not each frame, and rather, is each piece of chronological pixel data.

Figure 6:
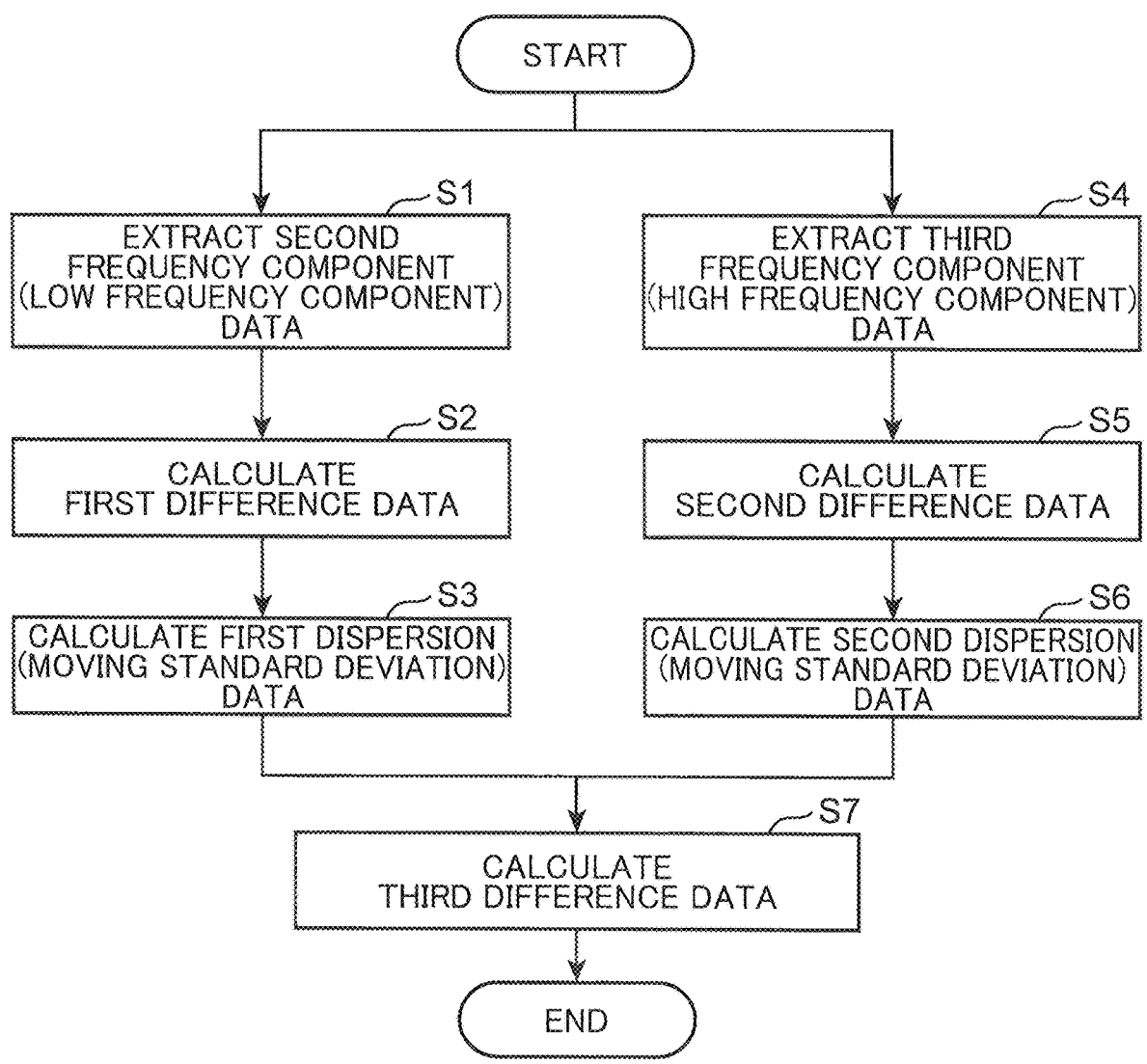
FIG. 6 is a flowchart describing processing for generating monitoring images (step S100 of FIG. 3).
Figure 10:
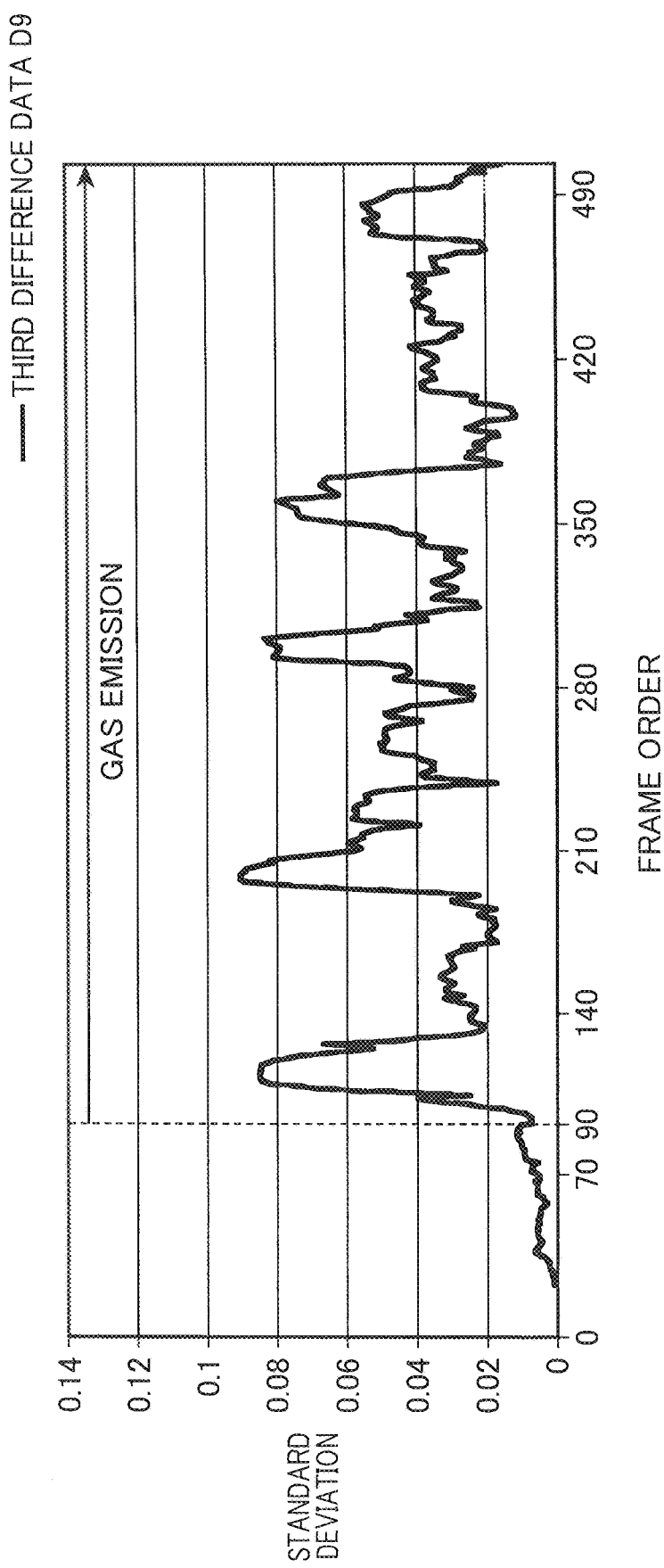
FIG. 10 is a graph showing third difference data D9.

FIG. 6 is a flowchart describing the processing for generating monitoring images, the processing indicated by step S100 of FIG. 3. With respect to pixel data included in the chronological pixel data, chronological pixel data before predetermined processing is performed is referred to as first chronological pixel data, and chronological pixel data after the predetermined processing is performed is referred to as second chronological pixel data. The predetermined processing refers to processing for generating monitoring images, images visualizing concentration lengths, etc. Chronological pixel data D2 shown in later-described FIG. 7 is first chronological pixel data, and third difference data D9 shown in later-described FIG. 10 is second chronological pixel data. The chronological pixel data shown in FIG. 2 corresponds to first chronological pixel data when the predetermined processing has not yet been performed with respect to pixel data therein, and corresponds to second chronological pixel data when the predetermined processing has been performed with respect to the pixel data therein.

The image generation unit 8 extracts, as second frequency component data, data extracted from first chronological pixel data by calculating a simple moving average in units of a first predetermined number of frames, which is less than the K number of frames shown in FIG. 2, with respect to the first chronological pixel data, and extracts M pieces of second frequency component data respectively corresponding to the M pieces of chronological pixel data shown in FIG. 2 (step S1).

The first predetermined number of frames, for example, is 21 frames. The 21 frames can be classified into a target frame, ten consecutive frames before the target frame, and ten consecutive frames after the target frame. The first predetermined number of frames may be any number of frames with which second frequency component data can be extracted from chronological pixel data, and is not limited to 21 and may be more or less than 21.

The image generation unit 8 extracts, as third frequency component data, data extracted from the first chronological pixel data by calculating a simple moving average in units of a third predetermined number of (for example, 3) frames, which is less than the first predetermined number (for example, 21), with respect to the first chronological pixel data, and extracts M pieces of third frequency component data respectively corresponding to the M pieces of chronological pixel data shown in FIG. 2 (step S4).

FIG. 7 is a graph showing chronological pixel data D2 for the pixel corresponding to spot SP1 (FIG. 4), second frequency component data D3 extracted from the chronological pixel data D2, and third frequency component data D6 extracted from the chronological pixel data D2. The vertical and horizontal axes of the graph are the same as the vertical and horizontal axes of the graph shown in FIG. 5A. The temperature indicated by the chronological pixel data D2 changes relatively quickly (the cycle of change is relatively short), and the temperature indicated by the second frequency component data D3 changes relatively moderately (the cycle of change is relatively long). The third frequency component data D6 and the chronological pixel data D2 appear to be almost overlapping with one another.

The third predetermined number of frames, for example, is 3 frames. The 3 frames can be classified into a target frame, one frame immediately before the target frame, and one frame immediately after the target frame. The third predetermined number of frames may be any number of frames with which third frequency component data can be extracted from chronological pixel data, and is not limited to 3 and may be more than 3.

The image generation unit 8 calculates, as first difference data, data acquired by calculating a difference between the first chronological pixel data and the second frequency component data extracted from the first chronological pixel data, and calculates M pieces of first difference data respectively corresponding to the M pieces of chronological pixel data (step S2).

The image generation unit 8 calculates, as second difference data, data acquired by calculating a difference between the first chronological pixel data and the third frequency component data extracted from the first chronological pixel data, and calculates M pieces of second difference data respectively corresponding to the M pieces of chronological pixel data (step S5).

Figure 8B:
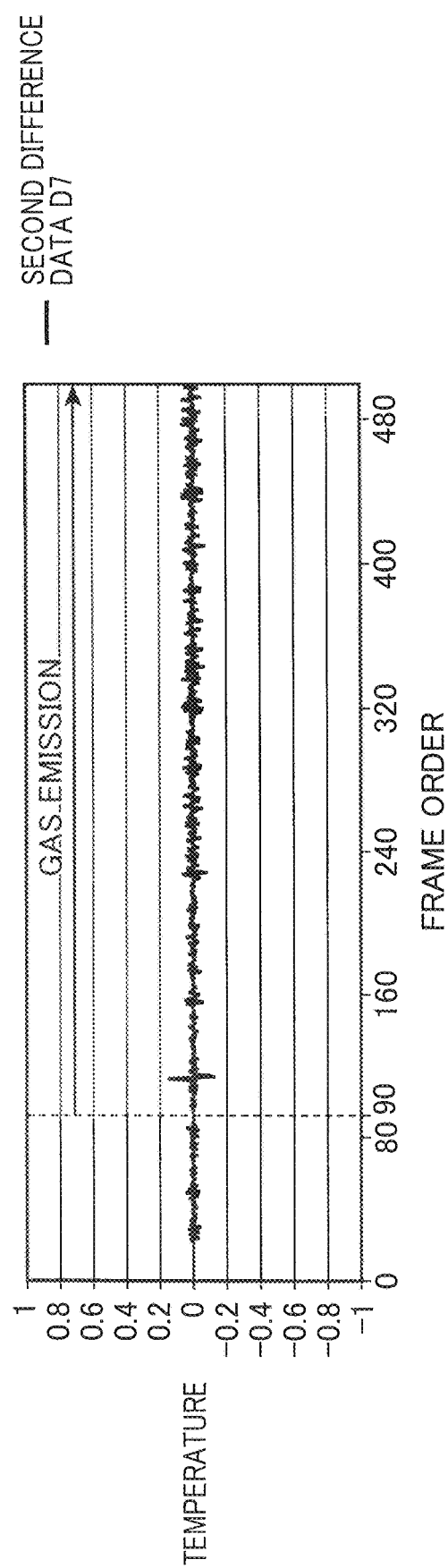
FIG. 8B is a graph showing second difference data D7.

FIG. 8A is a graph showing first difference data D4, and FIG. 8B is a graph showing second difference data D7. The vertical and horizontal axes of the graphs are the same as the vertical and horizontal axes of the graph shown in FIG. 5A. The first difference data D4 is data acquired by calculating a difference between the chronological pixel data D2 and the second frequency component data D3, the chronological pixel data D2 and the second frequency component data D3 being shown in FIG. 7. The repetition of minute oscillations indicated by the first difference data D4 before the start of gas emission at spot SP1 in FIG. 5A (up to around the 90th frame) mainly indicates sensor noise of the two-dimensional image sensor 6. The irregularity in amplitude and waveform of the first difference data D4 becomes greater after the start of gas emission at spot SP1 (the 90th frame and on).

The second difference data D7 is data acquired by calculating a difference between the chronological pixel data D2 and the third frequency component data D6, the chronological pixel data D2 and the third frequency component data D6 being shown in FIG. 7.

The first difference data D4 includes the first frequency component data (the data indicating the temperature change brought about by gas having leaked) and the third frequency component data D6 (the data indicating high frequency noise). The second difference data D7 does not include the first frequency component data and includes the third frequency component data D6.

Because the first difference data D4 includes the first frequency component data, the irregularity in amplitude and waveform of the first difference data D4 becomes greater after the start of gas emission at spot SP1 (the 90th frame and on). Meanwhile, this does not apply to the second difference data D7, because the second difference data D7 does not include the first frequency component data. The second difference data D7 repeats minute oscillations. The minute oscillations correspond to high frequency noise.

There is a correlation between the first difference data D4 and the second difference data D7, but the correlation is not complete. That is, there may be cases in which, in a given frame, the value of the first difference data D4 is positive and the value of the second difference data D7 is negative, or vice versa. Hence, the third high frequency component data D6 cannot be removed by calculating a difference between the first difference data D4 and the second difference data D7. In order to remove the third high frequency component data D6, it is necessary to convert the first difference data D4 and the second difference data D7 into values subtraction of which is possible, such as absolute values.

The image generation unit 8 calculates, as first dispersion data, data acquired by calculating a moving standard deviation in units of a second predetermined number of frames that is less than the K number of frames with respect to the first difference data, and calculates M pieces of first dispersion data respectively corresponding to the M pieces of chronological pixel data (step S3). Note that a moving variance may be calculated in place of a moving standard deviation.

The image generation unit 8 calculates, as second dispersion data, data acquired by calculating a moving standard deviation in units of a fourth predetermined number of (for example, 21) frames that is less than the K number of frames with respect to the second difference data, and calculates M pieces of second dispersion data respectively corresponding to the M pieces of chronological pixel data (step S6). Note that a moving variance may be used in place of a moving standard deviation.

Figure 9:
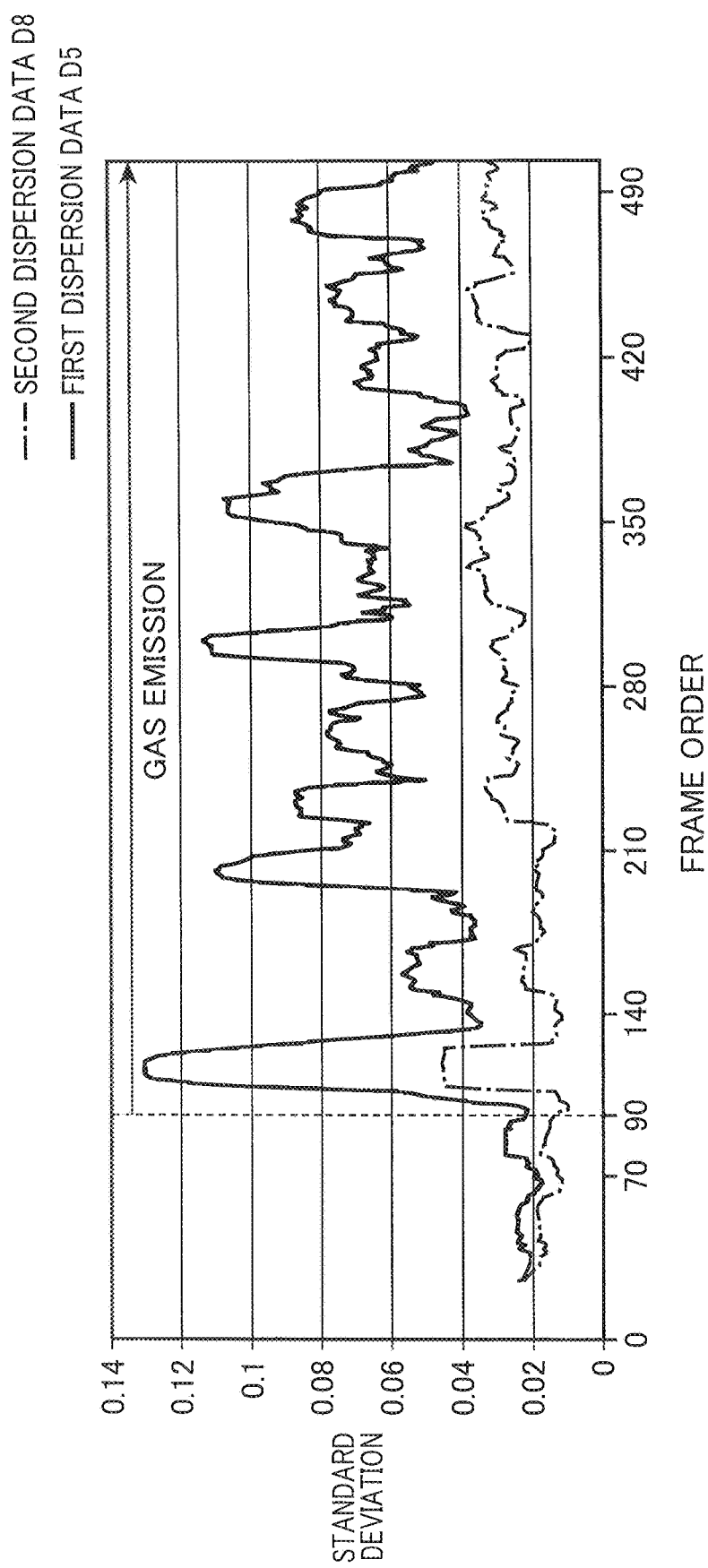
FIG. 9 is a graph showing first dispersion data D5 and second dispersion data D8.

FIG. 9 is a graph showing first dispersion data D5 and second dispersion data D8. The horizontal axis of the graph is the same as the horizontal axis of the graph shown in FIG. 5A. The vertical axis of the graph indicates a standard deviation. The first dispersion data D5 is data indicating a moving standard deviation of the first difference data D4 shown in FIG. 8A. The second dispersion data D8 is data indicating a moving standard deviation of the second difference data D7 shown in FIG. 8B. The number of frames used for the calculation of a moving standard deviation is 21 for both the first dispersion data D5 and the second dispersion data D8. However, the number is not limited to 21, as long as a standard deviation that is statistically significant can be calculated by using the number.

Since each of the first dispersion data D5 and the second dispersion data D8 is a standard deviation, the first dispersion data D5 and the second dispersion data D8 do not include negative values. Hence, the first dispersion data D5 and the second dispersion data D8 can be regarded as data yielded by respectively converting the first difference data D4 and the second difference data D7 so that subtraction thereof is possible.

The image generation unit 8 calculates, as third difference data, data acquired by calculating a difference between the first dispersion data and the second dispersion data that are acquired from the same chronological pixel data, and calculates M pieces of third difference data respectively corresponding to the M pieces of chronological pixel data (step S7).

FIG. 10 is a graph showing third difference data D9. The horizontal axis of the graph is the same as the horizontal axis of the graph shown in FIG. 5A. The vertical axis of the graph indicates a standard deviation. The third difference data D9 is data indicating a difference between the first dispersion data D5 and the second dispersion data D8, the first dispersion data D5 and the second dispersion data D8 being shown in FIG. 9.

The image generation unit 8 outputs the M pieces of third difference data acquired in step S7 to the display control unit 12 as moving image data having been subjected to processing for removing the second frequency component data and the third frequency component data. The moving image represented by this moving image data becomes monitoring images. The display control unit 12 causes the display unit 13 to display the moving image represented by this moving image data. For example, image I15 shown in FIG. 11 and image I18 shown in FIG. 12 are examples of monitoring images included in this moving image.

Figure 11:
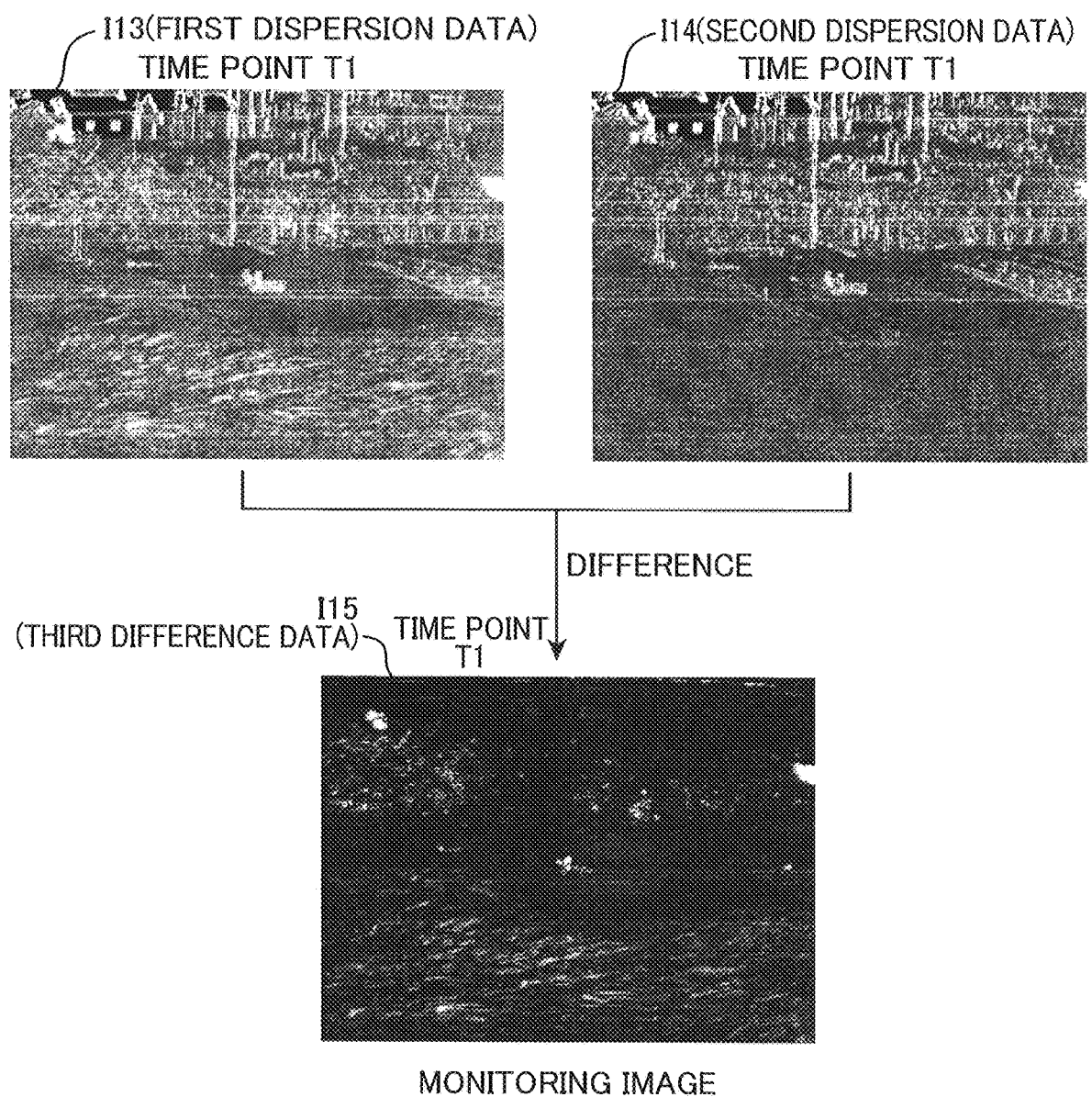
FIG. 11 is an image diagram showing an image I13, an image I14, and an image I15, which have been generated on the basis of a frame at time point T1.

FIG. 11 is an image diagram showing an image I13, an image I14, and an image I15, which have been generated on the basis of a frame at time point T1. Image I13 is an image of the frame at time point T1, in a moving image represented by the M pieces of first dispersion data acquired in step S3 of FIG. 6. Image I14 is an image of the frame at time point T1, in a moving image represented by the M pieces of second dispersion data acquired in step S6 of FIG. 6. The difference between images I13 and I14 becomes image I15 (a monitoring image).

Figure 12:
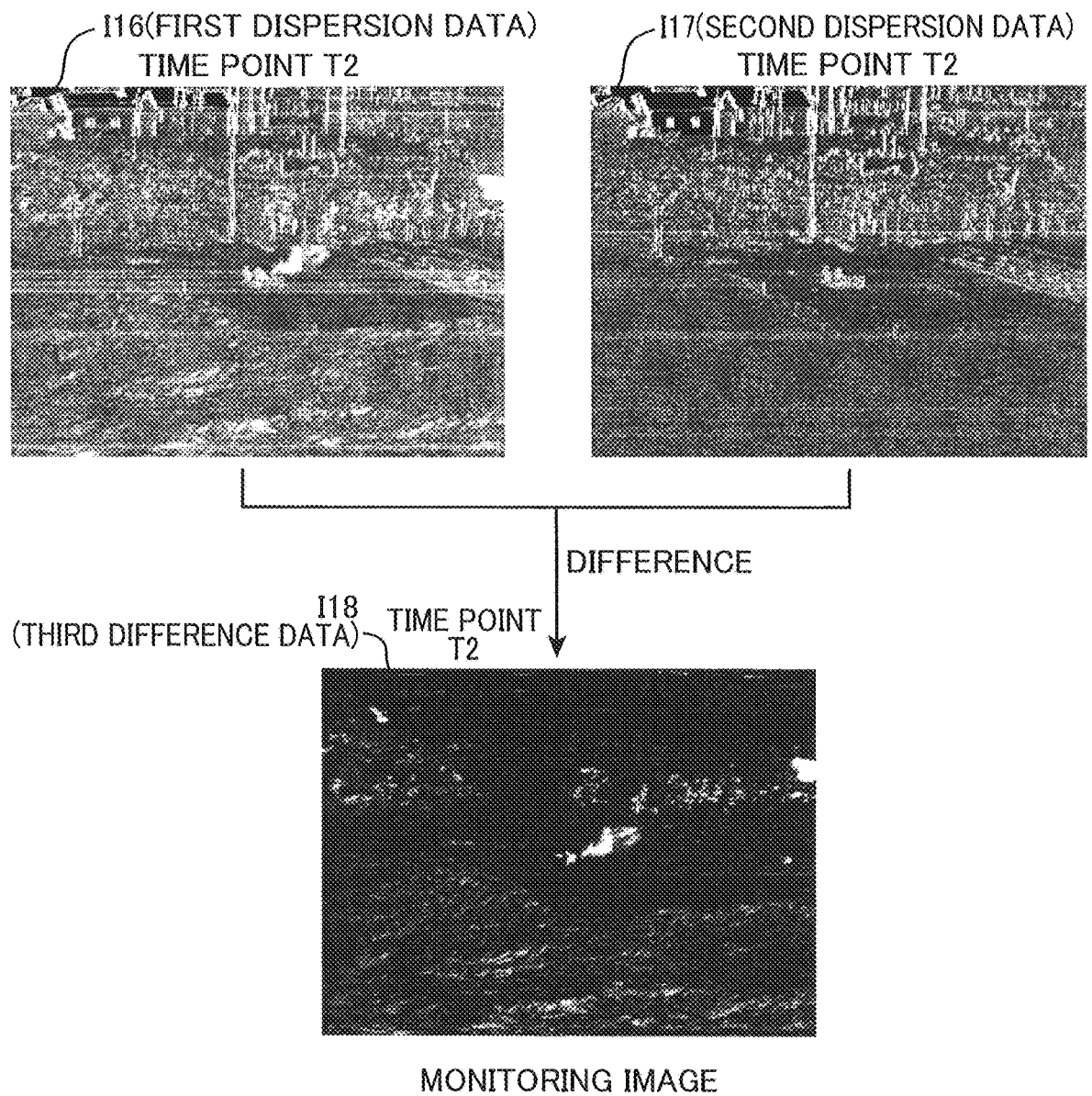
FIG. 12 is an image diagram showing an image I16, an image I17, and an image I18, which have been generated on the basis of a frame at time point T2.

FIG. 12 is an image diagram showing an image I16, an image I17, and an image I18, which have been generated on the basis of a frame at time point T2. Image I16 is an image of the frame at time point T2, in a moving image represented by the M pieces of first dispersion data acquired in step S3. Image I17 is an image of the frame at time point T2, in a moving image represented by the M pieces of second dispersion data acquired in step S6. The difference between images I16 and I17 becomes image I18 (a monitoring image). Images I13 to I18 shown in FIGS. 11 and 12 are images each yielded by multiplying a standard deviation by 5000.

Image I15 shown in FIG. 11 is an image taken before gas is emitted from spot SP1 shown in FIG. 4, and thus, the state of gas coming out from spot SP1 does not appear in image I15. Meanwhile, image I18 shown in FIG. 12 is an image taken at a time point at which gas is being emitted from spot SP1, and thus, the state of gas coming out from spot SP1 appears in image I18.

As description has been provided up to this point, according to the present embodiment, the image generation unit 8 (FIG. 1A) performs processing for removing the second frequency component data included in the moving image data D1 of infrared images and generates moving image data, and the display control unit 12 causes the display unit 13 to display a moving image (a moving image of monitoring images) represented by the moving image data. Hence, according to the present embodiment, the state of gas leaking can be displayed as a moving image of monitoring images, even when gas leakage and the temperature change of the background are occurring concurrently and the temperature change of the background is greater than the temperature change brought about by the gas having leaked.

Sensor noise becomes smaller as temperature increases, and thus, differs depending upon temperature. In the two-dimensional image sensor 6 (FIG. 1A), noise in accordance with the temperature that each pixel is detecting is generated at the pixel. That is, it is not the case that all pixels have the same noise. High frequency noise can be removed from a moving image according to the present embodiment. Hence, the display unit 13 can be caused to display even slight gas leakage.

[Processing for Calculating Gas Concentration Lengths]

An infrared image is constituted by a plurality of pixels being arrayed two-dimensionally. A background including a monitoring target is virtually divided into a plurality of regions respectively corresponding to the plurality of pixels. Pixel data for each pixel indicates a background temperature of the corresponding region. In order to calculate a concentration length of gas located in a given region, a background temperature of the region when gas is present in the region (a with-gas background temperature) and a background temperature of the region when gas is not present in the region (a without-gas background temperature) are required.

Figure 13:
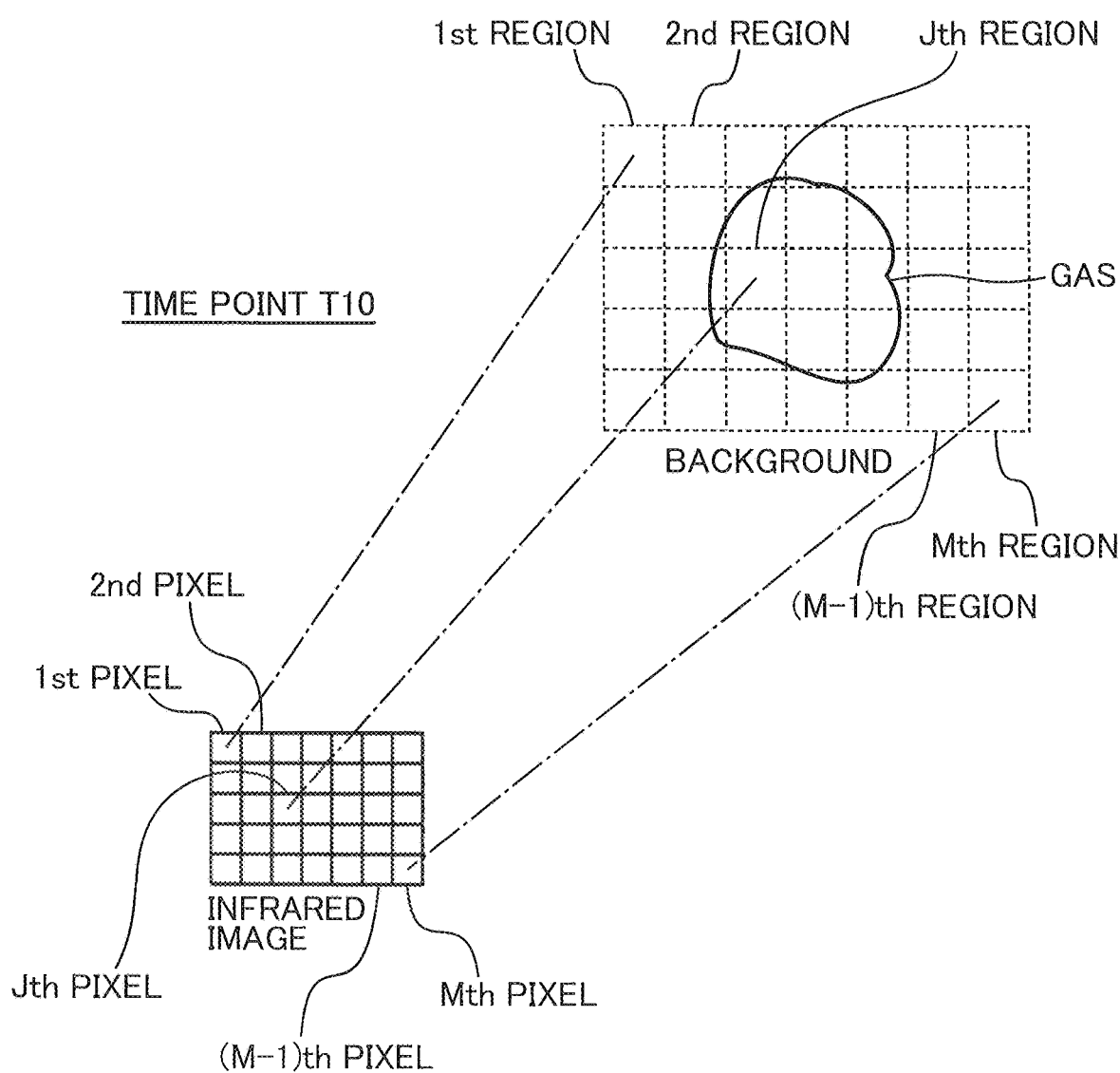
FIG. 13 is an explanatory diagram describing a relation between an infrared image taken at time point T10 and a background including gas.

FIG. 13 is an explanatory diagram describing a relation between an infrared image taken at time point T10 and a background including gas. Gas is leaking from a gas leakage monitoring target (for example, a connection point of gas transport pipes) and is hanging in the space. The infrared image is constituted by an M number of pixels from a 1st pixel to an Mth pixel being arrayed two-dimensionally. M denotes two or more. The background is virtually divided into an M number of regions from a 1st region to an Mth region, respectively corresponding to the M number of pixels. For example, the 1st pixel corresponds to the 1st region, and pixel data for the 1st pixel indicates a background temperature of the 1st region. A Jth pixel corresponds to a Jth region, and pixel data for the Jth pixel indicates a background temperature of the Jth region.

For example, in order to calculate the concentration length of gas located in the Jth region, the with-gas background temperature of the Jth region and the without-gas background temperature of the Jth region are required.

Figure 14:
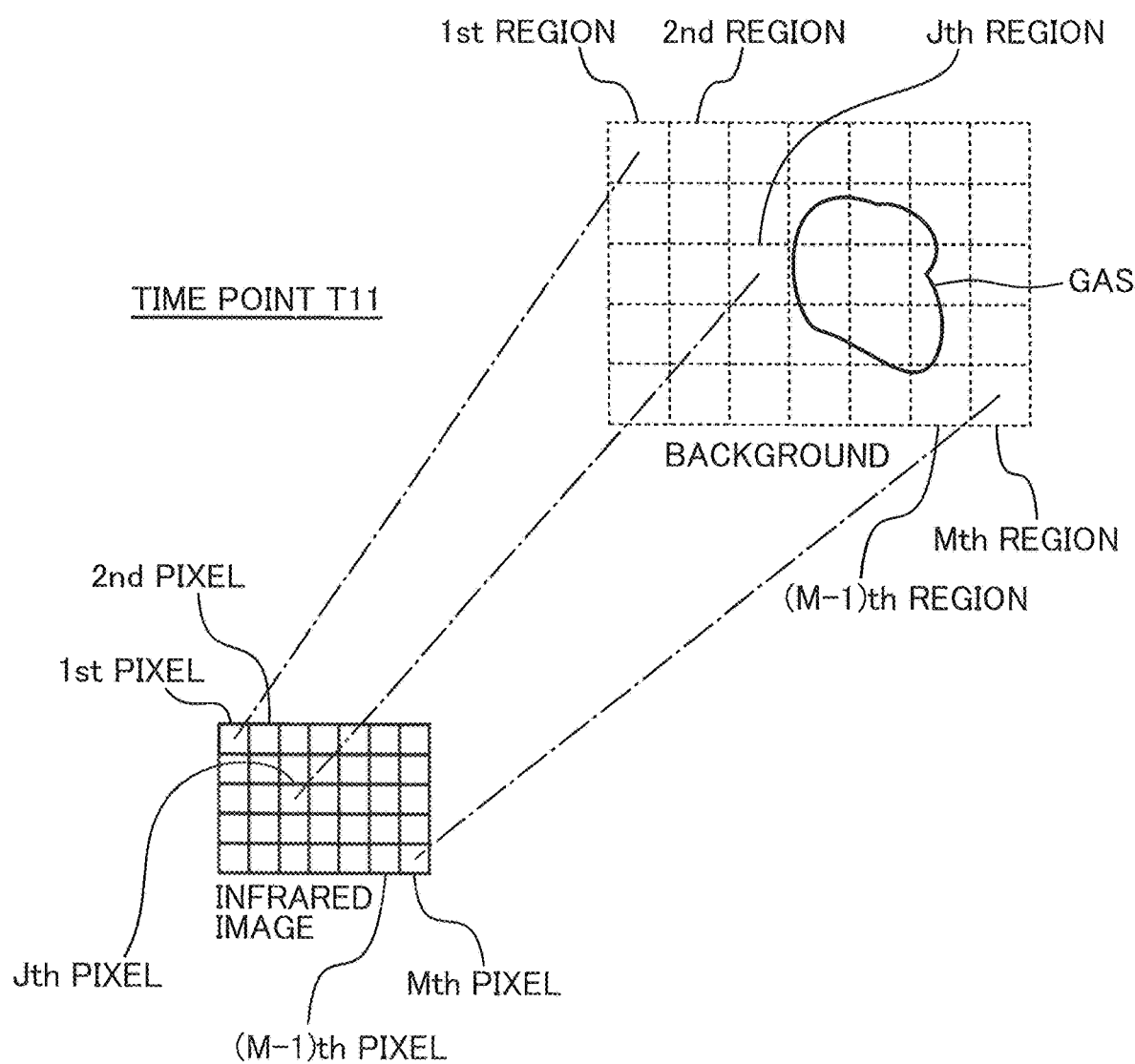
FIG. 14 is an explanatory diagram describing a relation between an infrared image taken at time point T11 and a background including gas.

In the state shown in FIG. 13, gas is located in the Jth region. Hence, the with-gas background temperature of the Jth region can be detected, but the without-gas background temperature of the Jth region cannot be detected. FIG. 14 is an explanatory diagram describing a relation between an infrared image taken at time point T11 differing from time point T10 and a background including gas. At time point T11, gas is not present in the Jth region. This is because the gas having leaked is swaying. Swaying of gas is caused by the wind, etc. The inventors of the present invention have found that, due to the swaying of gas having leaked, the possibility is high that, in the Jth region, a state in which gas is present and a state in which gas is not present occur when seen chronologically.

Figure 15:
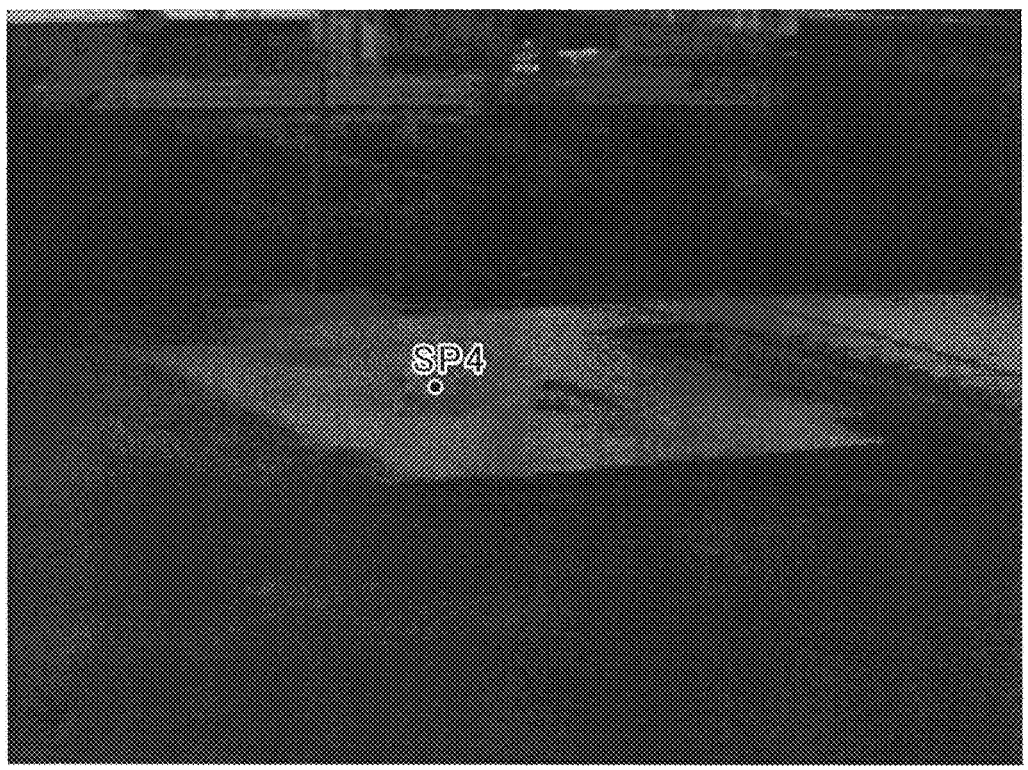
FIG. 15 is an image diagram showing an infrared image taken of an outdoor testing site.

The with-gas background temperature and the without-gas background temperature are measured by making use of this principle. FIG. 15 is an image diagram showing an infrared image taken at an outdoor testing site. This infrared image has been yielded by taking a moving image by using an infrared camera. At the testing site, there is a spot SP4 capable of causing gas emission.

Figure 16:
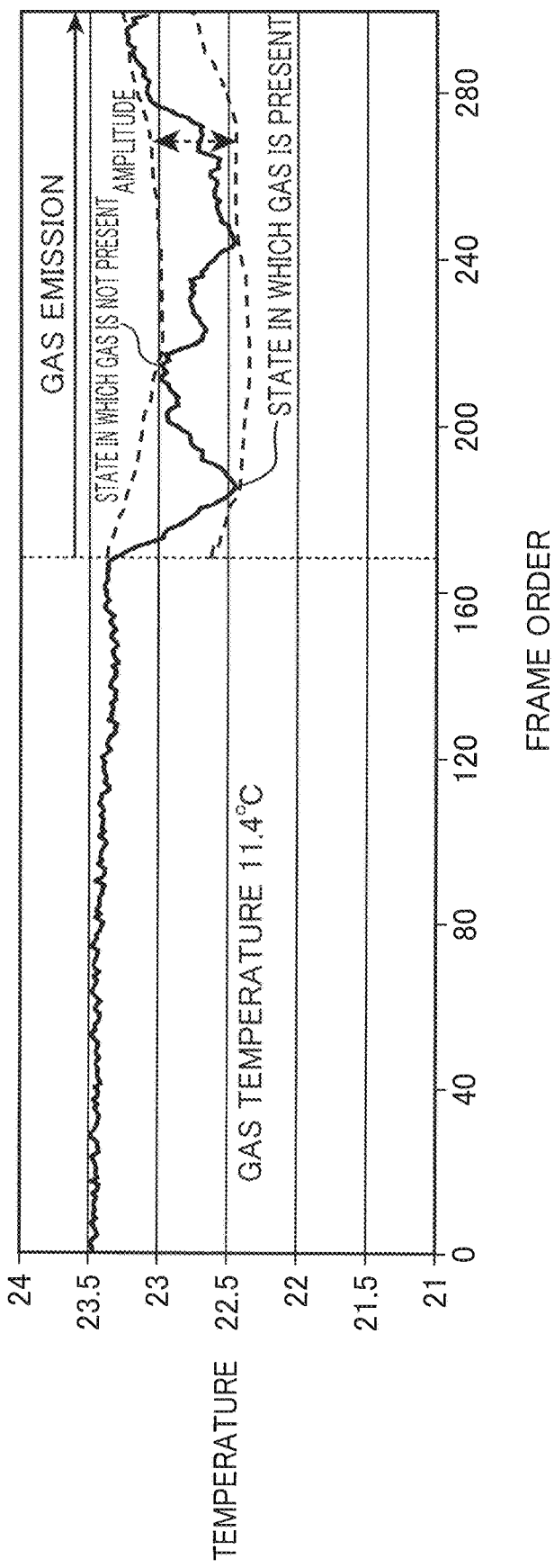
FIG. 16 is a graph showing the temperature change at spot SP4 (FIG. 15) of the testing site.

FIG. 16 is a graph indicating the temperature change at spot SP4 of the testing site. The vertical axis of the graph indicates background temperature. The horizontal axis of the graph indicates frame order. For example, "160" indicates the 160th frame. The frame rate is 30 fps.

The gas temperature was 11.4 degrees, and was lower than the air temperature at the testing site (that is, the site at which the infrared image was taken). The background temperature at spot SP4 is decreasing starting from around the 170th frame. This is because the time point corresponding to this frame is the time point at which gas emission was started at spot SP4. The emission of gas at spot SP4 continues. From around the 170th frame and on, the background temperature at spot SP4 continues to change rather than remaining fixed. This is due to the swaying of the emitted gas, and because at spot SP4, a state in which gas is present and a state in which gas is not present occur. In the present embodiment, the with-gas background temperature and the without-gas background temperature are calculated by using data of a change in the background temperature after gas emission (amplitudes of a graph indicating the fluctuation of the background temperature).

As a publicly known technique, there is a technique of preparing a filter transmitting a wavelength region that is absorbed by a detection target gas and a filter not transmitting the wavelength region, and measuring the with-gas background temperature and the without-gas background temperature by switching between these two types of filters in an appropriate manner. Meanwhile, in the present embodiment, the with-gas background temperature and the without-gas background temperature are calculated by using the phenomenon of the swaying of gas having leaked. According to the present embodiment, two types of filters and a mechanism for switching between the filters become unnecessary.

The with-gas background temperature and the without-gas background temperature are calculated by the computation processing unit 9 (FIG. 1A). Spot SP4 (FIG. 15) corresponds to one pixel, and the graph shown in FIG. 16 is chronological pixel data (FIG. 2) corresponding to spot SP4. With reference of FIGS. 13 and 14, the computation processing unit 9 performs, as temperature determination processing, processing for determining the with-gas background temperature and the without-gas background temperature for a predetermined pixel (for example, the Jth pixel) among the plurality of (M number of) pixels constituting an infrared image by using the chronological pixel data (FIG. 2) corresponding to the predetermined pixel such that the background temperature indicated by the pixel data of the predetermined pixel when gas is present in a region, corresponding to the predetermined pixel, of the background including the monitoring target (not illustrated) is determined as the with-gas background temperature and the background temperature indicated by the pixel data of the predetermined pixel when gas is not present in the region is determined as the without-gas background temperature. The computation processing unit 9 performs the temperature determination processing with respect to each of the plurality of (M number of) pixels constituting the infrared image, by setting each of the plurality of (M number of) pixels constituting the infrared image as the predetermined pixel.

That is, with reference to FIGS. 2 and 13, the computation processing unit 9 determines the with-gas background temperature and the without-gas background temperature for the 1st region by using the chronological pixel data corresponding to the 1st pixel, determines the with-gas background temperature and the without-gas background temperature for the 2nd region by using the chronological pixel data corresponding to the 2nd pixel, . . . , determines the with-gas background temperature and the without-gas background temperature for the (M−1)th region by using the chronological pixel data corresponding to the (M−1)th pixel, and determines the with-gas background temperature and the without-gas background temperature for the Mth region by using the chronological pixel data corresponding to the Mth pixel.

The computation processing unit 9 and the image generation unit 8 constitute a determination unit. The determination unit generates chronological pixel data from the plurality of infrared images (the moving image data DI) that are input thereto from the image data input unit 15, and on the basis of the chronological pixel data for each of the plurality of pixels constituting an infrared image, determines, for each of the plurality of pixels, a corresponding with-gas background temperature indicating a background temperature when gas is present and a corresponding without-gas background temperature indicating a background temperature when gas is not present.

The calculation unit 10, by using the with-gas background temperatures and the without-gas background temperatures having been determined by the determination unit, calculates gas concentration lengths respectively corresponding to the plurality of (M number of) pixels constituting the infrared image.

The calculation of gas concentration lengths is described specifically. FIG. 17 is an explanatory diagram describing this. The two-dimensional image sensor 6 included in the infrared camera 2 shown in FIG. 1A includes sensor pixels corresponding to the pixels (FIGS. 13 and 14). That is, the two-dimensional image sensor 6 is constituted by M sensor pixels from the 1st sensor pixel to the Mth sensor pixel being arrayed two-dimensionally. For example, the two-dimensional image sensor 6 includes a Jth sensor pixel corresponding to the Jth pixel. The Jth sensor pixel thus corresponds to the Jth region.

Igas is a formula indicating a signal (a with-gas background signal) that a given sensor pixel outputs when gas is present in the region corresponding to the sensor pixel. Inogas is a formula indicating a signal (a without-gas background signal) that the sensor pixel outputs when gas is not present in the region corresponding to the sensor pixel. When description is provided on the basis of the Jth sensor pixel, Igas is a formula indicating the signal that the Jth sensor pixel outputs when gas is present in the Jth region. Inogas is a formula indicating the signal that the Jth sensor pixel outputs when gas is not present in the Jth region.

The gas concentration length ct is included in the formula of $\tau gas(\lambda)$, and the formula of $\tau gas(\lambda)$ is included in the formula of Igas. As can be seen from the formula of Igas, the gas concentration length ct can be determined when the with-gas background signal, the gas temperature, the air temperature, the humidity, the distance between the infrared camera 2 and the imaging subject (the gas leakage monitoring target), and a background infrared dose Pback are known. The background infrared dose Pback corresponds to the background temperature. Description is provided in the following taking the gas concentration length ct in the Jth region as an example.

The with-gas background signal output from the Jth sensor pixel can be determined from the with-gas background temperature indicated by the pixel data of the Jth pixel. The gas temperature can be approximated as the air temperature, and thus is regarded as being equal to the air temperature. The air temperature is specified by using an air temperature sensor. The humidity is specified by using a humidity sensor. Because the influence of humidity on gas concentration lengths is small, the humidity can be set, for example, to 50% rather than specifying the humidity by using a humidity sensor. As the distance, the distance between the infrared camera 2 and the imaging subject that has been set to the infrared camera 2 is used.

The background infrared dose Pback in the Jth region is specified by using the formula of Inogas. To provide detailed description, as can be seen from the formula of Inogas, the background infrared dose Pback can be determined when the without-gas background signal, the air temperature, the humidity, and the distance between the infrared camera 2 and the imaging subject (the gas leakage monitoring target) are known.

The without-gas background signal output from the Jth sensor pixel can be determined from the without-gas background temperature indicated by the pixel data of the Jth pixel. The air temperature, the humidity, and the distance can be specified as described above. A formula for calculating the background infrared dose Pback from these parameters (the without-gas background signal, the air temperature, the humidity, and the distance) does not exist. Thus, a table indicating the relationships between these parameters and the background infrared dose Pback is created in advance. The background infrared dose Pback is calculated by using this table and the parameters (and by further using interpolation, if necessary). Note that the background infrared dose Pback may be calculated without using the table and by using a convergence calculation.

A formula for calculating the gas concentration length ct from the parameters specified as described above (the with-gas background signal, the gas temperature, the air temperature, the humidity, the distance, and the background infrared dose Pback) does not exist. Thus, a table indicating the relationships between these parameters and the gas concentration length ct is created in advance. The gas concentration length ct is calculated by using this table and the parameters (and by further using interpolation, if necessary). Note that the gas concentration length ct may be calculated without using the table and by using a convergence calculation.

Figure 18:
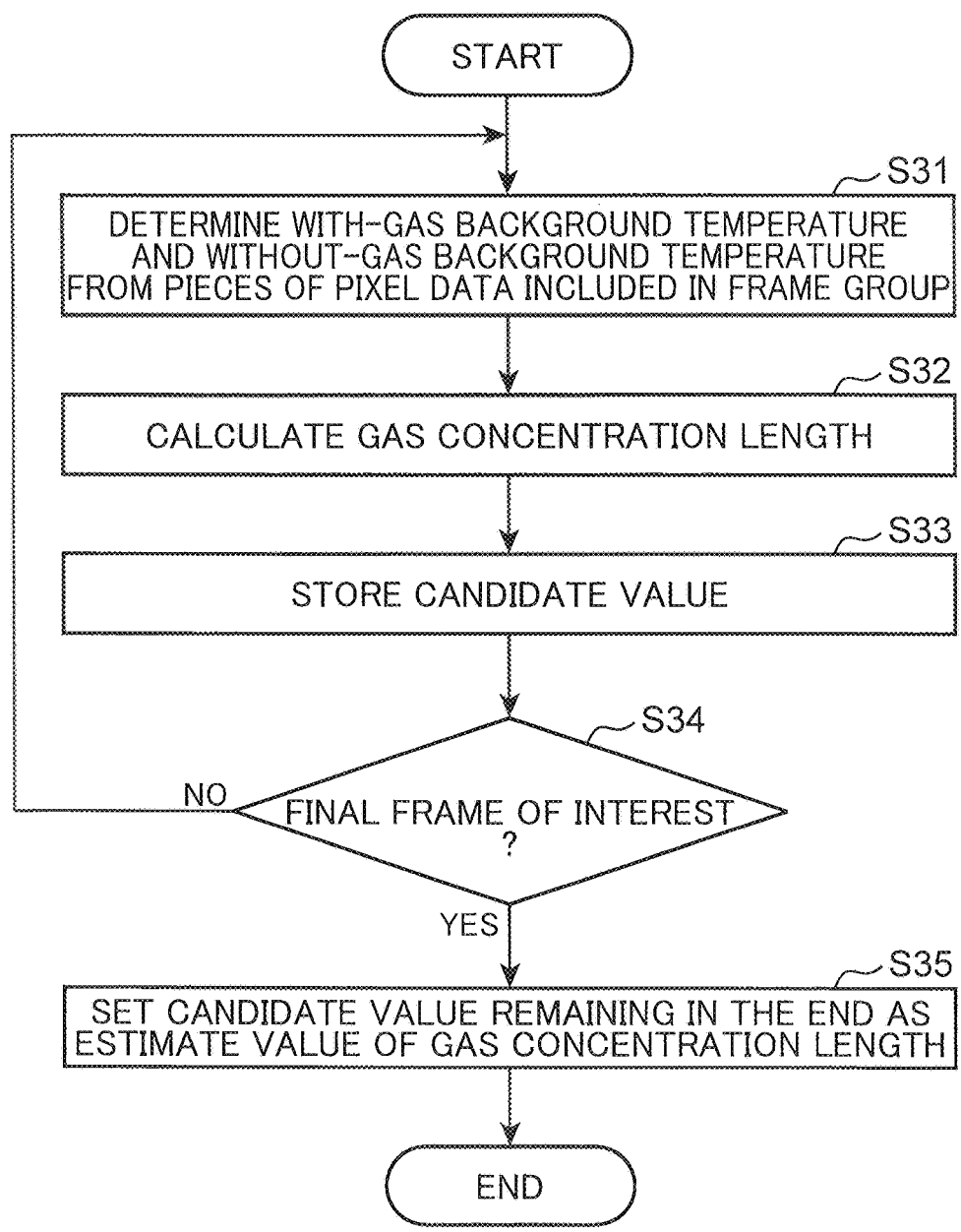
FIG. 18 is a flowchart describing processing for calculating estimate values of gas concentration lengths.

The gas-detection image-processing device 3 (FIG. 1A) performs the processing for calculating gas concentration lengths by making use of the swaying of gas, and calculates estimate values of gas concentration lengths. FIG. 18 is a flowchart describing processing for calculating estimate values of gas concentration lengths. With reference to FIGS. 1A and 18, the display control unit 12 causes the display unit 13 to display monitoring images generated by using infrared images of a background including the gas leakage monitoring target. A person carrying out the monitoring of gas leakage determines, as a pixel of interest, a pixel of a monitoring image displayed on the display unit 13, the pixel being a pixel that the person is interested in, and operates the input unit 14 to input the position of the pixel of interest (that is, specifies the pixel of interest). The pixel of interest is one example of the predetermined pixel, and is a pixel corresponding to a region in which gas having leaked is hanging. For example, the pixel corresponding to the Jth region shown in FIGS. 13 and 14, namely, the Jth pixel can be set as the pixel of interest. Description is provided in the following of an example in which the Jth pixel is the pixel of interest.

With reference to FIGS. 13 and 14, the computation processing unit 9 determines the with-gas background temperature and the without-gas background temperature in the Jth pixel (the pixel of interest, the predetermined pixel) among the M number of pixels on the basis of the chronological pixel data (FIG. 2) for the Jth pixel by setting, as the with-gas background temperature, a background temperature indicated by the pixel data of the Jth pixel when gas is present in the Jth region corresponding to the Jth pixel, and as the without-gas background temperature, a background temperature indicated by the pixel data of the Jth pixel when gas is not present in the Jth region.

To provide detailed description, the computation processing unit 9 determines, as a frame group, a group of a predetermined number of frames that are consecutive in chronological order, the predetermined number of frames being less than the K number of (the plurality of) frames shown in FIG. 2, and determines the with-gas background temperature and the without-gas background temperature from among the background temperatures indicated by pieces of pixel data, in the chronological pixel data for the Jth pixel, that are included in the frame group (step S31).

A frame group is constituted of a predetermined number of frames that are consecutive in chronological order. Here, it is supposed that the predetermined number is 41, for example. A frame group is constituted of a frame of interest, 20 consecutive frames immediately before this frame, and 20 consecutive frames immediately after this frame. This is described on the basis of FIG. 19. FIG. 19 is a graph showing a relation between frame groups and the temperature change at spot SP4 (FIG. 15) of the testing site. The vertical and horizontal axes and the line indicating the temperature change in the graph are the same as those shown in FIG. 5A. The line indicating the temperature change is the chronological pixel data for a pixel corresponding to spot SP4. For example, when the frame of interest is the 200th frame, the 180th to 220th frames constitute one frame group. First, the 1st frame group is formed. The frame of interest in the 1st frame group is the 21st frame, and the 1st frame group is constituted of the 1st to 41st frames. When the number of frames is 300 for example, the final frame group is a frame group constituted of the 260th to 300th frames. The 1st through final frame groups are a plurality of frame groups having different combinations of frames.

The computation processing unit 9 determines maximum and minimum background temperature values from among background temperatures indicated by pieces of pixel data, in the chronological pixel data for the Jth pixel, that are included in the frame group. Here, the frame group is the 1st frame group.

Figure 20A:
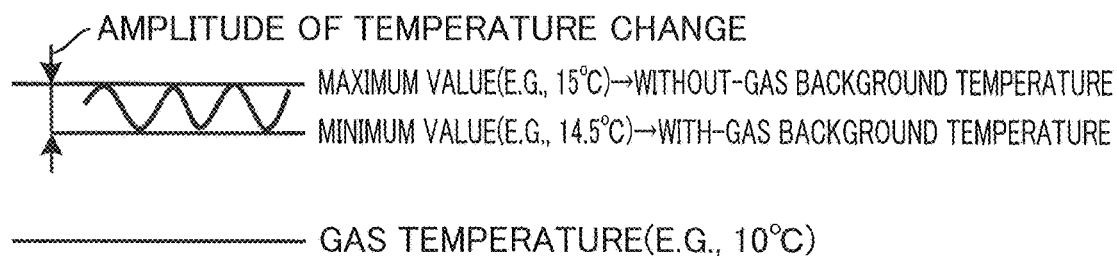
FIG. 20A is an explanatory diagram describing a relation between a gas temperature, a with-gas background temperature, and a without-gas background temperature when the gas temperature is lower than background temperatures.
Figure 20B:
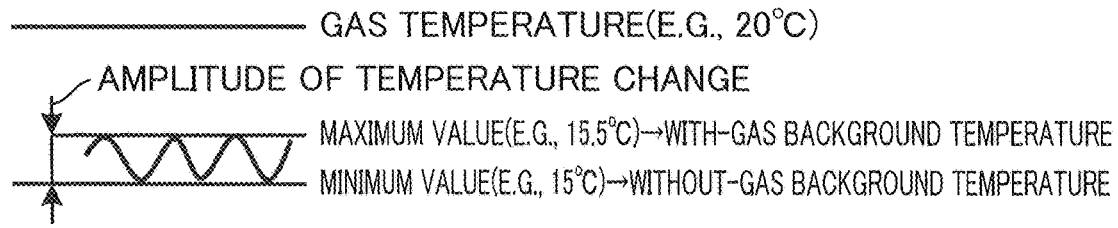
FIG. 20B is an explanatory diagram describing a relation between the gas temperature, the with-gas background temperature, and the without-gas background temperature when the gas temperature is higher than the background temperatures.

The maximum background temperature value becomes one of the with-gas background temperature and the without-gas background temperature, and the minimum background temperature value becomes the other one of the with-gas background temperature and the without-gas background temperature. This is dependent upon the relation between gas temperature, the with-gas background temperature, and the without-gas background temperature. This is described on the basis of FIGS. 20A and 20B. FIGS. 20A and 20B are explanatory diagrams describing the relation. The with-gas background temperature and the without-gas background temperature are background temperatures that are indicated by the pixel data for the Jth pixel (the predetermined pixel), among the plurality of pixels constituting the infrared image. When gas is included in the imaging subject, the with-gas background temperature is between the gas temperature and the without-gas background temperature. When the gas temperature is lower than the background temperatures indicated by the pixel data for the Jth pixel (the predetermined pixel), the following relationship holds true (FIG. 20A): without-gas background temperature>with-gas background temperature> gas temperature. When the gas temperature is higher than the background temperatures indicated by the pixel data for the Jth pixel, the following relationship holds true (FIG. 20B): gas temperature>with-gas background temperature> without-gas background temperature.

When the gas temperature is lower than the background temperatures indicated by the pixel data for the Jth pixel, the maximum background temperature value becomes the without-gas background temperature and the minimum background temperature value becomes the with-gas background temperature. Meanwhile, when the gas temperature is higher than the background temperatures indicated by the pixel data for the Jth pixel, the maximum background temperature value becomes the with-gas background temperature and the minimum background temperature value becomes the without-gas background temperature. Note that when the detection target gas has room temperature, the air temperature may be used as the gas temperature.

The with-gas background temperature and the without-gas background temperature in step S31 are determined in the above-described manner. Hence, according to the present embodiment, the with-gas background temperature and the without-gas background temperature can be measured with one infrared camera 2, without two types of filters and a mechanism for switching between the filters being required.

The calculation unit 10 (FIG. 1A) calculates the concentration length of gas present in the Jth region, by using the with-gas background temperature and the without-gas background temperature having been determined in step S31 (step S32). Here, the gas concentration length is calculated by using the with-gas background temperature and the without-gas background temperature of the 1st frame group.

The calculation unit 10 compares the gas concentration length having been calculated in step S32 and a candidate value, and stores therein the greater one of the values as a candidate value (step S33). As described later, the calculation unit 10 determines the candidate value stored therein in the end as the estimate value of the concentration length of the gas having leaked. The initial candidate value is zero. Hence, the calculation unit 10 stores therein, as a candidate value, the gas concentration length having been calculated in step S32, or in other words, the gas concentration length having been calculated by using the with-gas background temperature and the without-gas background temperature of the 1st frame group.

The computation processing unit 9 determines whether the frame of interest is the final frame of interest (step S34). When the number of frames is 300, for example, the 280th frame is the final frame of interest. This is because, when the 280th frame is the frame of interest, the frame group (the final frame group) is constituted of the 260th to 300th frames.

When the computation processing unit 9 determines that the frame of interest is not the final frame of interest (No in step S34), processing returns to step S31. The computation processing unit 9 creates the next frame group by shifting the frame of interest by one frame in chronological order. Here, the frame group when the frame of interest is the 22nd frame is created. This frame group is the 2nd frame group, and is constituted of the 2nd to 42nd frames.

The computation processing unit 9 determines the with-gas background temperature and the without-gas background temperature from among background temperatures indicated by pieces of pixel data, in the chronological pixel data for the Jth pixel, that are included in the 2nd frame group (step S31).

The calculation unit 10 calculates the concentration length of gas present in the Jth background, by using the maximum and minimum background temperature values having been determined in step S31 (step S32). Here, the gas concentration length is calculated by using the with-gas background temperature and the without-gas background temperature of the 2nd frame group.

The calculation unit 10 compares the gas concentration length having been calculated in step S32 and a candidate value, and stores the greater one of the values as a candidate value. Here, comparison is performed between the gas concentration length having been calculated by using the with-gas background temperature and the without-gas background temperature of the 2nd frame group, and a candidate value (the gas concentration length having been calculated by using the with-gas background temperature and the without-gas background temperature of the 1st frame group). Hence, the maximum gas concentration length among the gas concentration lengths having been computed to this point becomes the gas concentration length stored as a candidate value.

The computation processing unit 9 and the calculation unit 10 repeat the processing from step S31 to step S33 until it is determined that the frame of interest is the final frame of interest (Yes in step S34). This means that the computation processing unit 9 prepares a plurality of frame groups having different combinations of frames, and determines the with-gas background temperature and the without-gas background temperature for each of the plurality of frame groups. For each of the plurality of frame groups, the calculation unit 10 calculates the gas concentration length by using the with-gas background temperature and the without-gas background temperature having been determined by the determination unit included in the calculation unit 10.

When the computation processing unit 9 determines that the frame of interest is the final frame of interest (Yes in step S34), the calculation unit 10 assumes that the candidate value stored thereto in step S33 is the concentration length of the hanging gas (step S35). Hence, the calculation unit 10 sets the maximum gas concentration length among the gas concentration lengths for the respective ones of the plurality of frame groups, the gas concentration lengths for the plurality of frame groups having been calculated in step S32, as the estimate value of the concentration length of the hanging gas.

Figure 21:
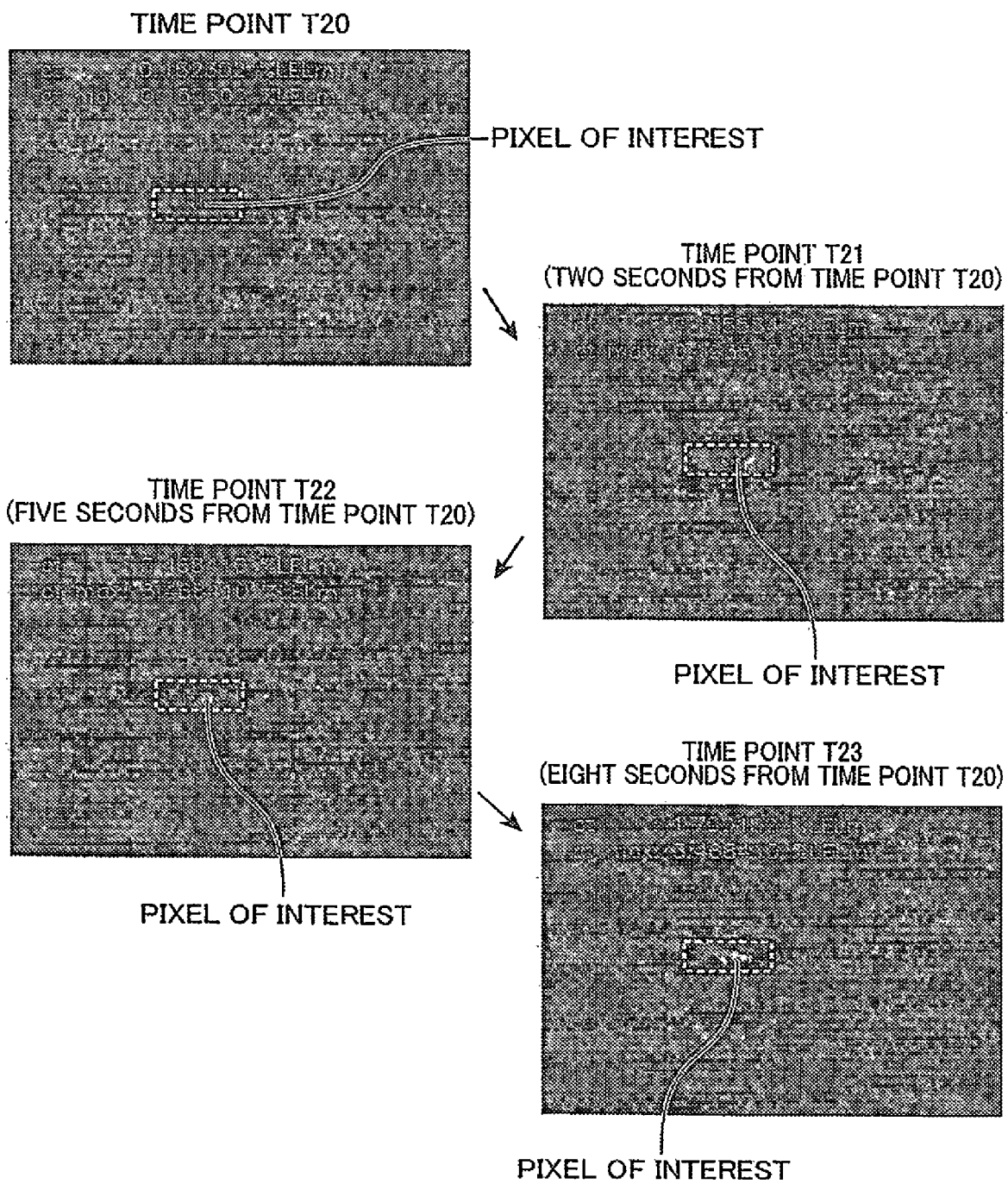
FIG. 21 is an image diagram showing a transition of images displayed on a display unit during execution of the processing in FIG. 18.

FIG. 21 is an image diagram showing a transition of images displayed on the display unit 13 (FIG. 1A) during execution of the processing in FIG. 18. These infrared images have been yielded by taking a moving image of the testing site described in FIG. 15 by using the infrared camera 2.

The portions inside the frames indicated by dotted lines are images visualizing gas concentration lengths having been calculated in step S32. The infrared images are constituted of the pixel of interest (the Jth pixel) and pixels located in the periphery thereof. The pixels each correspond to a value yielded by multiplying the gas concentration length having been calculated in step S32 by one hundred. The processing from step S31 to step S35 has been performed with respect to these pixels.

Gas concentration is indicated by using the lower explosive limit (LEL). The lower explosive limit is the minimum concentration at which flammable gas mixed with air explodes when ignited. 100% LEL indicates that the lower explosive limit has been reached. In the case of methane gas, 100% LEL corresponds to when the concentration thereof reaches 5%. Gas concentration lengths are indicated by using the unit LELm. Here, m indicates the distance in the depth-direction.

The gas concentration length calculated in step S32 is indicated by "ct", and the candidate value in step S33 (the maximum gas concentration length calculated so far) is indicated by "ct max". As described above, the processing from step S31 to step S35 has been performed with respect to all pixels in the portions of the frames indicated by dotted lines. However, "ct" and "ct max" are values for the pixel of interest.

The image indicated by time point T20 is an image taken immediately after the start of gas emission. Here, ct indicates the gas concentration length having been calculated by using the with-gas background temperature and the without-gas background temperature of the frame group in which the frame of interest is the frame at time point T20.

The image indicated by time point T21 is the image after two seconds have elapsed from time point T20. Here, ct indicates the gas concentration length having been calculated by using the with-gas background temperature and the without-gas background temperature of the frame group in which the frame of interest is the frame at time point T21. At this time point, the concentration length of gas hanging in the region corresponding to the pixel of interest (for example, the Jth region when the pixel of interest is the Jth pixel shown in FIGS. 13 and 14) is relatively low. This means that a relatively small amount of gas is hanging in this region.

The image indicated by time point T22 is the image after five seconds have elapsed from time point T20. Here, ct indicates the gas concentration length having been calculated by using the with-gas background temperature and the without-gas background temperature of the frame group in which the frame of interest is the frame at time point T22. At this time point, the concentration length of gas hanging in the region corresponding to the pixel of interest is relatively high. This means that a relatively large amount of gas is hanging in this region.

The image indicated by time point T23 is the image after eight seconds have elapsed from time point T20. Here, ct indicates the gas concentration length having been calculated by using the with-gas background temperature and the without-gas background temperature of the frame group in which the frame of interest is the frame at time point T23. At this time point, the concentration length of gas hanging in the region corresponding to the pixel of interest is relatively low. This means that a relatively small amount of gas is hanging in this region.

The gas concentration length at time point T22 (3.5% LELm) is determined as the estimate value of the gas concentration length in the region corresponding to the pixel of interest. The exact gas concentration length in this region was 3% LELm. In the present embodiment, the with-gas background temperature and the without-gas background temperature are determined by using the phenomenon of the swaying of gas having leaked. The swaying of gas is caused by wind, etc. Hence, the temperature difference between the with-gas background temperature and the without-gas background temperature fluctuates along the time axis, and as a result, the concentration length also fluctuates along the time axis. In the present embodiment, the maximum concentration length along the time axis is determined as the estimate value of the concentration length, and this estimate value is regarded as the concentration length. According to the present embodiment, it can be ensured that estimate values of gas concentration lengths fall within the range of 0.5 times to twice the exact gas concentration length.

Here, description is provided of the reason why the predetermined number of frames has been set to 41 frames. In the present embodiment, the gas concentration length in the Jth region shown in FIGS. 13 and 14 (the region corresponding to the pixel of interest), for example, in each frame group is calculated, and the maximum gas concentration length among the gas concentration lengths is determined as the estimate value of the gas concentration length. When a state in which gas is present in the Jth region or a state in which gas is not present in the Jth region continues over the entire period of a given frame group, the gas concentration length for the frame group cannot be calculated. In order to calculate the gas concentration length, it is required that in the Jth region, the state in which gas is present and the state in which gas is not present occur during the period of one frame group.

It can be ensured that in the Jth region, the state in which gas is present and the state in which gas is not present certainly occur by extending the period of one frame group. However, the background temperature changes when a cloud moves and blocks sunlight or when a cloud blocking sunlight moves. The possibility of being affected by this increases when the period of one frame group is set excessively long. Meanwhile, if the period of one frame group is set excessively short, it is unlikely that in the Jth region, both the state in which gas is present and the state in which gas is not present occur.

Hence, the period of one frame group has been set to approximately 1.4 seconds from such viewpoints. When the frame rate of moving images taken by the infrared camera 2 is 30 fps, the predetermined number of frames equals 41 frames. The predetermined number of frames changes when the frame rate changes. Note that the period of one frame group does not necessarily have to be 1.4 seconds, and may be changed as appropriate depending upon expected conditions (for example, wind velocity).

[Processing for Identifying Pixels constituting Gas Image and Pixels constituting Moving Body Image other than Gas Image]

Figure 22:
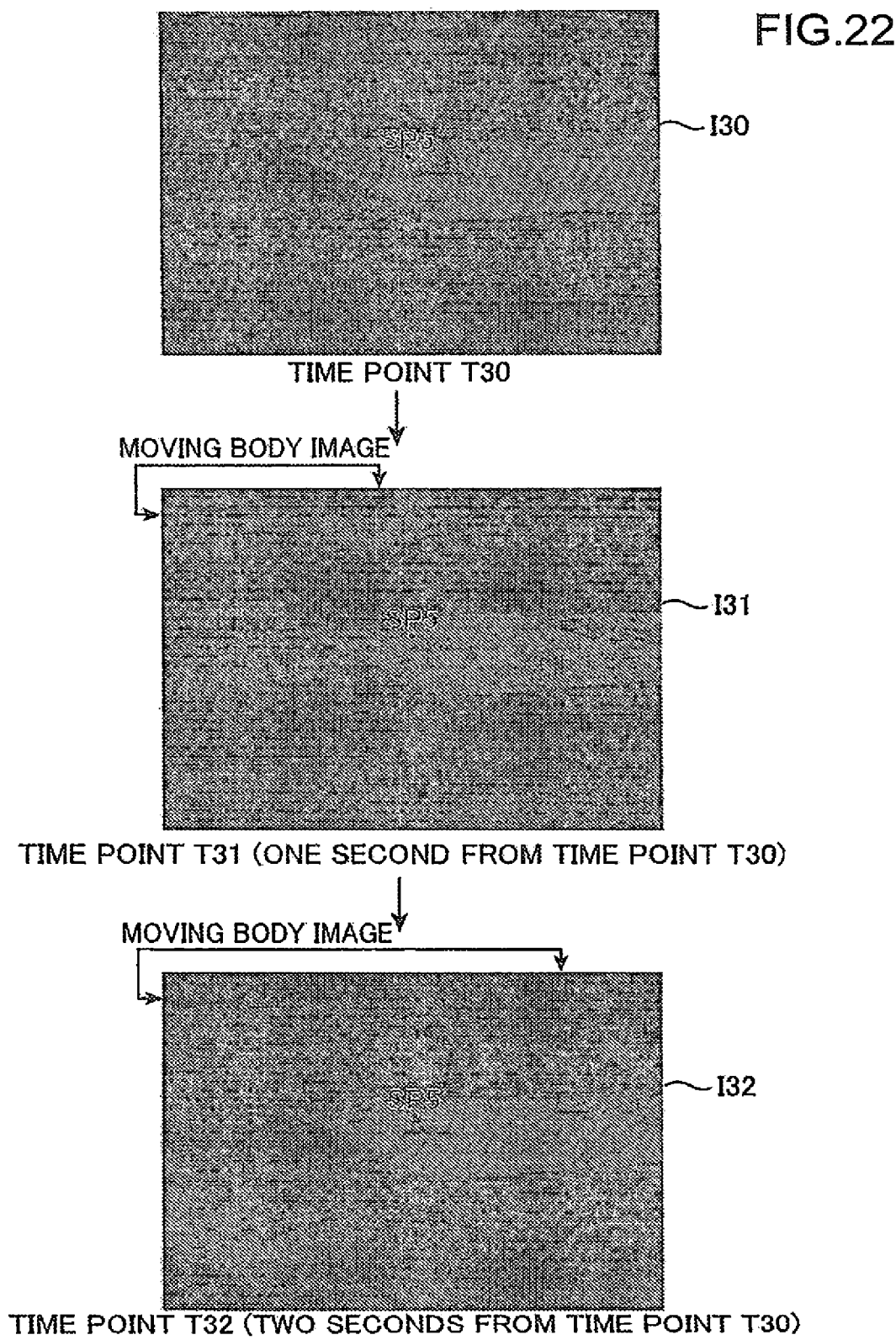
FIG. 22 is an image diagram showing three infrared images selected from moving image data D1 of infrared images.

With reference to FIG. 1A, the moving image data D1 of infrared images taken by using the infrared camera 2 is transmitted to the gas-detection image-processing device 3. FIG. 22 is an image diagram showing three infrared images selected from the moving image data D1 of infrared images. Image I30 is an infrared image of a testing site taken at time point T30. Image I31 is an infrared image of the testing site taken at time point T31, which is one second after time point T30. Image I32 is an infrared image of the testing site taken two seconds after time point T30. At each of the time points, gas is being emitted at spot SP5. While not appearing in image I30, an image of a moving body (a running train) appears at the upper part of image I31, from the left to the center of the image. In image I32 taken at time point T32, which is one second after time point T31 at which image I31 is taken, a moving body image appears from the left to the right of the image.

With reference to FIG. 1A, the image generation unit 8 performs image processing with respect to the moving image data D1 of infrared images, and generates moving image data of monitoring images (step S100 of FIG. 3). The display control unit 12 causes the display unit 13 to display a moving image of monitoring images represented by the moving image data of monitoring images. While not being monitoring images corresponding to the infrared images in FIG. 22, image I15 shown in FIG. 11 and image I18 shown in FIG. 12 are examples of monitoring images. When gas leakage occurs, monitoring images include a gas image visualizing the gas having leaked. When a moving body other than a gas image is present in the background, monitoring images will include an image of the moving body. In images I15 and I18, both a gas image and a moving body image are shown as a white-colored image. Hence, in order so that, gas leakage can be automatically detected, it is necessary to avoid a moving body from being mistakenly determined as gas.

In the first mode of the present embodiment, a configuration is made so that pixels included in a monitoring image that constitute a gas image and pixels included in the monitoring image that constitute a moving body image can be identified, by using a concentration length visualization image. A concentration length visualization image is an image that has been subject to processing for visualizing gas concentration lengths.

The calculation unit 10 performs processing for calculating concentration lengths for each of the infrared images constituting the moving image data D1 having been used for the processing in step S100 (step S101 of FIG. 3). In this processing, concentration lengths are calculated for regions respectively corresponding to a plurality of pixels constituting an infrared image (in other words, all pixels). To provide specific description, for the infrared image at time point T10 shown in FIG. 13, for example, concentration lengths are calculated for the M number of regions respectively corresponding to the M number of pixels. That is, the calculation unit 10, by using an infrared image, calculates concentration lengths respectively corresponding to the plurality of pixels constituting the infrared image, as identification values. FIG. 17 describes one example of a method for calculating concentration lengths.

The image generation unit 8 generates images (concentration length visualization images) visualizing the concentration lengths having been calculated in step S101 of FIG. 3. FIG. 23 is an image diagram showing various images generated by using concentration lengths. Image I31a is an image (a concentration length visualization image) visualizing values yielded by multiplying the concentration lengths respectively corresponding to the plurality of pixels constituting image I31 shown in FIG. 22 by 100. A concentration length visualization image is an image that visualizes concentration lengths having been calculated regarding that gas is present in a region corresponding to an entirety of an image, and is not an image showing a gas image. A concentration length visualization image and a monitoring image are generated by using the same infrared image, and thus, a concentration length visualization image consequently includes pixels included in the monitoring image that constitute a gas image and pixels included in the monitoring image that constitute a moving body image.

Gas concentration is indicated by using the lower explosive limit (LEL). 100% LEL indicates that the lower explosive limit has been reached. In the case of methane gas, 100% LEL corresponds to 5% concentration. Concentration lengths are indicated by using the unit LELm. Here, m indicates the distance in the depth-direction. Image I31a has 256 gradations, and regions having concentration lengths of 2.55% LELm or higher are shown in white.

Concentration lengths that exceed the lower explosive limit of gas to a great extent (for example, a value of 200% LELm or higher) are abnormal values. When a concentration length corresponding to a given pixel in a concentration length visualization image has an abnormal value, the pixel can be regarded as not being a pixel constituting a gas image included in a monitoring image and can be regarded as being a pixel constituting a moving body image included in the monitoring image. To provide specific description, image I31b shown in FIG. 23 is an image visualizing values yielded by multiplying the concentration lengths respectively corresponding to the plurality of pixels constituting image I31 shown in FIG. 22 by 1. Note that here, in the calculation of concentration lengths, clipping is performed so that even if a region actually has a concentration length of 200% LELm or higher, the concentration length of the region is set to 200. Accordingly, when displayed in 256 gradations, regions having concentration values of 200% LELm or higher are displayed as having the same gradation value (200).

The identification unit 11 (FIG. 1A) compares the concentration lengths respectively corresponding to the plurality of pixels (all pixels) constituting a concentration length visualization image with a predetermined threshold value (for example, 200% LELm), and specifies pixels corresponding to concentration lengths exceeding the threshold value as pixels included in a monitoring image that constitute a moving body image. Due to this, the identification unit 11 is capable of identifying pixels included in the monitoring image that constitute a gas image and pixels included in the monitoring image that constitute a moving body image other than a gas image (step S102). Hence, the identification unit 11 compares absolute values of identification values respectively corresponding to a plurality of pixels constituting an infrared image with a predetermined threshold value, and specifies a corresponding pixel of each of the absolute values of the identification values that exceed the threshold value as a pixel constituting a non-gas image (for example, a moving body image other than a gas image).

The image generation unit 8 generates a visualization image that visualizes an image (in other words, a pseudo image of the moving body image) formed by pixels included in a monitoring image that constitute a moving body image, the pixels constituting the moving body image having been specified by the identification unit 11. To provide specific description, image I31c shown in FIG. 23 is an image (a visualization image) yielded by performing binarization of the concentration lengths respectively corresponding to the plurality of pixels constituting image I31a by using the above-described threshold value. Pixels corresponding to concentration lengths exceeding the threshold value are shown in white, and pixels corresponding to concentration lengths equal to or smaller than the threshold value are shown in black. Hence, even if output that is considered as probably being gas occurs with respect to a monitoring image having been generated by the image generation unit 8 (step S100 of FIG. 3), the region shown in white in image I31a in FIG. 23 can be determined as not being gas.

Note that when it is desired to cause the display unit 13 to display a gas region by using the display control unit 12, a configuration is made so that the region shown in white in image I31a in FIG. 23, among the pixels of the monitoring image having been generated by the image generation unit 8, is not displayed (a configuration is made so that the region is displayed in black). Hence, an image from which a region that is not gas is removed is displayed on the display unit 13.

Note that when the calculation unit 10 calculates estimate values of gas concentration lengths according to the flowchart shown in FIG. 18 described in [Processing for Calculating Gas Concentration Lengths] above, the calculation unit 10 calculates estimate values respectively corresponding to the plurality of (M number of) pixels constituting an infrared image. The identification unit 11 compares, with a threshold value, the estimate values respectively corresponding to the plurality of (M number of) pixels constituting the infrared image, using the estimate values as gas concentration lengths that are identification values.

Note that similar processing may be performed by the computation processing unit 9 calculating values correlated with concentration lengths, as described in the second mode, and performing comparison with a threshold value therefor.

Description is provided of the second mode of the present embodiment. As description has been provided on the basis of FIG. 23, in the first mode of the present embodiment, a configuration is made so that a visualization image such as image I31c is generated by using a concentration length visualization image such as image I31a, and a person carrying out monitoring of gas leakage is able to identify a gas image and a moving body image. Meanwhile, in the second mode of the present embodiment, a configuration is made so that a person carrying out monitoring of gas leakage is able to identify a gas image and a moving body image by using a correlation value visualization image. A correlation value visualization image is an image visualizing gas concentration length correlation values. When attempting to calculate concentration lengths under the presumption that gas is present over the entirety of an image in order to make the determination of whether it is gas or not with respect to each pixel or each partial region, there are cases in which, depending upon pixel, the gas concentration length cannot be calculated from the relation between the with-gas background temperature, the without-gas background temperature, and the gas temperature. This is inconvenient, because even when filter processing for observing spatial change in an image is to be performed in order to make the determination of whether it is gas or not, the filter processing cannot be performed, for example.

With reference to FIGS. 20A and 20B, a concentration length correlation value can be defined using the following formula.

Correlation value=(temperature difference between with-gas background temperature and without-gas background temperature)/(temperature difference between gas temperature and without-gas background temperature) (Formula)

The correlation value is a value yielded by dividing the temperature difference between the with-gas background temperature and the without-gas background temperature by the temperature difference between the without-gas background temperature and the gas temperature. The first one of the temperature differences is, in other words, the amplitude of the temperature change brought about by gas. One example of a method for determining the with-gas background temperature and the without-gas background temperature is described in [Processing for Calculating Gas Concentration Lengths] section in the first mode of the present embodiment.

Note that the calculation of the correlation value can also be performed by approximating and using the amplitude, which is the difference between the maximum value and the minimum value of the temperature change, as the temperature difference between the with-gas background temperature and the without-gas background temperature, and approximating and using a temperature difference between the gas temperature and an average of the maximum value and the minimum value of the temperature change as the temperature difference between the gas temperature and the without-gas background temperature. In such a case, the gas-detection image-processing device 3 would be capable of calculating the correlation value by only finding the maximum value and maximum value of the temperature change, without determining the with-gas background temperature and the without-gas background temperature.

Figure 24:
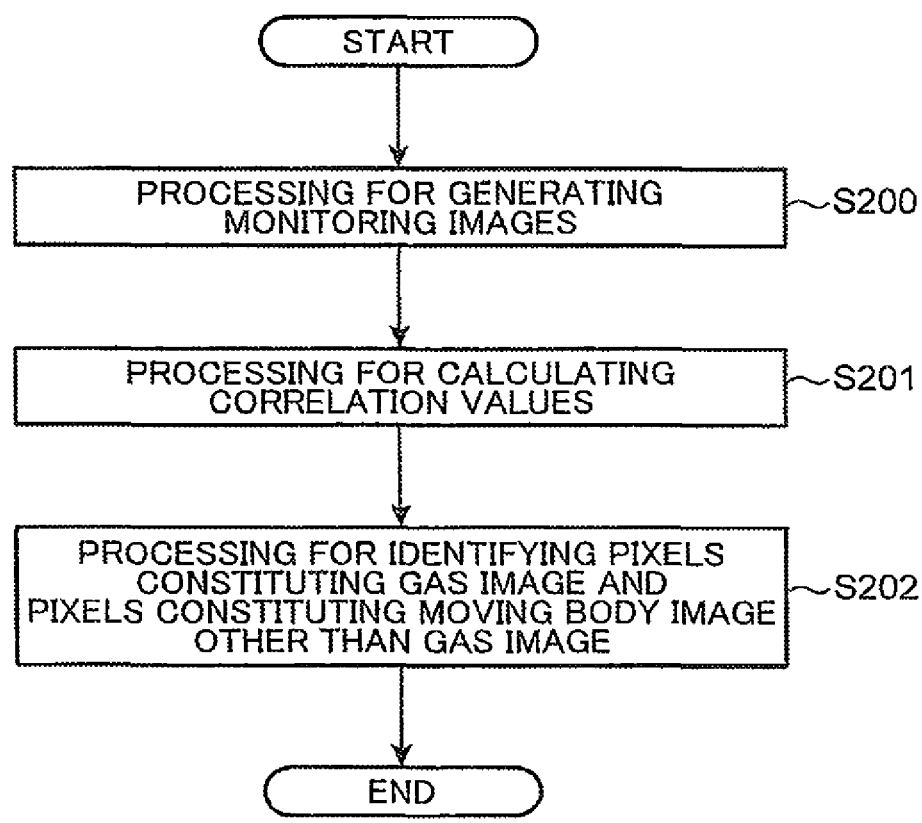
FIG. 24 is a flowchart describing a second mode of the present embodiment.

FIG. 24 is a flowchart describing the second mode of the present embodiment. The second mode is constituted of: processing for generating monitoring images (step S200); processing for calculating gas concentration length correlation values (step S201); and processing for identifying pixels included in a monitoring image that constitute a gas image and pixels included in the monitoring image that constitute a moving body image other than a gas image (step S202). The processing for generating monitoring images (step S200) is the same as the processing for generating monitoring images (step S100), which is shown in FIG. 3, in the first mode. Accordingly, description of the processing for generating monitoring images (step S200) is omitted.

Figure 25:
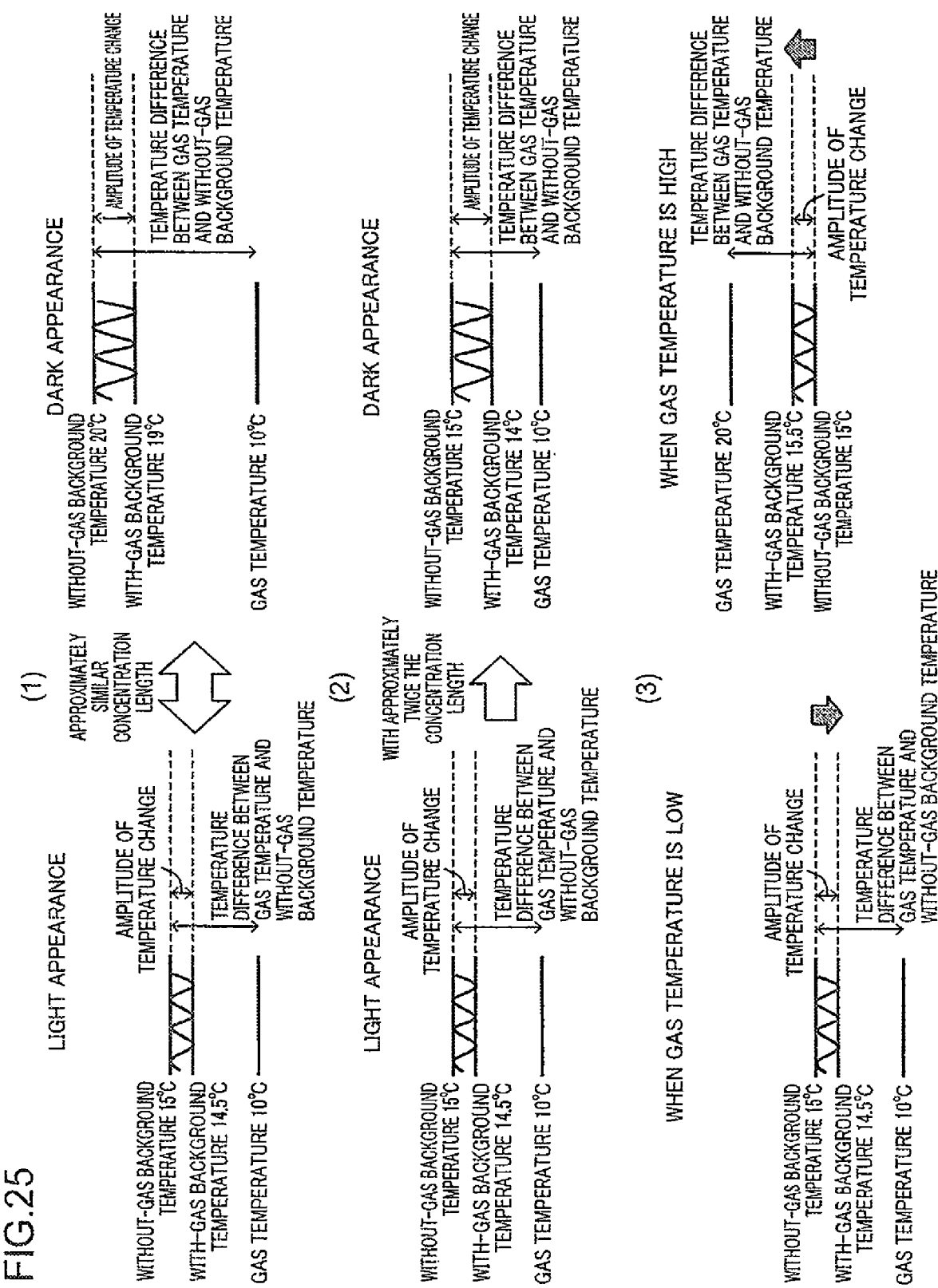
FIG. 25 is an explanatory diagram describing fundamental characteristics of gas concentration lengths.

Description is provided starting from the processing for calculating correlation values (step S201). In the second mode of the present embodiment, correlation values are used in place of concentration lengths. Before providing description of the reason for this, the fundamental characteristics of concentration lengths are described. FIG. 25 is an explanatory diagram describing the fundamental characteristics of concentration lengths. The concentration lengths have the three fundamental characteristics (1) to (3).

(1) When the concentration length is the same, the greater the difference between the without-gas background temperature and the gas temperature, the darker a gas image appears in a monitoring image. That is, the amplitude of the temperature change becomes greater. (2) When the without-gas background temperature is the same and also the gas temperature is the same, the greater the concentration length, the darker a gas image appears in the monitoring image. That is, the amplitude of the temperature change becomes greater. (3) When the gas temperature is lower than the without-gas background temperature, the with-gas background temperature becomes higher than the gas temperature and lower than the without-gas background temperature. Meanwhile, when the gas temperature is higher than the without-gas background temperature, the with-gas background temperature becomes lower than the gas temperature and higher than the without-gas background temperature.

According to characteristics (1) to (3), the correlation value serves as the major factor determining the magnitude of the concentration length, and the greater the correlation value, the greater the concentration length, and the smaller the correlation value, the smaller the concentration length.

Figure 27:
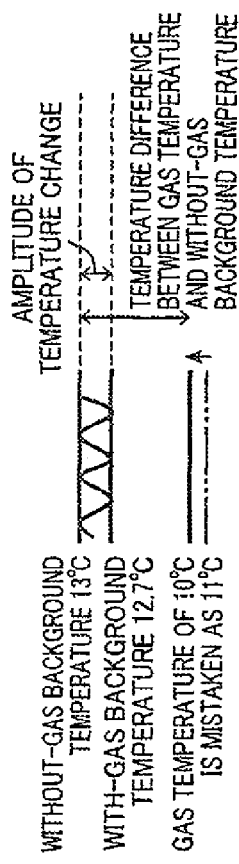
FIG. 27 is an explanatory diagram describing problem <2> of the concentration length visualization image.

A concentration length visualization image (for example, image I31a shown in FIG. 23) is calculated while presuming that gas is present at regions respectively corresponding to the plurality of pixels constituting the image (the region corresponding to the entirety of the image). This gives rise to the two following problems <1> and <2>. FIG. 26 is an explanatory diagram describing problem <1> of the concentration length visualization image. FIG. 27 is an explanatory diagram describing problem <2> of the concentration length visualization image.

<1> With reference to FIG. 26 and according to characteristic (3) shown in FIG. 25, the gas temperature never falls between one of the without-gas background temperature and the with-gas background temperature and the other one of the without-gas background temperature and the with-gas background temperature. Among the plurality of pixels (in other words, all pixels) constituting an infrared image, concentration lengths corresponding to pixels at which such a relation between temperatures occurs cannot be calculated. When attempting to calculate concentration lengths under the presumption that gas is present over the entirety of an image in order to make the determination of whether it is gas or not with respect to each pixel or each partial region, there are cases in which, depending upon pixel, the gas concentration length cannot be calculated from the relation between the with-gas background temperature, the without-gas background temperature, and the gas temperature. This is inconvenient, because even when filter processing for observing spatial change in an image is to be performed in order to make the determination of whether it is gas or not, the filter processing cannot be performed, for example.

The correlation value is defined by using (Formula) described above. Accordingly, the correlation value can be determined even if the gas temperature falls between one of the without-gas background temperature and the with-gas background temperature and the other one of the without-gas background temperature and the with-gas background temperature. Accordingly, in a correlation value visualization image, all correlation values respectively corresponding to the plurality of pixels constituting the image can be set, and thus, there is no inconvenience when performing image processing in which all of the plurality of pixels constituting the image are used.

<2> Gas temperature is prone to measurement errors. While numerical values of concentration lengths are not shown in FIG. 27, when the difference between the gas temperature and the without-gas background temperature is small, a small error in gas temperature gives rise to a great error in the gas concentration length, compared to when the difference between the gas temperature and the without-gas background temperature is great. When seen in a different way, with reference to FIG. 28, the concentration length becomes great in two cases, namely a case in which the concentration length is actually great, and a case in which, for example, the concentration length has become great due to a measurement error in the gas temperature. The latter case occurs when the difference between the gas temperature and the without-gas background temperature is small.

The correlation value visualization image is an image approximating the concentration length visualization image, and problem <1> can be eliminated as described above by using the correlation value visualization image. Note that problem <2> also occurs with correlation values. To provide specific description, the correlation value expressed by (Formula) provided above can be expressed as "amplitude of temperature change/temperature difference between gas temperature and without-gas background temperature". Suppose that the gas temperature is measured as 11° C., although the actual gas temperature is 10° C., as shown in FIG. 27. When the temperature difference between the gas temperature and the without-gas background temperature is great, the error in the correlation value becomes 1.5 times (=0.15/0.1). Meanwhile, when the temperature difference between the gas temperature and the without-gas background temperature is small, the error in the correlation value becomes 3 times (=0.3/0.1).

Figure 29A:
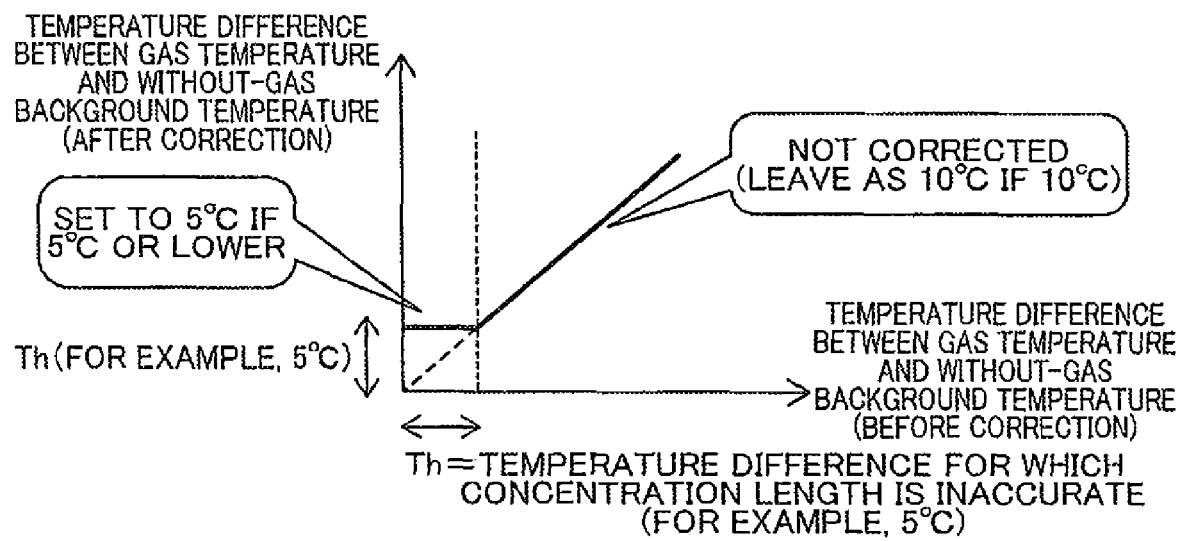
FIG. 29A is a first explanatory diagram describing a correction of a temperature difference between the gas temperature and the without-gas background temperature in correlation values.
Figure 29B:
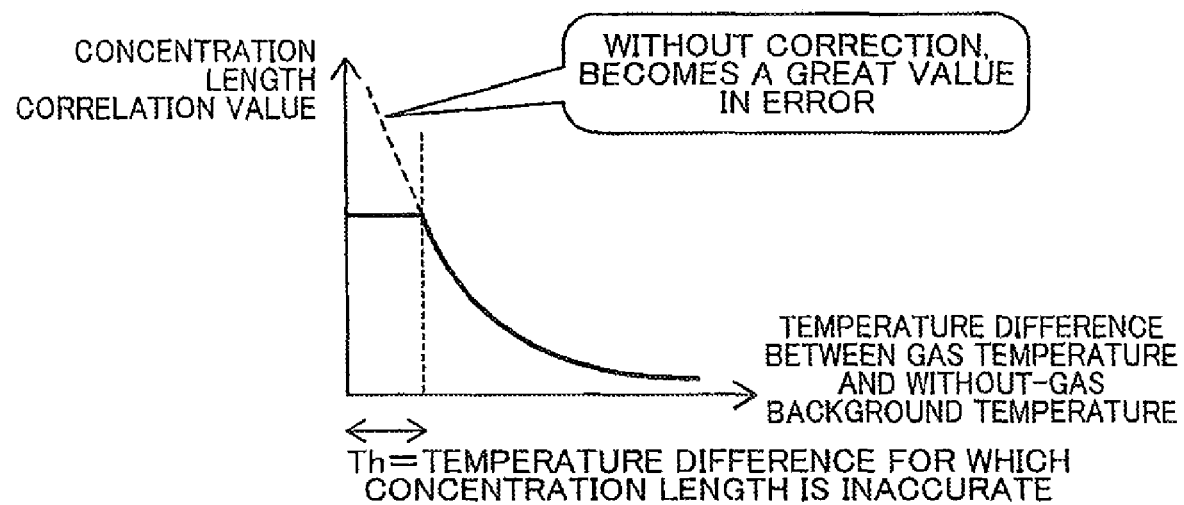
FIG. 29B is a second explanatory diagram describing the correction of the temperature difference between the gas temperature and the without-gas background temperature in correlation values.

Hence, as shown in FIGS. 29A and 29B, in the case in which correlation values are used, the calculation unit 10 (FIG. 1A), when the temperature difference between the gas temperature and the without-gas background temperature is equal to or smaller than a predetermined threshold value Th, corrects the difference and calculates correlation values. FIG. 29A is a first explanatory diagram describing the correction of the temperature difference between the gas temperature and the without-gas background temperature in correlation values. FIG. 29B is a second explanatory diagram describing the correction of the temperature difference between the gas temperature and the without-gas background temperature in correlation values.

With reference to FIG. 29A, the correction is clipping processing. A temperature difference (for example, 5° C.) between the gas temperature and the without-gas background temperature that deteriorates the accuracy of gas concentration lengths is to be used as the threshold value Th. The correction of the temperature difference between the gas temperature and the without-gas background temperature is such that: when the temperature difference between the gas temperature and the without-gas background temperature is equal to or smaller than the threshold value Th, the threshold value Th is set as the temperature difference between the gas temperature and the without-gas background temperature (for example, when the temperature difference is 3° C., the threshold value 5° C. is set as the temperature difference); and when the temperature difference between the gas temperature and the without-gas background temperature is greater than the threshold value Th, this temperature difference is set as the temperature difference between the gas temperature and the without-gas background temperature (for example, when the temperature difference is 10° C., 10° C. is set as the temperature difference).

As shown by the graph in FIG. 29B, the correlation value does not become excessively great and rather, becomes a fixed value within the temperature range of the threshold value Th or lower when the correction of the temperature difference between the gas temperature and the without-gas background temperature is performed, even if an error (for example, a measurement error in gas temperature) occurs.

Next, the correlation value visualization image is described through a comparison with the concentration length visualization image. FIG. 30 is an image diagram showing various images of a testing site taken during the daytime. FIG. 31 is an image diagram showing various images of the testing site taken during the nighttime. With reference to FIGS. 30 and 31, images I40 and I50 are infrared images of the testing site. Image I41 is a concentration length visualization image generated by using image I40. Image I51 is a concentration length visualization image generated by using image I50. In images I41 and I51, the lighter the shade, the greater the concentration lengths, and the darker the shade, the smaller the concentration lengths.

White portions are present at some parts of image I41 and are present covering a significant portion of image I51. The pixels constituting the white portions have great corresponding concentration lengths. As described above, the concentration length becomes great in two cases. namely the case in which the concentration length is actually great, and the case in which, for example, the concentration length has become great due to error. In particular, the error in concentration lengths becomes great at the white portions of images I42 and I52 indicating that the difference between the gas temperature and the without-gas background temperature is small (the temperature difference at the white portions is 5° C. or smaller). Hence, it cannot be determined whether concentration lengths are actually great or concentration lengths are great due to error, in particular even if the area covered by white portions is great as shown in image I51.

Image I43 is a correlation value visualization image generated by using image I40. Image I53 is a correlation value visualization image generated by using image I50. Correlation values have been calculated by setting the threshold value Th (FIGS. 29A and 29B) to 5° C. and correcting the "temperature difference between the gas temperature and the without-gas background temperature". The portions where correlation values were great due to errors have changed from white portions to black or gray portions, and the portions where correlation values are actually great are shown by white portions.

Image I44 is a correlation value visualization image generated by using image I40. Image I44 is an image for comparison with image I43, and correlation values have been calculated by setting the threshold value Th to 0.1° C. The threshold value Th of 0.1° C. is set for the sake of convenience in order to avoid correlation values from becoming infinite, and indicates that substantially no correction is performed. Image I54 is a correlation value visualization image generated by using image I50. Image I54 is an image for comparison with image I53, and correlation values have been calculated by setting the threshold value Th to 0.1° C. When the difference between the gas temperature and the without-gas background temperature is small (for example, at nighttime), the error in correlation values becomes great. Hence, the area covered by white portions becomes great in image I54 similarly to in image I51, and it can be seen that concentration lengths cannot be calculated appropriately.

Correlation value visualization images are created as follows. With reference to FIG. 1A, the calculation unit 10 performs processing for calculating correlation values with respect to each of the infrared images constituting the moving image data D1 having been used for the processing in step S200 (step S100). In this processing, correlation values are calculated for regions respectively corresponding to the plurality of pixels (in other words, all pixels) constituting an infrared image. To provide specific description, for the infrared image at time point T10 shown in FIG. 13, for example, correlation values are calculated for the M number of regions respectively corresponding to the M number of pixels. That is, the calculation unit 10, by using an infrared image, calculates correlation values respectively corresponding to the plurality of pixels constituting the infrared image, as identification values.

Description is provided of the method for calculating correlation values. The computation processing unit 9 determines the with-gas background temperature and the without-gas background temperature for a predetermined pixel among the plurality of (M number of) pixels constituting an infrared image such that the background temperature indicated by the pixel data of the predetermined pixel when gas is present in a region, corresponding to the predetermined pixel, of the background (for example, FIGS. 13 and 14) including the monitoring target (not illustrated) is determined as the with-gas background temperature and the background temperature indicated by the pixel data of the predetermined pixel when gas is not present in the region is determined as the without-gas background temperature. The computation processing unit 9 performs ins the determination of the with-gas background temperature and the without-gas background temperature with respect to each of the plurality of (M number of) pixels constituting the infrared image, by setting each of the plurality of (M number of) pixels constituting the infrared image as the predetermined pixel.

The calculation unit 10, by using (Formula) described above and the with-gas background temperatures and the without-gas background temperatures having been determined by the computation processing unit 9, calculates, as identification values, correlation values respectively corresponding to the plurality of (M number of) pixels constituting the infrared image. The image generation unit 8 generates an image (a correlation value visualization image) visualizing the correlation values having been calculated by the calculation unit 10.

The identification unit 11 calculates, for each of the plurality of pixels constituting the correlation value visualization image, a spatial change amount (for example, an edge amount) of the corresponding identification value, and on the basis of the calculated spatial change amounts, specifies pixels constituting a moving body image (a non-gas image) other than a gas image. Preferably, the spatial change amounts are values yielded through spatial differentiation of the respective ones of the identification values of the plurality of pixels constituting the correlation value visualization image. The identification unit 11 calculates differential values for the respective ones of the plurality of pixels constituting the correlation value visualization image, the differential values being values yielded through spatial differentiation of the identification values; compares the calculated differential values with a predetermined threshold value; and specifies a corresponding pixel of each of differential values exceeding the threshold value as a pixel constituting a moving body image other than a gas image.

Figure 32:
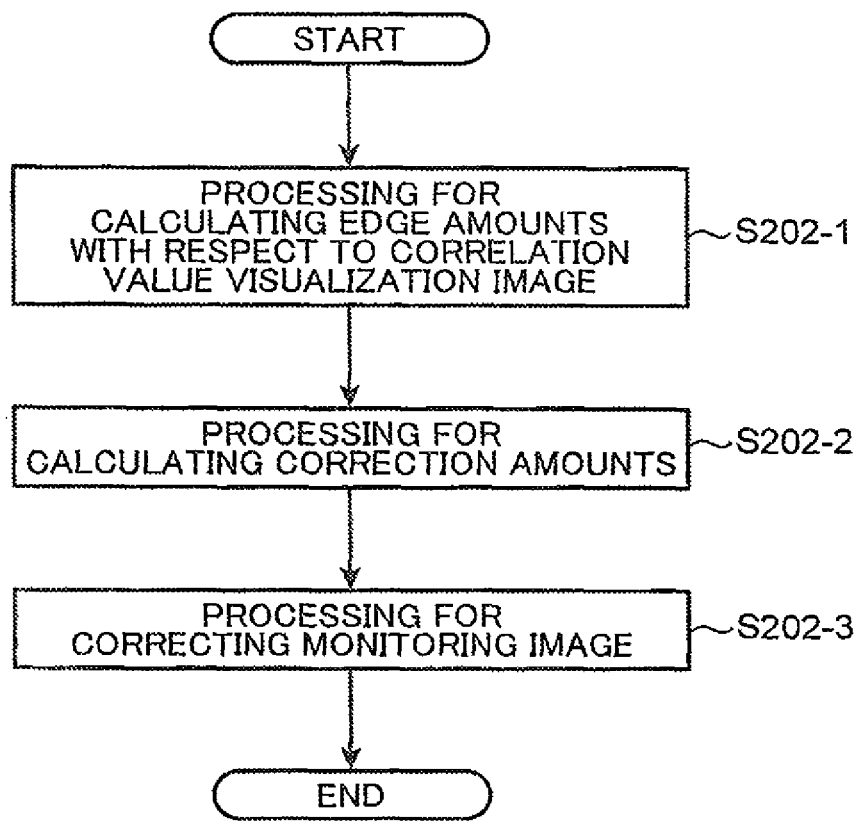
FIG. 32 is a flowchart describing identification processing (step S202 of FIG. 24).
Figure 33:
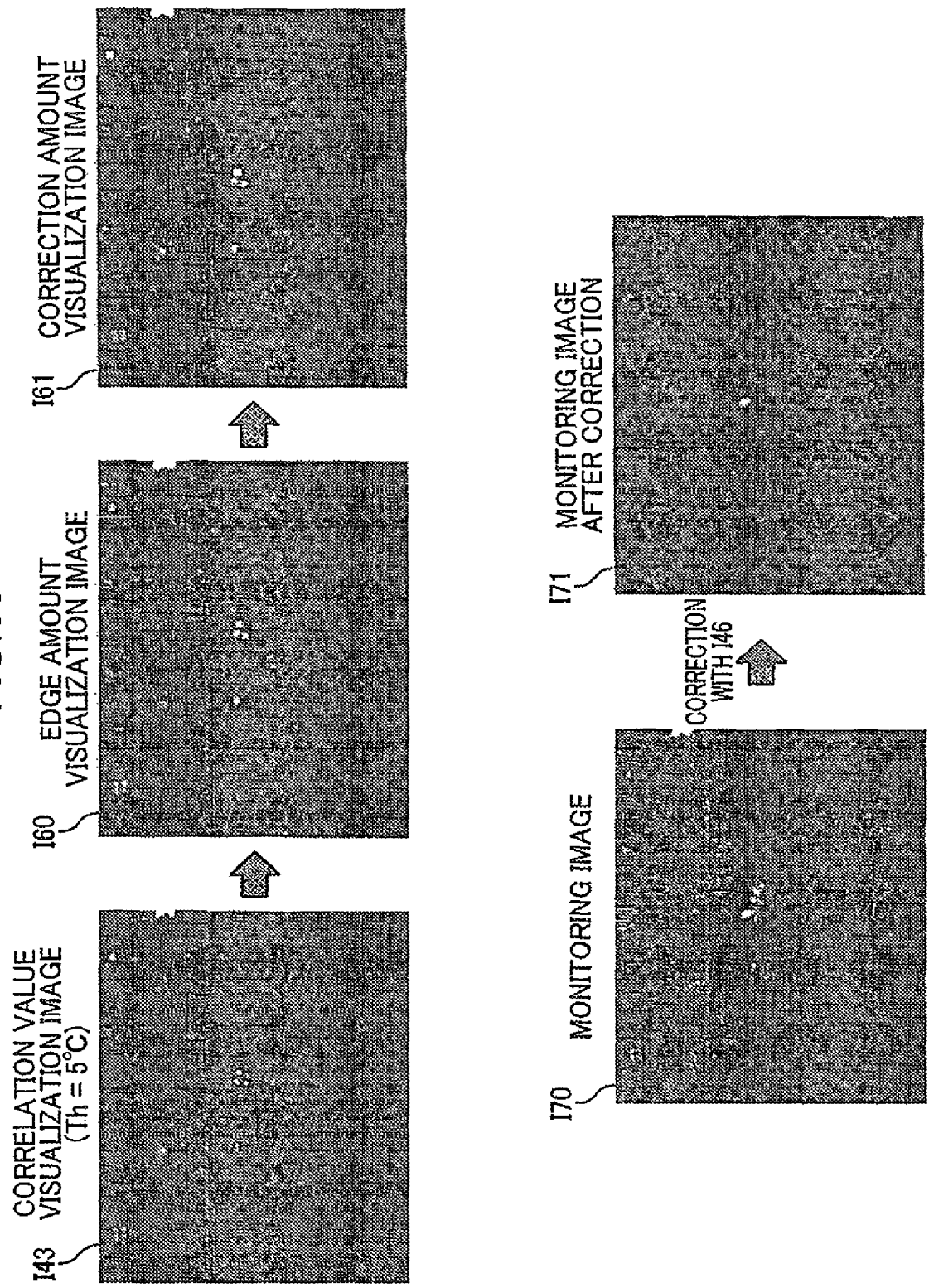
FIG. 33 is an image diagram showing various images related to the identification processing (step S202 of FIG. 24).

As described above, the identification unit 11 performs processing for identifying pixels included in a monitoring image that constitute a gas image and pixels included in the monitoring image that constitute a moving body image other than a gas image by using the correlation value visualization image (step S202 in FIG. 24). This processing is described in detail with reference to FIGS. 32 and 33. FIG. 32 is a flowchart describing the identification processing (step S202) shown in FIG. 24. This processing is constituted of: processing for calculating edge amounts in the correlation value visualization image (step S202-1); processing for calculating correction amounts (step S202-2); and processing for correcting a monitoring image (step S202-3). FIG. 33 is an image diagram showing various images related to the identification processing (step S202) shown in FIG. 24.

Image I43 is the correlation value visualization image described on the basis of FIG. 30, and includes pixels included in the monitoring image that constitute a gas image, and pixels included in the monitoring image that constitute a moving body image other than a gas image. A correlation value visualization image is an image visualizing correlation values, and is not an image showing a gas image and a moving body image other than a gas image. Spatial change is moderate for correlation values corresponding to pixels included in the monitoring image that constitute the gas image, among the plurality of pixels (in other words, all pixels) constituting image I43. In other words, the difference between a correlation value corresponding to a pixel of interest and correlation values corresponding to pixels located in the periphery of the pixel of interest is relatively small. This is because gas having leaked drifts slowly while swaying. Hence, when this difference is relatively great, it can be determined that the pixel of interest is not a pixel included in the monitoring image that constitutes a gas image but rather is a pixel included in the monitoring image that constitutes a moving body image. Pixels of interest for which the above-described difference is relatively great can be specified based on edge amounts.

An edge amount is a value related to the difference between a pixel value for the pixel of interest and pixel values for pixels located in the periphery of the pixel of interest. The edge amount, for example, can be calculated by summing absolute values of differences from 24 pixels in the periphery (the vicinity in the case of 5×5 pixels). The edge amount can also be calculated by using a Sobel filter, etc. As description is provided in the following, the identification unit 11 calculates an edge amount for each of the plurality of pixels constituting the correlation value visualization image, and on the basis of the calculated edge amounts (that is, on the basis of the spatial change in correlation values), identifies pixels included in the monitoring image that constitute a gas image and pixels included in the monitoring image that constitute a moving body image other than a gas image.

The identification unit 11 calculates edge amounts respectively corresponding to the plurality of pixels constituting a correlation value visualization image as shown in image I43 (step S202-1). Image I60 is an image visualizing the edge amounts respectively corresponding to the plurality of pixels constituting image I43. The identification unit 11 performs processing for calculating correction amounts (step S202-2). To provide specific description, a pixel whose edge amount exceeds a predetermined threshold value is not regarded as a pixel constituting a gas image, and rather, is regarded as a pixel that constitutes a moving body image other than a gas image. For a pixel whose edge amount exceeds the threshold value, the identification unit 11 calculates a correction value by subtracting a fixed value from the edge amount and then multiplying the result by a coefficient, and then divides the value indicated by the pixel by the correction value. Meanwhile, the identification unit 11 does not perform correction with respect to pixels whose edge values are equal to or smaller than the threshold value. Hence, the identification unit 11 performs correction of decreasing the identification values of pixels included in the monitoring image and constituting a moving body image (non-gas image) other than a gas image, the pixels being specified by the identification unit 11.

Image I61 is an image visualizing the correction amounts respectively corresponding to the plurality of pixels constituting image I60. The whiter an image portion, the greater the correction amount, and the blacker an image portion, the smaller the correction amount.

The image generation unit 8 generates an image yielded by correcting the monitoring image by using the correction amounts having been calculated in step S202-2 (step S202-3). For example, the pixel values respectively corresponding to the plurality of pixels constituting the monitoring image are divided by the correction amounts for the respective pixels.

Image I70 is a monitoring image before correction generated by using image I40 shown in FIG. 30. Image I71 is an image yielded by correcting image I70 by using the correction amounts having been calculated in step S202-2. In image I71, moving body images have changed from white portions to black portions and gray portions due to great correction amounts having been applied. Meanwhile, a gas image remains as a white portion due to having amounts that are not subjected to correction. In image I71, the white portion at the center indicates a gas image. In image I70, there are many white portions other than a gas image. In image I71, however, these white portions are attenuated. Hence, in image I71, which is the monitoring image after correction, the luminance of moving body images can be suppressed compared to the luminance of a gas image.

The processing for calculating edge amounts (step S202-1), the processing for calculating correction amounts (step S202-2), and the processing for correcting the monitoring image (step S202-3) can be expressed as follows. The identification unit 11 calculates edge amounts for the respective ones of the plurality of pixels constituting a correlation value visualization image, compares the calculated edge amounts with a predetermined threshold value, and specifies pixels whose edge amounts exceed the threshold value as pixels included in the monitoring image that constitute a moving body image. The image generation unit 8, by correcting pixels, among the plurality of pixels constituting a monitoring image, that match with the pixels specified by the identification unit 11 as pixels in the monitoring image that constitute a moving body image, generates a monitoring image in which the luminance of a moving body image is suppressed compared to the luminance of a gas image (in other words, a monitoring image corrected so that a moving body image does not stand out as much as a gas image).

Hence, the identification unit 11 compares absolute values of identification values respectively corresponding to a plurality of pixels constituting an infrared image with a predetermined threshold value, and specifies a corresponding pixel of each of the absolute values of the identification values that exceed the threshold value as a pixel constituting a non-gas image (for example, a moving body image other than a gas image).

Description is provided of the third mode of the present embodiment. The second mode of the present embodiment, when the difference between a correlation value corresponding to a pixel of interest and correlation values corresponding to pixels in the periphery of the pixel of interest is great in a correlation value visualization image, regards the pixel of interest as a pixel constituting a moving body image other than a gas image, and identifies pixels constituting a gas image and pixels constituting a moving body image. That is, the second mode of the present embodiment makes the above-described identification by using spatial change in correlation values. Meanwhile, the third mode of the present embodiment makes the above-described identification by using a temporal change in correlation values.

Figure 34:
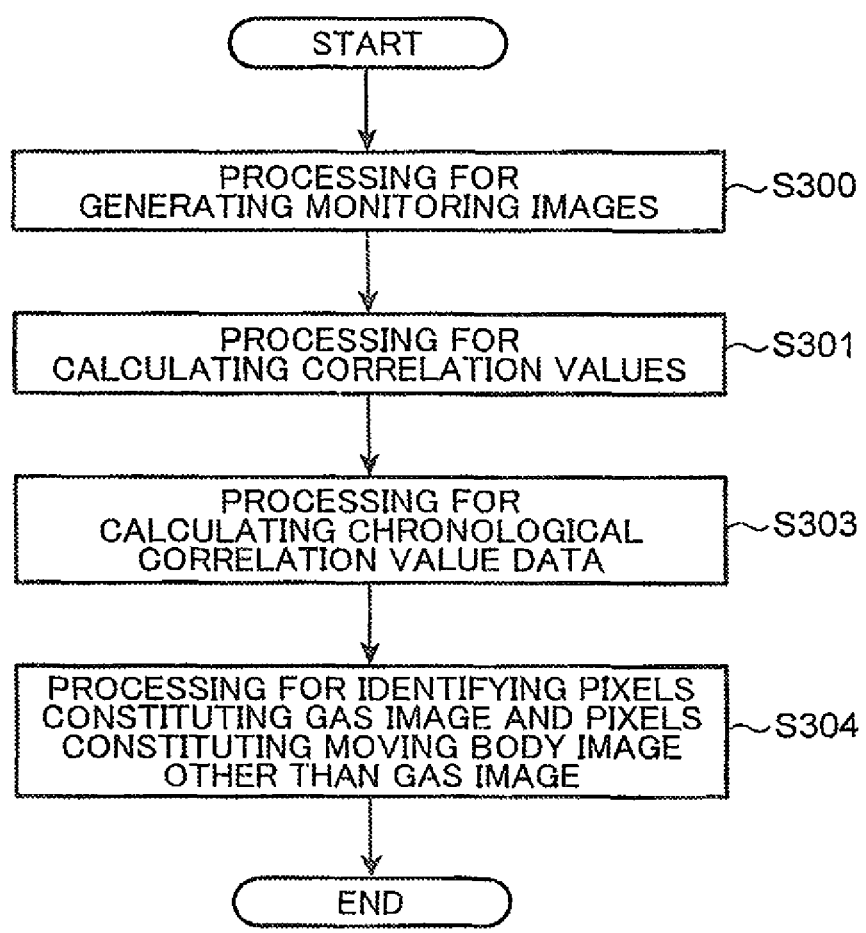
FIG. 34 is a flowchart describing a third mode of the present embodiment.

FIG. 34 is a flowchart describing the third mode of the present embodiment. The third mode is constituted of: processing for generating monitoring images (step S300); processing for calculating gas concentration length correlation values (step S301); processing for calculating chronological correlation value data (step S303); and processing for identifying pixels included in a monitoring image that constitute a gas image and pixels included in the monitoring image that constitute a moving body image other than a gas image (step S304). The processing for generating monitoring images (step S300) and the processing for calculating correlation values (step S301) are the same as the processing for generating monitoring images (step S200) and the processing for calculating correlation values (step S201) in the second mode shown in FIG. 24. Accordingly, description of the processing for generating monitoring images (step S300) and the processing for calculating correlation values (step S301) is omitted.

Figure 35:
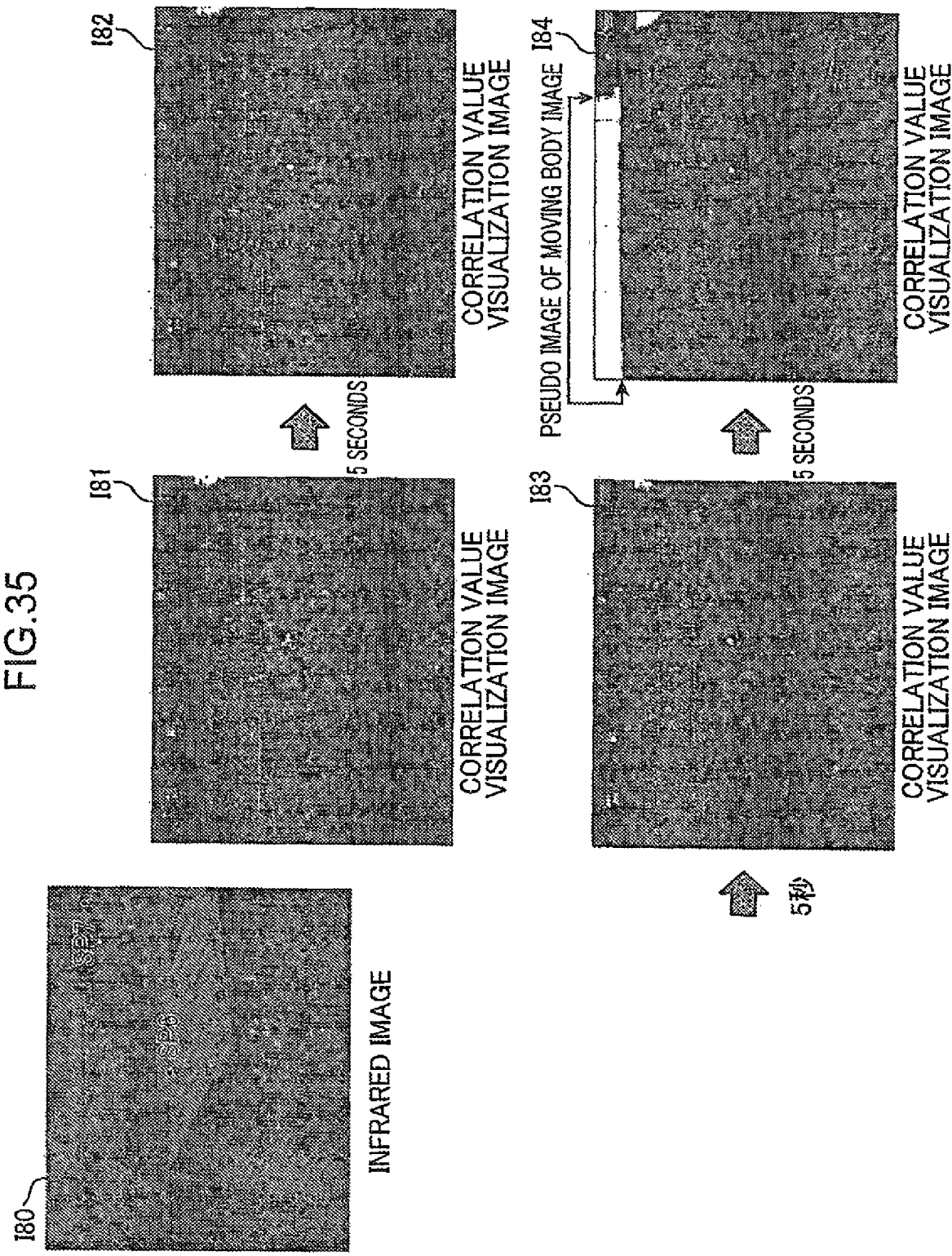
FIG. 35 is an image diagram showing correlation value visualization images lined up in chronological order.

The image generation unit 8 generates correlation value visualization images lined up in chronological order. FIG. 35 is an image diagram showing correlation value visualization images lined up in chronological order. Image I80 is an infrared image of a testing site. At the testing site, there is a spot SP6 from which gas is emitted and a spot SP7 at which a moving body appears. Spots SP6 and SP7 are each represented by one pixel. Some (four) correlation value visualization images, among correlation value visualization images having been generated by using a moving image of infrared images of the testing site, are illustrated as images I81 to I84. Image I82 is an image after five seconds have elapsed from image I81, image I83 is an image after five seconds have elapsed from image I82, and image I84 is an image after five seconds have elapsed from image I83. In image I84, an image formed by pixels that constitute a moving body image (in other words, an image corresponding to a moving body image) is shown.

Figure 36:
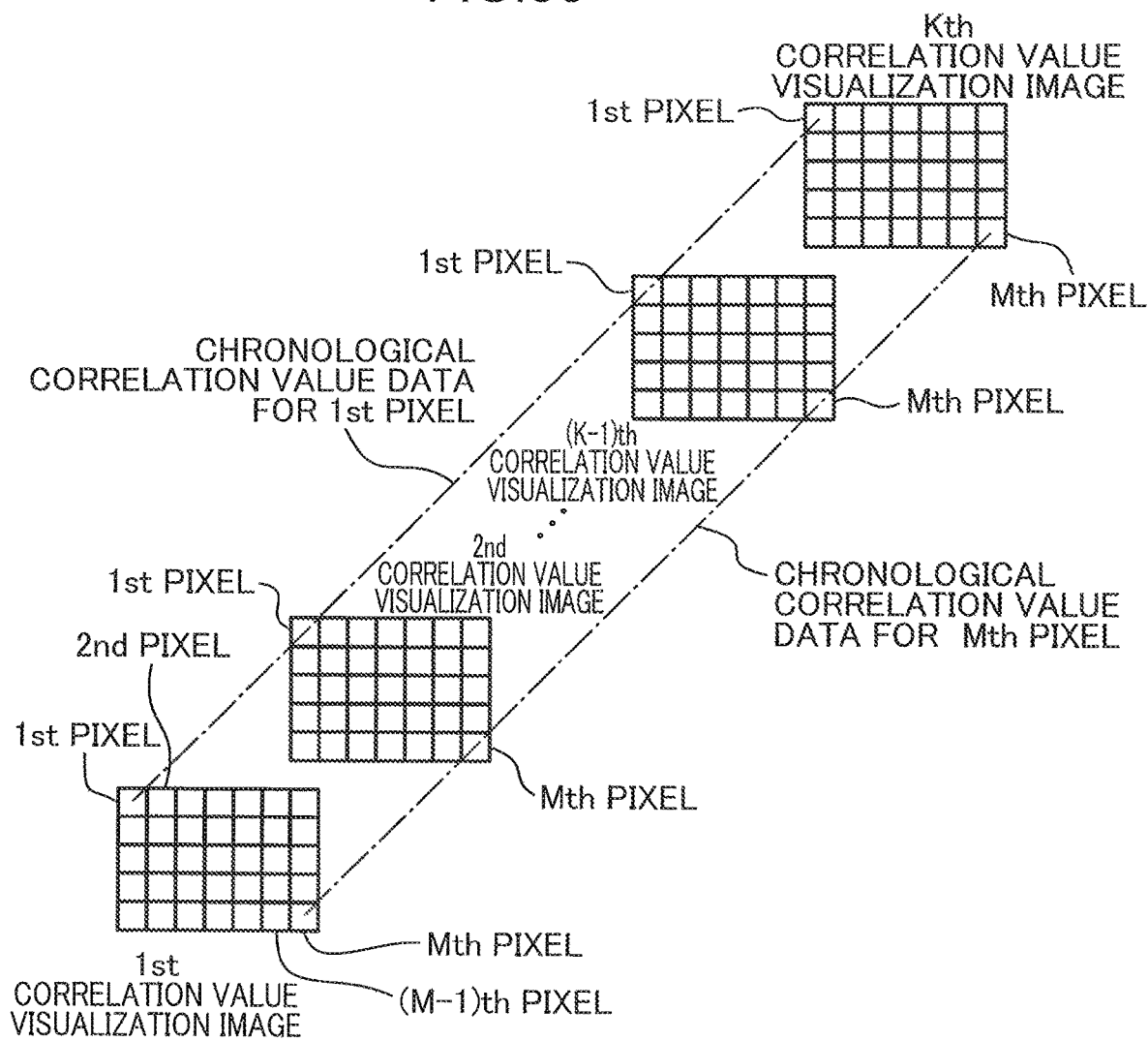
FIG. 36 is an explanatory diagram describing chronological correlation value data.

Description is provided of the processing for calculating chronological correlation value data (chronological identification value data) (step S303). FIG. 36 is an explanatory diagram describing the chronological correlation value data (the chronological identification value data). Suppose that a K number of correlation value visualization images are lined up in chronological order. Each correlation value visualization image is constituted of correlation values respectively corresponding to the M number of (a plurality of) pixels, namely the correlation value corresponding to the 1st pixel, the correlation value corresponding to the 2nd pixel, . . . , the correlation value corresponding to the (M−1)th pixel, and the correlation value corresponding to the Mth pixel.

Correlation values corresponding to pixels located at the same spatial position in the plurality of (K number of) correlation value visualization images refer to correlation values corresponding to pixels at the same ordinal position. For example, when providing description based on the 1st pixel, the chronological correlation value data of correlation values for the 1st pixel is data in which the correlation value corresponding to the 1st pixel included in the 1st correlation value visualization image, the correlation value corresponding to the 1st pixel included in the 2nd correlation value visualization image, . . . , the correlation value corresponding to the 1st pixel included in the (K−1)th correlation value visualization image, and the correlation value corresponding to the 1st pixel included in the Kth correlation value visualization image are lined up in chronological order. The number of pieces of the chronological correlation value data is equal to the number of (the M number of) pixels constituting a single correlation value visualization image.

The calculation unit 10 generates M pieces of (a plurality of) chronological correlation value data, namely the chronological correlation value data of correlation values corresponding to the 1st pixel, the chronological correlation value data of correlation values corresponding to the 2nd pixel, . . . , the chronological correlation value data of correlation values corresponding to the (M−1)th pixel, and the chronological correlation value data of correlation values corresponding to the Mth pixel.

Next, description is provided regarding the processing for identifying pixels included in a monitoring image that constitute a gas image and pixels included in the monitoring image that constitute a moving body image other than a gas image (step S304). In the third mode of the present embodiment, the above-described identification is made by making use of temporal change in correlation values. Gas having leaked from a monitoring target slowly spreads while swaying. Due to this, a correlation value corresponding to a pixel constituting a gas image changes gradually (change moderately) along the time axis. When there is a rapid change in correlation value in the time axis, the pixel corresponding to the correlation value can be regarded as a pixel constituting a moving body image other than a gas image. In view of this, the identification unit 11 determines whether or not there is a rapid change in correlation value in the time axis by using the chronological correlation value data. Detailed description is provided in the following.

With reference to FIG. 36, the identification unit 11 performs abnormal value determination of determining whether or not the chronological correlation value data corresponding to a predetermined pixel among the plurality of (M number of) pixels constituting a correlation value visualization image includes a correlation value having an abnormal value. The identification unit 11 performs the abnormal value determination with respect to each of the plurality of (M number of) pixels constituting the correlation value visualization image by setting each of the plurality of (M number of) pixels constituting the correlation value visualization image as the predetermined pixel, and specifies a pixel corresponding to chronological correlation value data including a correlation value having an abnormal value as a pixel included in a monitoring image that constitute a moving body image.

That is, the calculation unit 10 performs the determination of whether or not a correlation value having an abnormal value is included, with respect to each chronological correlation value data from the chronological correlation value data for the 1st pixel to the chronological correlation value data for the Mth pixel. For example, when the chronological correlation value data for the 1st pixel includes a correlation value having an abnormal value, the calculation unit 10 specifies the 1st pixel of the correlation value visualization image as a pixel that constitutes a moving body image. The determination of whether or not a correlation value has an abnormal value can be performed by using a threshold value. That is, the calculation unit 10 determines a correlation value, included in the chronological correlation value data, that exceeds the threshold value as an abnormal value.

In the third mode of the present embodiment, the determination of whether or not a correlation value having an abnormal value is included in chronological correlation value data is performed by using a histogram. For each of the 1st to Mth pieces of chronological correlation value data shown in FIG. 36, the identification unit 11 generates a histogram indicating the frequency of appearance of the same correlation values. That is, the identification unit 11 generates a histogram of correlation values corresponding to the 1st pixel on the basis of the chronological correlation value data of correlation values corresponding to the 1st pixel, generates a histogram of correlation values corresponding to the 2nd pixel on the basis of the chronological correlation value data of correlation values corresponding to the 2nd pixel, ..., generates a histogram of correlation values corresponding to the (M−1)th pixel on the basis of the chronological correlation value data of correlation values corresponding to the (M−1)th pixel, and generates a histogram of correlation values corresponding to the Mth pixel on the basis of the chronological correlation value data of correlation values corresponding to the Mth pixel.

FIG. 37 is an explanatory diagram describing histograms generated by using chronological correlation value data. Histogram 20 is a histogram having been created on the basis of chronological correlation value data corresponding to spot SP6 (a pixel) from which gas is being emitted. Histogram 21 is a histogram having been created on the basis of chronological correlation value data corresponding to spot SP7 (a pixel) at which a moving body appears. In histograms 20 and 21, the vertical axis indicates the frequency of appearance of the same correlation values, and the horizontal axis indicates correlation values. Note that the actual correlation values are values of one or smaller. Hence, in order so that correlation values can be shown by using integers, values yielded by multiplying the actual correlation values by 40 and truncating the digits beyond the decimal point are used as correlation values. A bar graph is also shown for correlation value 0.

The correlation values corresponding to spot SP6 (a pixel) from which gas is being emitted fluctuate within a predetermined range (here, within the range from 0 to 2). Meanwhile, the correlation values corresponding to spot SP7 (a pixel) at which a moving body appears include values (here, in the range from 17 to 20) differing from the predetermined range (here, within the range from 0 to 2). The identification unit 11 determines such correlation values as abnormal values. That is, the identification unit 11 determines a correlation value that does not belong to a group of correlation values within a predetermined range in a histogram as an abnormal value. The predetermined range is a range of fluctuation of correlation values generated due to gas having leaked from the monitoring target, and the identification unit 11 stores therein in advance data of the range of fluctuation.

In each of the 1st to Mth pieces of chronological correlation value data shown in FIG. 36, the identification unit 11 determines, as an abnormal value, a correlation value not belonging to the group of correlation values within the predetermined range.

On the basis of the determination by the identification unit 11, the image generation unit 8 generates an image yielded by performing binarization of pixels whose correlation values have been determined as being abnormal values and pixels whose correlation values have been determined as not being abnormal values. One example of such an image is image I90 shown in FIG. 37. The white pixels are pixels whose correlation values have been determined as abnormal values, and the black pixels are pixels whose correlation values have been determined as not being abnormal values. The white pixels (the pixels whose correlation values have been determined as being abnormal values) constitute an image (a pseudo image of a moving body image) formed by pixels included in a monitoring image that constitute the moving body image.

As described above, the identification unit 11 performs, with respect to the chronological correlation value data (the chronological identification value data), a specification of pixels that constitute a moving body image other than a gas image on the basis of the above-described histograms (on the basis of the temporal change amounts of identification values having the same values).

Figure 38:
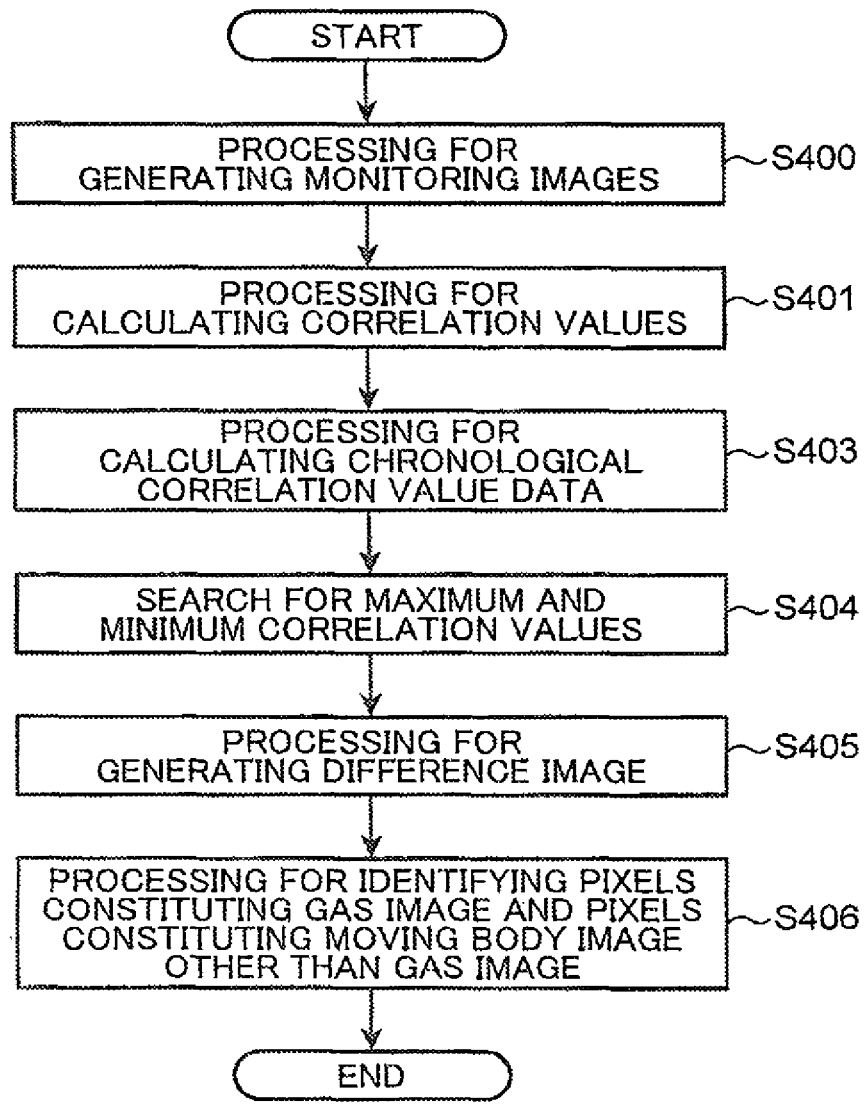
FIG. 38 is a flowchart describing a fourth mode of the present embodiment.

Description is provided of the fourth mode of the present embodiment. In this mode, pixels included in a monitoring image that constitute a gas image and pixels included in the monitoring image that constitute a moving body image other than a gas image are identified by using spatial and temporal change in correlation values. FIG. 38 is a flowchart describing the fourth mode of the present embodiment. The fourth mode is constituted of:

processing for generating monitoring images (step S400); processing for calculating gas concentration length correlation values (step S401); processing for calculating chronological correlation value data (step S403); processing for searching for maximum and minimum correlation values (step S404); processing for generating a differential image (step S405); and processing for identifying pixels included in a monitoring image that constitute a gas image and pixels included in the monitoring image that constitute a moving body image other than a gas image (step S406).

The processing for generating monitoring images (step S400), the processing for calculating gas concentration length correlation values (step S401), and the processing for calculating chronological correlation value data (step S403) are the same as the processing for generating monitoring images (step S300), the processing for calculating gas concentration length correlation values (step S301), and the processing for calculating chronological correlation value data (step S303) in the third mode shown in FIG. 34, and thus, description of such processing is omitted.

Description is provided starting from the search for maximum and minimum correlation values (step S404). The identification unit 11 (FIG. 1A) has the functions of a search unit. With reference to FIG. 36, the search unit performs maximum/minimum value search processing for searching for maximum and minimum correlation values in chronological correlation value data corresponding to a predetermined pixel among the plurality of (M number of) pixels constituting a correlation value visualization image, and performs the maximum/minimum value search processing with respect to each of the plurality of (M number of) pixels constituting the correlation value visualization image by setting each of the plurality of pixels constituting the correlation value visualization image as the predetermined pixel.

That is, the search unit searches for the maximum and minimum correlation values in the chronological correlation value data for each of the 1st to Mth pixels (searches for maximum and minimum correlation values included in the chronological correlation value data for the 1st pixel, searches for maximum and minimum correlation values included in the chronological correlation value data for the 2nd pixel, . . . , searches for maximum and minimum correlation values included in the chronological correlation value data for the (M−1)th pixel, and searches for maximum and minimum correlation values included in the chronological correlation value data for the Mth pixel). For example, the moving image of correlation value visualization images shown in FIG. 35 is a moving image with a 20-second duration, and the chronological correlation value data has a 20-second time period.

Figure 39:
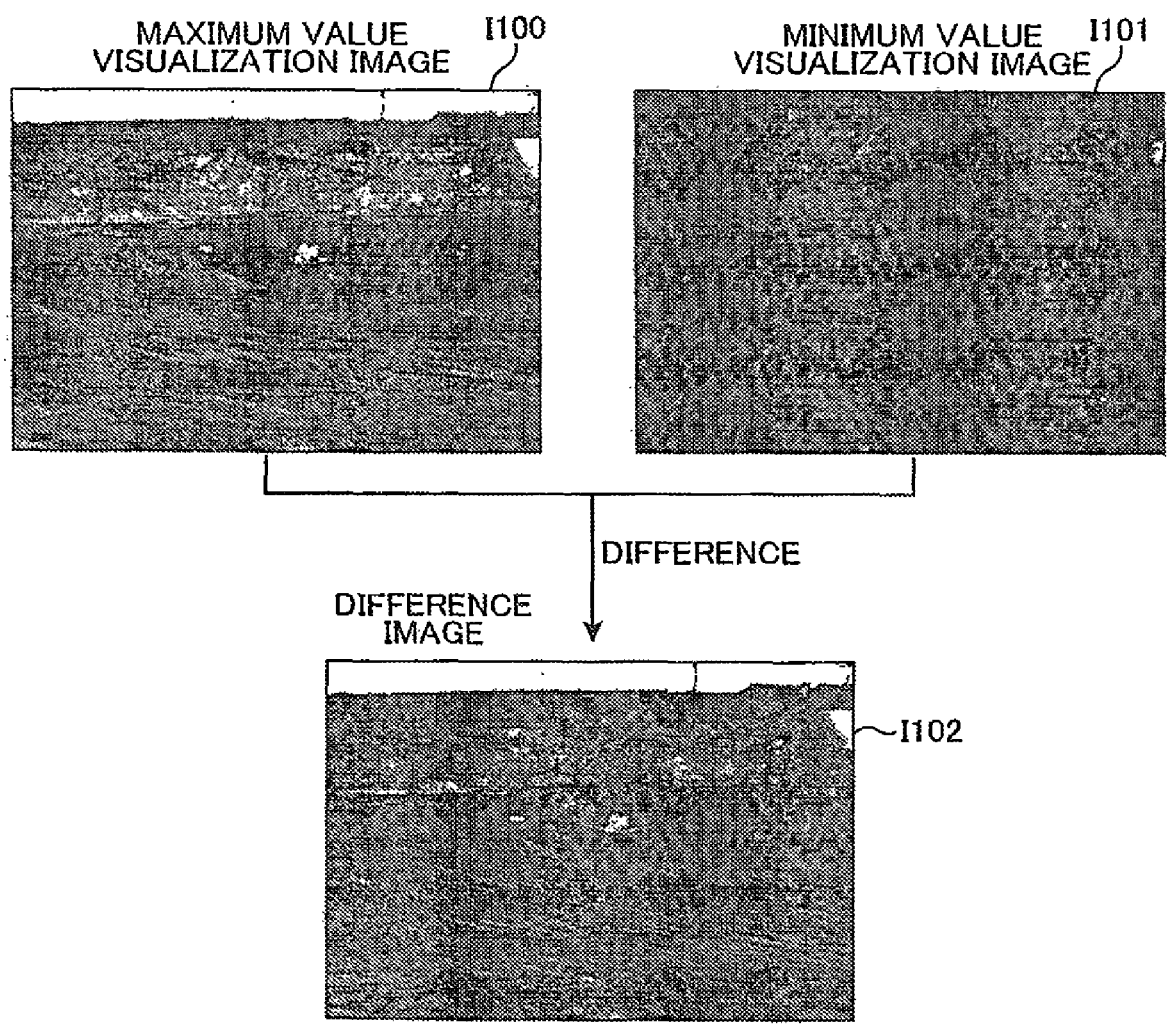
FIG. 39 is an image diagram showing various images related to processing for generating a difference image (step S405 of FIG. 38).

The image generation unit 8 generates a maximum value visualization image visualizing the maximum values found by the search unit and a minimum value visualization image visualizing the minimum values found by the search unit. Further, the image generation unit 8 generates a difference image indicating the difference between the maximum value visualization image and the minimum value visualization image that have been generated (step S405). FIG. 39 is an image diagram showing various images related to the processing for generating the difference image. Image I100 is a maximum value visualization image, image I101 is a minimum value visualization image, and image I102 is a difference image.

With reference to FIG. 36, the maximum value visualization image is an image visualizing the maximum correlation value in the chronological correlation value data for each of the 1st to Mth pixels. That is, the maximum value visualization image is an image visualizing the maximum correlation value included in the chronological correlation value data for the 1st pixel, the maximum correlation value included in the chronological correlation value data for the 2nd pixel, . . . , the maximum correlation value included in the chronological correlation value data for the (M−1)th pixel, and the maximum correlation value included in the chronological correlation value data for the Mth pixel.

The minimum value visualization image is an image visualizing the minimum correlation value in the chronological correlation value data for each of the 1st to Mth pixels. That is, the minimum value visualization image is an image visualizing the minimum correlation value included in the chronological correlation value data for the 1st pixel, the minimum correlation value included in the chronological correlation value data for the 2nd pixel, . . . , the minimum correlation value included in the chronological correlation value data for the (M−1)th pixel, and the minimum correlation value included in the chronological correlation value data for the Mth pixel.

In chronological correlation value data for a given pixel, the maximum correlation value can be regarded as the correlation value at the moment at which the amount of gas present at the region corresponding to the pixel is greatest, and the minimum correlation value can be regarded as the correlation value at the moment at which the amount of gas present at the region corresponding to the pixel is smallest. When providing description on the basis of the Jth pixel with reference to FIGS. 13 and 14, the maximum correlation value can be regarded as the correlation value at the moment at which the amount of gas present at the region (Jth region) corresponding to the Jth pixel is greatest, and the minimum correlation value can be regarded as the correlation value at the moment at which the amount of gas present at the region (Jth region) corresponding to the Jth pixel is smallest.

Gas having leaked from a monitoring target slowly drifts while swaying, and thus, pixels whose correlation values indicate a moderate spatial change, among the plurality of pixels constituting the maximum value visualization image, match the pixels included in a monitoring image that constitute a gas image. This similarly applies to the difference image. As described later, by using the difference image, the influence of edge noise deriving from shaking on an image of the monitoring target (including those extremely small in the sub-pixel level) can be reduced.

Figure 40:
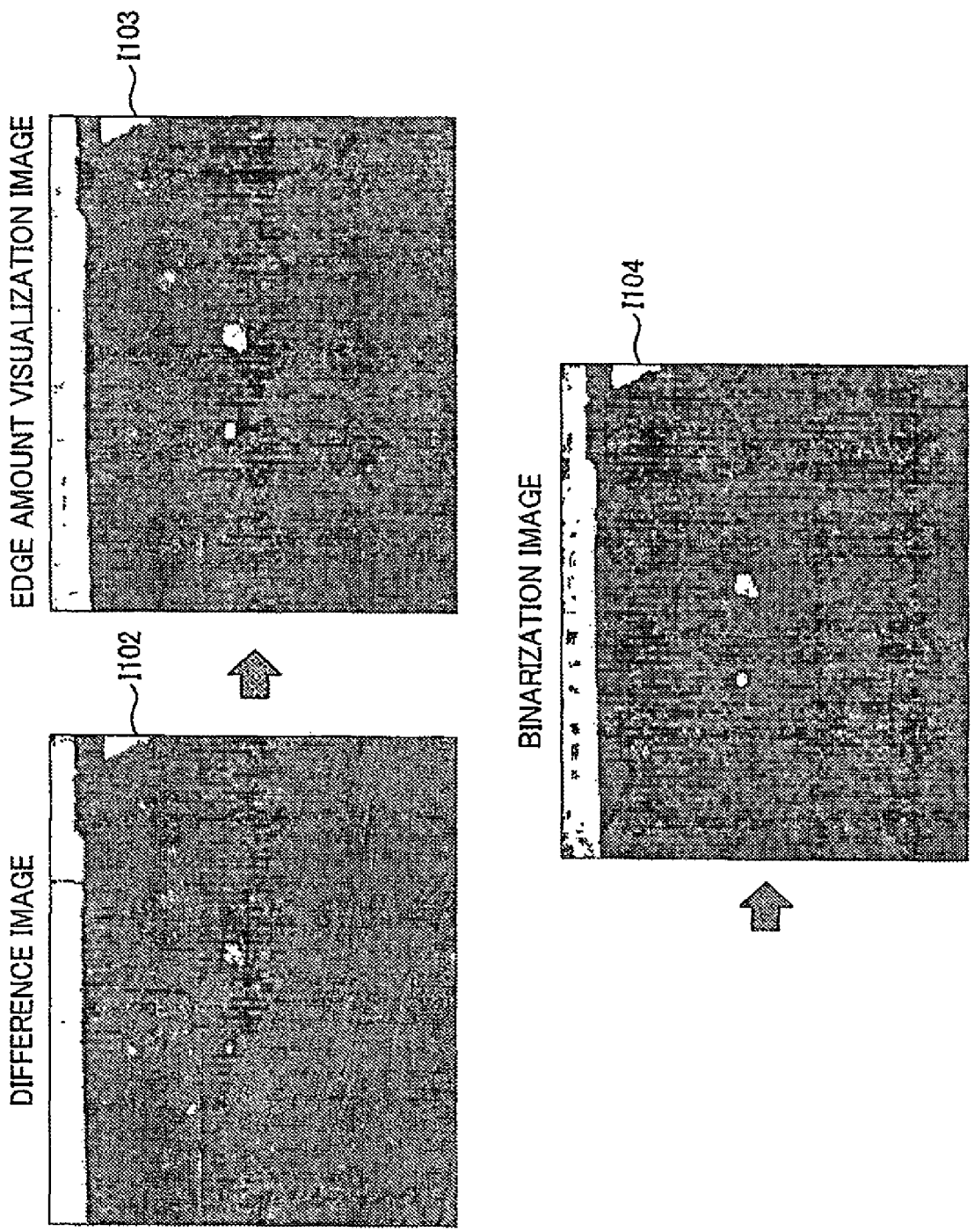
FIG. 40 is an image diagram showing various images related to identification processing (step S406 of FIG. 38).

The identification unit 11 uses the difference image and performs processing for identifying pixels included in the monitoring image that constitute a gas image and pixels included in the monitoring image that constitute a moving body image other than a gas image (step S406). This processing is described with reference to FIG. 40. FIG. 40 is an image diagram showing various images related to the identification processing (step S406) shown in FIG. 38.

The identification unit 11 calculates edge amounts respectively corresponding to the plurality of pixels constituting image I102 (the difference image). This is the same as step S202-1 shown in FIG. 32. Image I103 is an image (an edge amount visualization image) visualizing the edge amounts respectively corresponding to the plurality of pixels constituting image I102 (the difference image).

Pixels whose edge amounts exceed a predetermined threshold value are not regarded as pixels included in the monitoring image that constitute a gas image, and are regarded as pixels included in the monitoring image that constitute a moving body image other than a gas image. The identification unit 11 performs comparison with the threshold value and binarization with respect to each of the plurality of pixels constituting image I103 (the edge amount visualization image).

Image I104 is an image (binarization image) yielded through binarization of the plurality of pixels constituting image I103 (the edge amount visualization image). The white pixels are pixels whose edge amounts exceed the threshold value, and the black pixels are pixels whose edge amounts are equal to or smaller than the threshold value. The white pixels (the pixels whose edge amounts exceed the threshold value) constitute an image (a pseudo image of a moving body image) formed by pixels included in the monitoring image that constitute the moving body image. Note that in the fourth mode of the present embodiment, processing for calculating correction amounts and the processing for correcting the monitoring image, which have been described on the basis of FIG. 32, may be performed in place of the processing for generating the binarization image. Further, in the fourth mode of the present embodiment, the above-described image processing (the processing for calculating edge amounts, the binarization processing, the processing for calculating correction amounts, and the processing for correcting the monitoring image) may be performed with respect to the maximum value visualization image (image I100 shown in FIG. 39) in place of the difference image.

Figure 41:
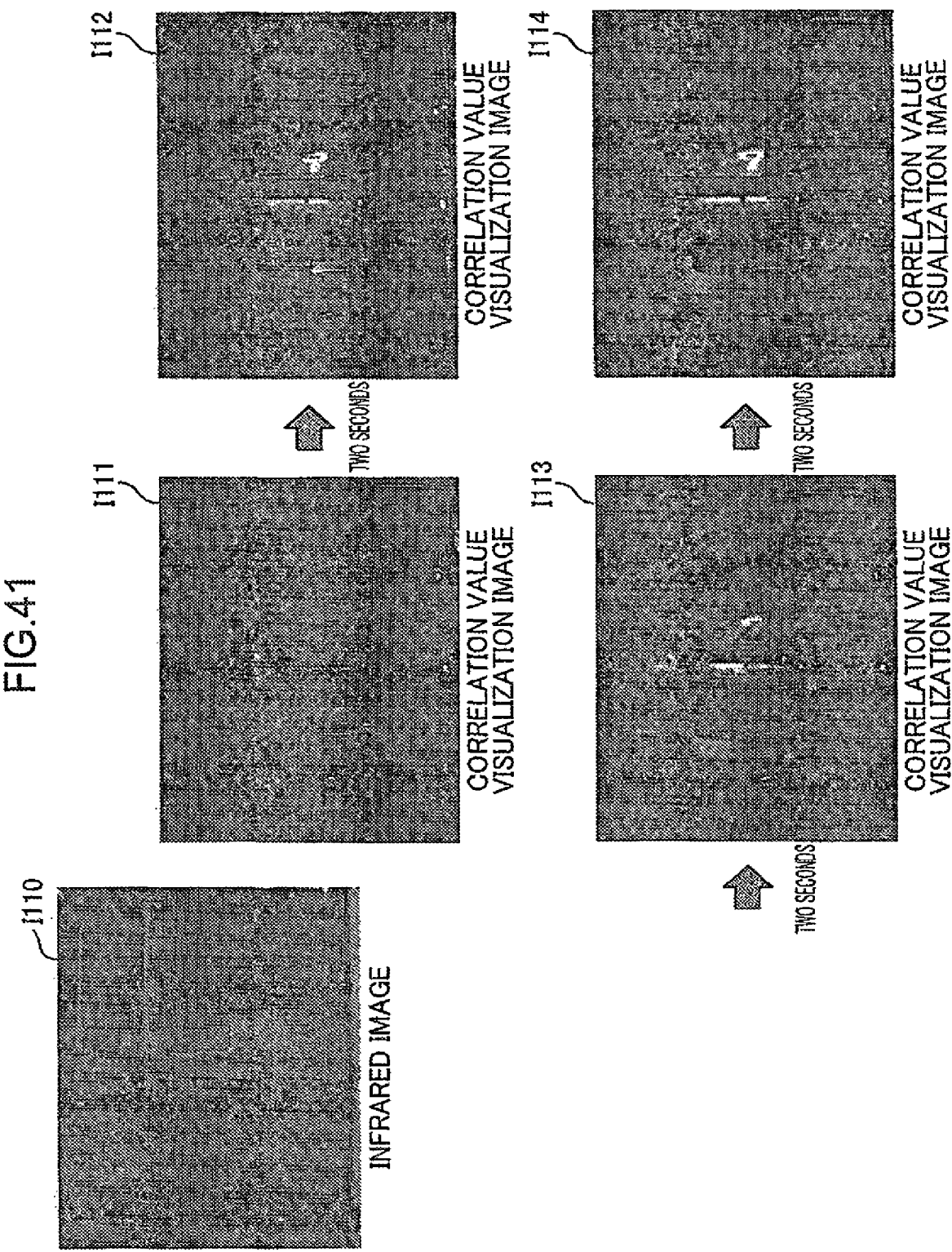
FIG. 41 is an image diagram showing correlation value visualization images lined up in chronological order.

Description is provided regarding the capability of the difference image of reducing the influence of edge noise on an image of a monitoring target to a further extent than the maximum value visualization image. Similarly to FIG. 35, FIG. 41 is an image diagram showing correlation value visualization images lined up in chronological order. The monitoring target is a processing device related to gas. Image I110 is an infrared image of the processing device related to gas. Images I111 to I114 are four correlation value visualization images selected from among correlation value visualization images having been generated by using a moving image of infrared images of the processing device related to gas. Image I112 is an image after two seconds have elapsed from image I111, image I113 is an image after two seconds have elapsed from image I112, and image I114 is an image after two seconds have elapsed from image I113.

Figure 42:
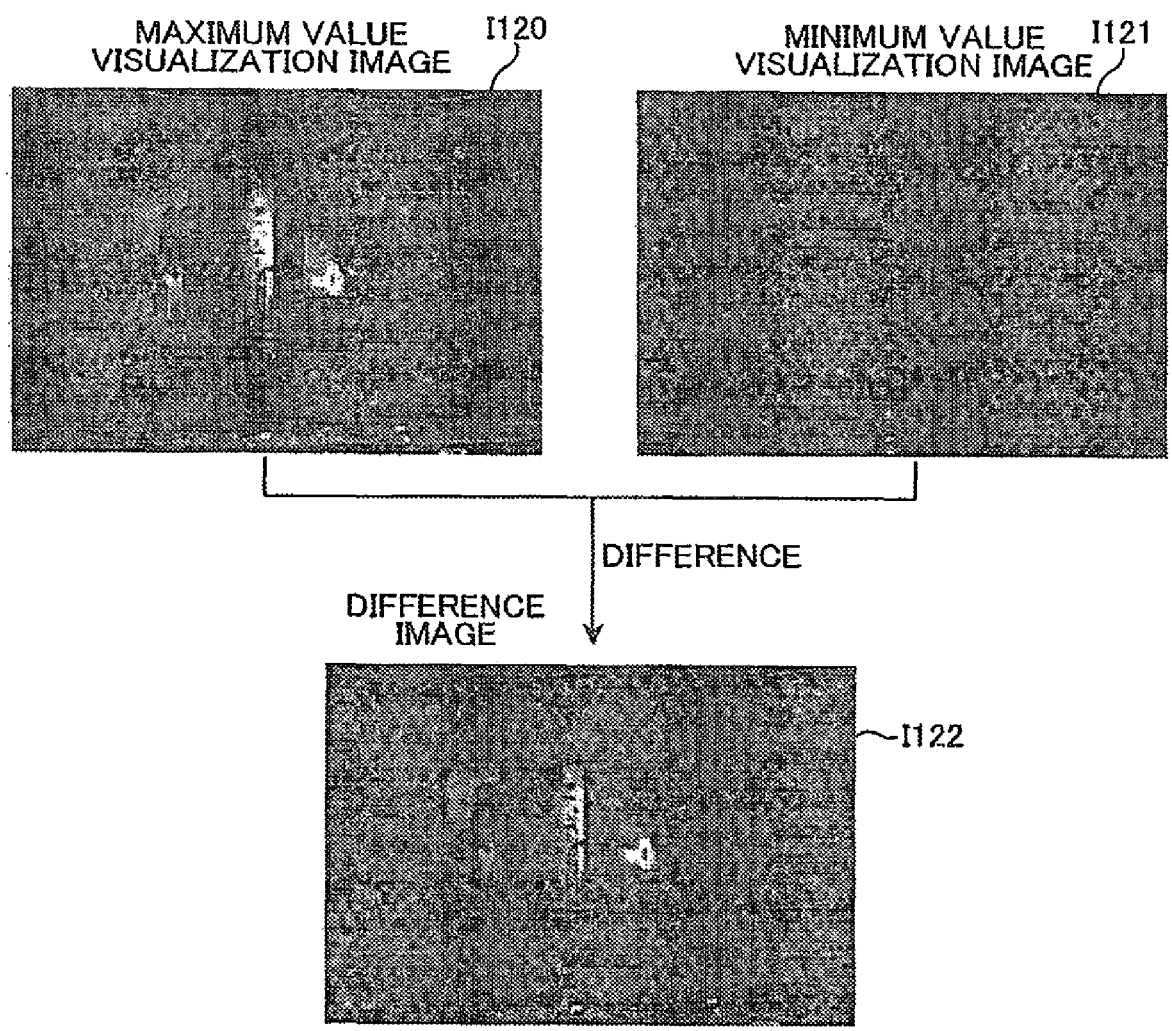
FIG. 42 is an image diagram showing various images related to the processing for generating a difference image.

Similarly to FIG. 39, FIG. 42 is an image diagram showing various images related to the processing for generating the difference image. Image I120 is a maximum value visualization image, image I121 is a minimum value visualization image, and image I112 is a difference image. As can be seen from image I112, the edge noise of the image of the processing device related to gas has been attenuated.

In the first to fourth modes of the gas-detection image-processing device 3 relating to the present embodiment, the image processing device 3 shown in FIG. 1A, the computation processing unit 9 processes predetermined information, the image generation unit 8 generates an image visualizing the processed predetermined information, and the display control unit 12 causes the display unit 13 to display the image. The present invention is not limited to this structure, and may have a structure in which the computation processing unit 9 is included but the image generation unit 8, the display control unit 12, and the display unit 13 are not included, a structure in which the computation processing unit 9 and the image generation unit 8 are included but the display control unit 12 and the display unit 13 are not included, or a structure in which the computation processing unit 9, the image generation unit 8, and the display control unit 12 are included but the display unit 13 is not included.

SUMMARY OF EMBODIMENT

A gas-detection image-processing device relating to a first aspect of the embodiment includes: a calculation unit that calculates identification values respectively corresponding to a plurality of pixels constituting an infrared image of a monitoring target, the identification values being identification values for identifying a pixel constituting a gas image and a pixel constituting a non-gas image; and an identification unit that, on the basis of the identification values, identifies, in a monitoring image that is generated by using the infrared image, a pixel constituting the gas image and a pixel constituting the non-gas image. This corresponds to the first to fourth modes of the embodiment. Note that the first mode of the embodiment is constituted of: step S100; step S101: and step S102, as shown in FIG. 3. The first mode of the embodiment can be understood by reading, in the description, only the [Processing for Identifying Pixels constituting Gas Image and Pixels constituting Moving Body Image other than Gas Image] section without reading the [Processing for Generating Monitoring Images] and [Processing for Calculating Gas Concentration Lengths] sections, because it is also possible to use publicly-known methods for step S100 (the processing for generating monitoring images) and step S101 (processing for calculating concentration lengths).

According to the gas-detection image-processing device relating to the first aspect of the embodiment, a pixel included in a monitoring image and constituting a gas image and a pixel included in the monitoring image and constituting a non-gas image (for example, a moving body image other than a gas image) can be identified. Hence, a gas image and a non-gas image can be identified in a monitoring image.

In the above-described structure, the gas-detection image-processing device further includes an image data input unit that receives input of image data representing a plurality of the infrared images yielded by an image of the monitoring target being taken at a plurality of time points; and a determination unit that generates chronological pixel data in which pieces of pixel data for the pixels located at a same position in the plurality of infrared images input from the image data input unit are lined-up in chronological order, and on the basis of the chronological pixel data for each of the plurality of pixels constituting the infrared image, determines for each of the plurality of pixels: a corresponding with-gas background temperature indicating a background temperature when gas is present; and a corresponding without-gas background temperature indicating a background temperature when gas is not present, wherein the calculation unit calculates the concentration lengths respectively corresponding to the plurality of pixels by using the with-gas background temperatures and the without-gas background temperatures that are determined by the determination unit. This structure corresponds to the first mode of the embodiment.

In this structure, the identification values are gas concentration lengths. The determination unit is realized by the image generation unit 8 and the computation processing unit 9, which are shown in FIG. 1A. There is a publicly-known technique of preparing a filter transmitting a wavelength region that is absorbed by a detection target gas and a filter not transmitting the wavelength region, and measuring the with-gas background temperature and the without-gas background temperature by switching between these two types of filters in an appropriate manner. Meanwhile, in this structure, the with-gas background temperature and the without-gas background temperature are calculated by using the phenomenon of the swaying of gas having leaked. According to this structure, two types of filters and a mechanism for switching between the filters become unnecessary.

In the above-described structure, the identification values are correlation values correlated with gas concentration lengths. The correlation values are calculated, for example, by using: a first temperature difference occurring due to gas having leaked from the monitoring target; and a second temperature difference based on a temperature of the gas. This structure corresponds to the second to fourth modes of the embodiment.

When defining the first temperature difference as a temperature difference between a with-gas background temperature and a without-gas background temperature, and the second temperature difference as a temperature difference between the temperature of the gas and the without-gas background temperature, the correlation values are expressed by the following formula. This structure corresponds to the second mode of the embodiment.

Correlation value=(temperature difference between with-gas background temperature and without-gas background temperature)/(temperature difference between gas temperature and without-gas background temperature) (Formula)

When attempting to calculate concentration lengths under the presumption that gas is present over the entirety of an image in order to make the determination of whether it is gas or not with respect to each pixel or each partial region, there are cases in which, depending upon pixel, the gas concentration length cannot be calculated based on the relation between the with-gas background temperature, the without-gas background temperature, and the gas temperature. This is inconvenient, because even when filter processing for observing spatial change in an image is to be performed in order to make the determination of whether it is gas or not, the filter processing cannot be performed, for example.

Meanwhile, because the correlation values are defined by (Formula) described above, the correlation values are set when the with-gas background temperature, the without-gas background temperature, and the gas temperature are determined. Accordingly, in a correlation value visualization image visualizing correlation values, all correlation values respectively corresponding to the plurality of pixels constituting the image can be set, and thus, there is no inconvenience when performing image processing in which all of the plurality of pixels constituting the image are used.

In the above-described structure, the identification unit compares absolute values of the identification values respectively corresponding to the plurality of pixels constituting the infrared image with a predetermined threshold value, and specifies a corresponding pixel of each of the absolute values of the identification values that exceed the threshold value as a pixel constituting the non-gas image. This structure corresponds to the first and second modes of the embodiment. Absolute values of the identification values are used because there are cases in which identification values take negative values.

When an identification value (gas concentration length, correlation value) corresponding to a given pixel has an abnormal value, the pixel can be regarded as not being a pixel constituting a gas image and can be regarded as being a pixel constituting a non-gas image. In this structure, the determination of whether or not an identification value corresponding to a given pixel has an abnormal value is performed by using a threshold value.

In the above-described structure, the gas-detection image-processing device further includes an image generation unit that generates a visualization image being an image visualizing the identification values calculated by the calculation unit, and the identification unit calculates, for each of a plurality of pixels constituting the visualization image, a spatial change amount of the corresponding identification value, and on the basis of the calculated spatial change amounts, specifies a pixel constituting the non-gas image. This structure corresponds to the second mode of the embodiment. Preferably, the spatial change amounts are values yielded through spatial differentiation of the respective ones of the identification values of the plurality of pixels constituting the visualization image. The identification unit calculates differential values for the respective ones of the plurality of pixels constituting the visualization image, the differential values being values yielded through spatial differentiation of the identification values, compares the calculated differential values with a predetermined threshold value, and specifies a corresponding pixel of each of the differential values exceeding the threshold value as a pixel constituting the non-gas image.

In the above-described structure, the identification unit performs correction of decreasing the corresponding identification value of a pixel included in the monitoring image and constituting the non-gas image, the pixel included in the monitoring image and constituting the non-gas image being specified by the identification unit. This structure corresponds to the second mode of the embodiment.

According to this structure, in the monitoring image after correction, the luminance of a non-gas image can be suppressed compared to the luminance of a gas image.

In the above-described structure, the gas-detection image-processing device further includes an image generation unit that generates a plurality of visualization images lined up in chronological order, the visualization images being images visualizing the identification values calculated by the calculation unit, and the calculation unit generates chronological identification value data in which the identification values corresponding to pixels located at a same spatial position in the plurality of visualization images lined up in chronological order are lined up in chronological order, and the identification unit performs, for each of the plurality of pixels constituting the visualization image, a determination of whether the chronological identification value data includes the identification value having an abnormal value, and specifies a pixel corresponding to the chronological identification value data including the identification value having the abnormal value as a pixel constituting the non-gas image. This structure corresponds to the third mode of the embodiment.

In the above-described structure, the identification unit performs, with respect to the chronological identification value data, a specification of a pixel constituting the non-gas image on the basis of temporal change amounts of the identification values having same values (for example, on the basis of a histogram indicating the frequency of appearance of the identification values having a same value). This structure corresponds to the third mode of the embodiment.

A gas-detection image-processing method relating to a second aspect of the embodiment includes: a calculation step of calculating identification values respectively corresponding to a plurality of pixels constituting an infrared image of a monitoring target, the identification values being identification values for identifying a pixel constituting a gas image and a pixel constituting a non-gas image; and an identification step of, on the basis of the identification values, identifying, in a monitoring image that is generated by using the infrared image, a pixel constituting the gas image and a pixel constituting the non-gas image.

A gas-detection image-processing program relating to a third aspect of the embodiment causes a computer to execute: a calculation step of calculating identification values respectively corresponding to a plurality of pixels constituting an infrared image of a monitoring target, the identification values being identification values for identifying a pixel constituting a gas image and a pixel constituting a non-gas image; and an identification step of, on the basis of the identification values, identifying, in a monitoring image that is generated by using the infrared image, a pixel constituting the gas image and a pixel constituting the non-gas image.

A computer-readable recording medium relating to a fourth aspect of the embodiment has recorded thereon the gas-detection image-processing program.

The gas-detection image-processing method relating to the second aspect of the embodiment, the gas-detection image-processing program relating to the third aspect of the embodiment, and the computer-readable recording medium relating to the fourth mode of the embodiment define the gas-detection image-processing device relating to the first aspect of the embodiment in terms of a method, a program, and a computer-readable recording medium, respectively, and have the same actions and effects as the gas-detection image-processing device relating to the first aspect of the embodiment.

A gas detection system relating to a fifth aspect of the embodiment includes: an infrared camera that takes images of a monitoring-target area; and a calculation unit that calculates identification values respectively corresponding to a plurality of pixels constituting an image of the monitoring-target area taken by the infrared camera, the identification values being identification values for identifying a pixel constituting a gas image and a pixel constituting a non-gas image.

The monitoring-target area is, for example, an area in which a gas leakage monitoring target is present. The gas detection system relating to the fifth aspect of the embodiment is a system that calculates identification values for identifying a pixel constituting a gas image and a pixel constituting a non-gas image.

This application claims the benefit of Japanese Patent Application No. 2015-244193 filed on Dec. 15, 2015, the entire contents of which are hereby incorporated by reference in this application.

In order to express the present invention, the present invention has been described appropriately and sufficiently above through an embodiment while referring to the drawings. It should however be acknowledged that a person skilled in the art could easily modify and/or improve the above-described embodiment. Hence, a modified or improved form to be carried out by a person skilled in the art shall be construed as being included in the scope of rights of the claims recited in the Scope of Claims, unless the modified or improved form is that of a level departing from the scope of rights of the claims.

Industrial Applicability

The present invention can provide a gas-detection image-processing device, a gas-detection image-processing method, a gas-detection image-processing program, and a computer-readable recording medium having a gas-detection image-processing program recorded thereon.

The invention claimed is:

1. A gas-detection image-processing device comprising:
a hardware processor that calculates identification values each corresponding to a respective one of a plurality of pixels constituting an infrared image of a monitoring target, the identification values being identification values for identifying, from among the plurality of pixels constituting the infrared image, a pixel constituting a gas image and a pixel constituting a non-gas image;
wherein the hardware processor, based on the identification values, identifies, in a monitoring image that is generated by using the infrared image, a pixel constituting the gas image and a pixel constituting the non-gas image.

2. The gas-detection image-processing device according to claim 1, wherein the identification values are gas concentration lengths.

3. The gas-detection image-processing device according to claim 2, further comprising:
a communication interface unit that receives input of image data representing a plurality of the infrared images yielded by an image of the monitoring target being taken at a plurality of time points;
wherein the hardware processor generates chronological pixel data in which pieces of pixel data for pixels located at a same position in the plurality of infrared images input from the communication interface unit are lined-up in chronological order, and based on the chronological pixel data for each of the plurality of pixels constituting the infrared image, determines for each of the plurality of pixels: a corresponding with-gas background temperature indicating a background temperature when gas is present; and a corresponding without-gas background temperature indicating a background temperature when gas is not present, and
wherein the hardware processor calculates the concentration lengths respectively corresponding to the plurality of pixels by using the with-gas background temperatures and the without-gas background temperatures that are determined by the hardware processor.

4. The gas-detection image-processing device according to claim 1, wherein the identification values are correlation values correlated with gas concentration lengths.

5. The gas-detection image-processing device according to claim 4, wherein the correlation values are calculated by using:
a first temperature difference occurring due to gas having leaked from the monitoring target; and
a second temperature difference based on a temperature of the gas.

6. The gas-detection image-processing device according to claim 5, wherein the first temperature difference is a temperature difference between a with-gas background temperature and a without-gas background temperature, the second temperature difference is a non-zero temperature difference between the temperature of the gas and the without-gas background temperature, and the correlation values are expressed by the following formula:

Correlation value=(the temperature difference between the with-gas background temperature and the without-gas background temperature)/(the temperature difference between the temperature of the gas and the without-gas background temperature).

7. The gas-detection image-processing device according to claim 1, wherein the hardware processor compares absolute values of the identification values each corresponding to a respective one of the plurality of pixels constituting the infrared image with a predetermined threshold value, and specifies a corresponding pixel of each of the absolute values of the identification values that exceeds the predetermined threshold value as a pixel constituting the non-gas image.

8. The gas-detection image-processing device according to claim 1, wherein:
the hardware processor generates a visualization image being an image visualizing the identification values calculated by the hardware processor, and
the hardware processor calculates, for each of a plurality of pixels constituting the visualization image, a spatial change amount of the corresponding identification value, and based on the calculated spatial change amounts, specifies a pixel constituting the non-gas image.

9. The gas-detection image-processing device according to claim 8, wherein:
the spatial change amounts are values yielded through spatial differentiation of the respective ones of the identification values of the plurality of pixels constituting the visualization image, and
the hardware processor calculates differential values for respective ones of the plurality of pixels constituting the visualization image, the differential values being values yielded through spatial differentiation of the identification values, compares the calculated differential values with a predetermined threshold value, and specifies a corresponding pixel of each of the differential values exceeding the threshold value as a pixel constituting the non-gas image.

10. The gas-detection image-processing device according to claim 9, wherein the hardware processor performs correction of decreasing the corresponding identification value of a pixel included in the monitoring image and constituting the non-gas image, the pixel included in the monitoring image and constituting the non-gas image being specified by the hardware processor.

11. The gas-detection image-processing device according to claim 1, wherein:
the hardware processor generates a plurality of visualization images lined up in chronological order, the visualization images being images visualizing the identification values calculated by the hardware processor,
the hardware processor generates chronological identification value data in which the identification values corresponding to pixels located at a same spatial position in the plurality of visualization images lined up in chronological order are lined up in chronological order, and
the hardware processor performs, for each of the plurality of pixels constituting the visualization image, a determination of whether the chronological identification value data includes the identification value having an abnormal value, and specifies a pixel corresponding to the chronological identification value data including the identification value having the abnormal value as a pixel constituting the non-gas image.

12. The gas-detection image-processing device according to claim 11, wherein the hardware processor performs, with respect to the chronological identification value data, a specification of a pixel constituting the non-gas image based on temporal change amounts of the identification values having same values.

13. The gas-detection image-processing device according to claim 1, wherein the identification values are values related to gas concentration lengths.

14. A gas-detection image-processing method comprising:
calculating identification values each corresponding to a respective one of a plurality of pixels constituting an infrared image of a monitoring target, the identification values being identification values for identifying, from among the plurality of pixels constituting the infrared image, a pixel constituting a gas image and a pixel constituting a non-gas image; and
based on the identification values, identifying, in a monitoring image that is generated by using the infrared image, a pixel constituting the gas image and a pixel constituting the non-gas image.

15. A non-transitory recording medium storing a computer readable gas-detection image-processing program thereon, the program being executable by a computer to control the computer to execute processes comprising:
calculating identification values each corresponding to a respective one of a plurality of pixels constituting an infrared image of a monitoring target, the identification values being identification values for identifying, from among the plurality of pixels constituting the infrared image, a pixel constituting a gas image and a pixel constituting a non-gas image; and
based on the identification values, identifying, in a monitoring image that is generated by using the infrared image, a pixel constituting the gas image and a pixel constituting the non-gas image.

16. A gas detection system comprising:
an infrared camera that takes images of a monitoring-target area; and
a hardware processor that calculates identification values each corresponding to a respective one of a plurality of pixels constituting an image of the monitoring-target area taken by the infrared camera, the identification values being identification values for identifying, from among the plurality of pixels constituting the image of the monitoring-target area taken by the infrared camera, a pixel constituting a gas image and a pixel constituting a non-gas image.

17. The gas detection system according to claim 16, wherein the identification values are gas concentration lengths.

18. The gas detection system according to claim 16, wherein the identification values are correlation values correlated with gas concentration lengths.

19. The gas detection system according to claim 16, wherein the identification values are values related to gas concentration lengths.

* * * * *